US009902491B2

(12) United States Patent
Chan et al.

(10) Patent No.: US 9,902,491 B2
(45) Date of Patent: Feb. 27, 2018

(54) RECONFIGURABLE UNMANNED AIRCRAFT SYSTEM

(71) Applicant: Elwha LLC, Bellevue, WA (US)

(72) Inventors: Alistair K. Chan, Bainbridge Island, WA (US); Jesse R. Cheatham, III, Seattle, WA (US); Hon Wah Chin, Palo Alto, CA (US); William David Duncan, Mill Creek, WA (US); Roderick A. Hyde, Redmond, WA (US); Muriel Y. Ishikawa, Livermore, CA (US); Jordin T. Kare, San Jose, CA (US); Tony S. Pan, Bellevue, WA (US); Robert C. Petroski, Seattle, WA (US); Clarence T. Tegreene, Mercer Island, WA (US); David B. Tuckerman, Lafayette, CA (US); Thomas Allan Weaver, San Mateo, CA (US); Lowell L. Wood, Jr., Bellevue, WA (US)

(73) Assignee: Elwha LLC

( * ) Notice: Subject to any disclaimer, the term of this patent is extended or adjusted under 35 U.S.C. 154(b) by 284 days.

(21) Appl. No.: 14/639,369

(22) Filed: Mar. 5, 2015

(65) Prior Publication Data

US 2016/0159472 A1 Jun. 9, 2016

Related U.S. Application Data

(63) Continuation of application No. 14/560,606, filed on Dec. 4, 2014.

(51) Int. Cl.
*B64C 27/00* (2006.01)
*B64C 27/08* (2006.01)
(Continued)

(52) U.S. Cl.
CPC .............. *B64C 27/08* (2013.01); *B64C 13/02* (2013.01); *B64C 27/37* (2013.01); *B64C 27/54* (2013.01);
(Continued)

(58) Field of Classification Search
CPC ........ B64C 2201/027; B64C 2201/024; B64C 2201/108; B64C 2201/126; B64C 2201/128; B64C 39/024
See application file for complete search history.

(56) References Cited

U.S. PATENT DOCUMENTS 2,342,396 A 2/1944 King
2,473,134 A 6/1949 Bonnett
(Continued)

FOREIGN PATENT DOCUMENTS

CN 103872795 A 6/2014

OTHER PUBLICATIONS

PCT International Search Report; International App. No. PCT/US2015/063204; dated May 19, 2016; pp. 1-3.
(Continued)

*Primary Examiner* — Philip J Bonzell

(57) ABSTRACT

A reconfigurable unmanned aircraft system is disclosed. A system and method for configuring a reconfigurable unmanned aircraft and system and method for operation and management of a reconfigurable unmanned aircraft in an airspace are also disclosed. The aircraft is selectively reconfigurable to modify flight characteristics. The aircraft comprises a set of rotors. The position of at least one rotor relative to the base can be modified by at least one of translation of the rotor relative to the boom, pivoting of the boom relative to the base, and translation of the boom relative to the base; so that flight characteristics can be modified by configuration of position of at least one rotor (Continued)

relative to the base. A method of configuring an aircraft having a set of rotors on a mission to carry a payload comprises the steps of determining properties of the payload including at least mass properties, determining the manner in which the payload will be coupled to the aircraft, determining configuration for each of the rotors in the set of rotors at least partially in consideration of the properties of the payload, and positioning the set of rotors in the configuration for the aircraft to perform the mission.

33 Claims, 35 Drawing Sheets

(51) Int. Cl.
*B64C 27/37* (2006.01)
*B64D 45/00* (2006.01)
*B64C 39/02* (2006.01)
*B64C 13/02* (2006.01)
*B64C 27/54* (2006.01)
*B64D 1/00* (2006.01)

(52) U.S. Cl.
CPC ............ *B64C 39/024* (2013.01); *B64D 1/00* (2013.01); *B64D 45/00* (2013.01); *B64C 2201/027* (2013.01); *B64C 2201/042* (2013.01); *B64C 2201/108* (2013.01); *B64C 2201/128* (2013.01); *B64C 2201/165* (2013.01)

(56) References Cited

U.S. PATENT DOCUMENTS

| | | | |
|---|---|---|---|
| 2,835,472 A | 5/1958 | Osborn | |
| 2,844,207 A | 7/1958 | Curley | |
| 3,159,758 A | 12/1964 | Hemperly | |
| 3,175,108 A | 3/1965 | Thomas | |
| 3,233,929 A | 2/1966 | Herbenar | |
| 3,276,332 A | 10/1966 | Jaffe | |
| 3,918,855 A | 11/1975 | Bornholdt | |
| 4,614,128 A | 9/1986 | Fickler | |
| 4,693,628 A | 9/1987 | Renk | |
| 4,890,713 A | 1/1990 | Pagano | |
| 5,078,017 A | 1/1992 | Zornes | |
| 5,177,644 A | 1/1993 | Stark | |
| 5,203,520 A * | 4/1993 | Przygodzki | B64C 37/00 244/17.19 |
| 5,409,269 A | 4/1995 | Karlsson | |
| 5,717,593 A | 2/1998 | Gvili | |
| 5,799,900 A | 9/1998 | McDonnell | |
| 6,101,889 A | 8/2000 | Laskey | |
| 6,238,124 B1 | 5/2001 | Werner | |
| 6,264,135 B1 | 7/2001 | Dacosta | |
| 6,377,875 B1 | 4/2002 | Schwaerzler | |
| 6,431,019 B1 | 8/2002 | Greene | |
| 6,804,607 B1 | 10/2004 | Wood | |
| 7,037,022 B2 | 5/2006 | Schonhoff | |
| 7,543,780 B1 | 6/2009 | Marshall et al. | |
| 7,714,536 B1 | 5/2010 | Silberg et al. | |
| 7,922,115 B2 | 4/2011 | Colgren | |
| 7,999,698 B2 | 8/2011 | Annati et al. | |
| 8,025,576 B2 | 9/2011 | Brisset | |
| 8,052,081 B2 * | 11/2011 | Olm | B64C 39/024 244/17.23 |
| 8,060,295 B2 | 11/2011 | Estkowski et al. | |
| 8,133,155 B2 * | 3/2012 | Ehinger | B64C 27/08 477/124 |
| 8,226,063 B2 | 7/2012 | Weber | |
| 8,453,962 B2 * | 6/2013 | Shaw | B64C 27/20 244/12.4 |
| 8,494,760 B2 | 7/2013 | Yoel et al. | |
| 8,502,456 B2 | 8/2013 | Jarrell et al. | |
| 8,511,606 B1 | 8/2013 | Lutke et al. | |
| 8,534,147 B2 | 9/2013 | Roither | |
| 8,716,942 B2 | 5/2014 | Jarrell et al. | |
| 8,758,232 B2 | 6/2014 | Crispin | |
| 8,775,013 B1 | 7/2014 | Smailus | |
| 8,862,285 B2 * | 10/2014 | Wong | B64C 39/024 353/122 |
| 9,004,396 B1 * | 4/2015 | Colin | B64D 47/08 244/17.23 |
| 9,087,451 B1 | 7/2015 | Jarrell | |
| 9,108,728 B2 * | 8/2015 | Shaw | B64C 27/20 |
| 2002/0104922 A1* | 8/2002 | Nakamura | B64C 27/08 244/17.25 |
| 2005/0178882 A1* | 8/2005 | Akaro | B64C 27/08 244/17.11 |
| 2005/0236517 A1* | 10/2005 | Akaro | B64C 39/006 244/17.23 |
| 2007/0023581 A1* | 2/2007 | La | B64C 27/20 244/165 |
| 2007/0101242 A1 | 5/2007 | Yancey et al. | |
| 2007/0129855 A1 | 6/2007 | Coulmeau | |
| 2007/0200027 A1 | 8/2007 | Johnson | |
| 2009/0008499 A1* | 1/2009 | Shaw | B64C 27/20 244/17.23 |
| 2009/0316755 A1 | 12/2009 | Collette et al. | |
| 2010/0013436 A1 | 1/2010 | Lowenthal et al. | |
| 2010/0044499 A1* | 2/2010 | Dragan | B64C 1/30 244/17.23 |
| 2010/0145540 A1 | 6/2010 | McKenna | |
| 2010/0145610 A1 | 6/2010 | Bacabara et al. | |
| 2010/0243794 A1* | 9/2010 | Jermyn | A63H 27/12 244/17.23 |
| 2010/0250022 A1 | 9/2010 | Hines et al. | |
| 2011/0015034 A1* | 1/2011 | Ehinger | B64C 27/08 477/70 |
| 2011/0017865 A1* | 1/2011 | Achtelik | B64C 27/08 244/17.23 |
| 2011/0087561 A1 | 4/2011 | Cormack et al. | |
| 2011/0202206 A1 | 8/2011 | Karthikeyan et al. | |
| 2011/0245997 A1 | 10/2011 | Marty et al. | |
| 2012/0022719 A1 | 1/2012 | Matos | |
| 2012/0083945 A1* | 4/2012 | Oakley | B64C 27/08 701/2 |
| 2012/0208673 A1* | 8/2012 | Ehinger | B64C 27/08 477/84 |
| 2012/0223191 A1 | 9/2012 | Roberts | |
| 2012/0298793 A1* | 11/2012 | Weddendorf | F03D 1/02 244/17.23 |
| 2013/0068892 A1* | 3/2013 | Bin Desa | B64C 39/024 244/190 |
| 2013/0105620 A1* | 5/2013 | Alzu'bi | B64C 27/20 244/17.13 |
| 2013/0105635 A1* | 5/2013 | Alzu'bi | B64C 39/024 244/23 A |
| 2013/0134254 A1* | 5/2013 | Moore | B64D 1/16 244/17.11 |
| 2013/0206922 A1 | 8/2013 | Riedinger et al. | |
| 2013/0261850 A1 | 10/2013 | Smith et al. | |
| 2014/0021908 A1 | 1/2014 | McCool et al. | |
| 2014/0022051 A1 | 1/2014 | Levien et al. | |
| 2014/0032034 A1 | 1/2014 | Raptopoulos et al. | |
| 2014/0054411 A1* | 2/2014 | Connaulte | B64C 27/006 244/17.13 |
| 2014/0061362 A1* | 3/2014 | Olm | B60F 5/02 244/2 |
| 2014/0062215 A1 | 3/2014 | Seo et al. | |
| 2014/0083216 A1 | 3/2014 | Brewer | |
| 2014/0129059 A1* | 5/2014 | Scarlatti | B64C 39/024 701/16 |
| 2014/0138477 A1* | 5/2014 | Keennon | B64C 27/12 244/17.23 |
| 2014/0142785 A1 | 5/2014 | Fuentes et al. | |
| 2014/0151496 A1* | 6/2014 | Shaw | B64C 27/20 244/17.23 |
| 2014/0229094 A1* | 8/2014 | La Civita | G08G 5/0008 701/120 |
| 2014/0236388 A1* | 8/2014 | Wong | B64C 39/024 701/2 |
| 2014/0250412 A1 | 9/2014 | Vogelmeier et al. | |

(56) References Cited

U.S. PATENT DOCUMENTS

| | | | |
|---|---|---|---|
| 2014/0254896 A1* | 9/2014 | Zhou | B25J 9/0006 382/124 |
| 2014/0263822 A1* | 9/2014 | Malveaux | B64C 39/024 244/17.23 |
| 2014/0263823 A1* | 9/2014 | Wang | B64C 39/028 244/17.23 |
| 2015/0012154 A1* | 1/2015 | Senkel | B64D 17/80 701/4 |
| 2015/0021429 A1* | 1/2015 | Reichert | B64C 27/04 244/17.23 |
| 2015/0057844 A1* | 2/2015 | Callou | G05D 1/0204 701/3 |
| 2015/0151950 A1 | 6/2015 | Schafer | |
| 2015/0158392 A1 | 6/2015 | Zhao | |
| 2015/0170524 A1 | 6/2015 | Stefani et al. | |
| 2015/0212523 A1* | 7/2015 | Wolf | B64C 27/08 701/5 |
| 2015/0228196 A1 | 8/2015 | Sampigethaya | |
| 2015/0259066 A1* | 9/2015 | Johannesson | B64C 27/08 244/17.27 |
| 2015/0298799 A1* | 10/2015 | Bertrand | A63H 27/12 701/23 |
| 2015/0314881 A1* | 11/2015 | Tsaliah | B64D 17/72 244/146 |
| 2015/0331427 A1* | 11/2015 | Chaudary | B64C 39/024 244/17.13 |
| 2015/0336669 A1 | 11/2015 | Kantor et al. | |
| 2015/0348424 A1* | 12/2015 | Duffy | G08G 5/0013 701/2 |
| 2016/0001879 A1* | 1/2016 | Johannesson | B64C 27/50 416/142 |
| 2016/0010627 A1* | 1/2016 | Austin | F03D 3/02 290/55 |
| 2016/0016664 A1* | 1/2016 | Basuni | B64C 39/024 244/17.13 |
| 2016/0068261 A1* | 3/2016 | Niederberger | B64C 39/024 244/2 |
| 2016/0107751 A1* | 4/2016 | D'Andrea | B64C 27/20 701/4 |
| 2016/0114887 A1* | 4/2016 | Zhou | B60F 5/02 348/148 |
| 2016/0122016 A1* | 5/2016 | Mintchev | B64C 39/024 244/17.23 |
| 2016/0137298 A1* | 5/2016 | Youngblood | B64C 39/024 244/17.23 |
| 2016/0214728 A1* | 7/2016 | Rossi | B64C 27/08 |

OTHER PUBLICATIONS

PCT International Search Report; International App. No. PCT/US2016/042475; dated Oct. 12, 2016; pp. 1-3.

* cited by examiner

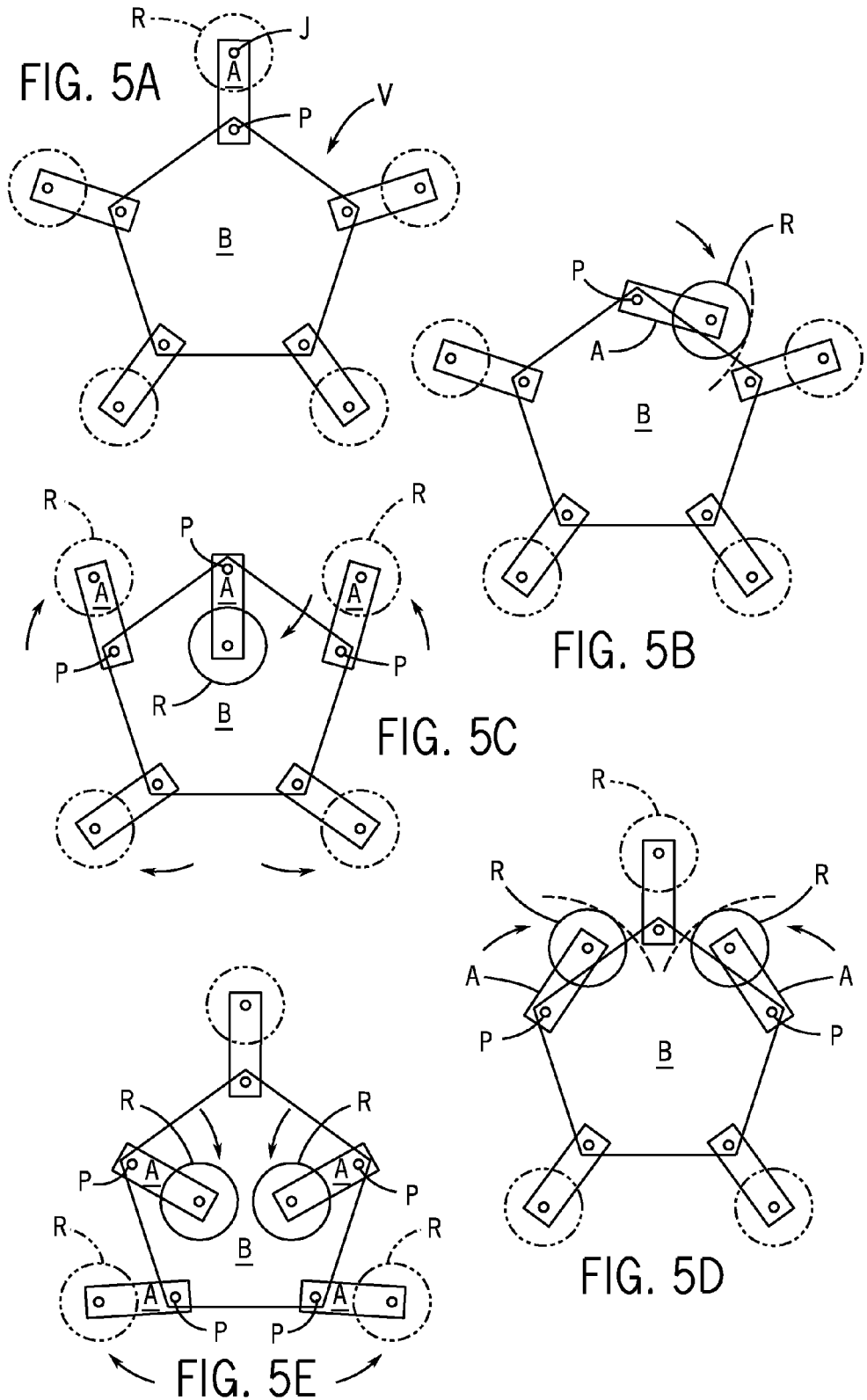

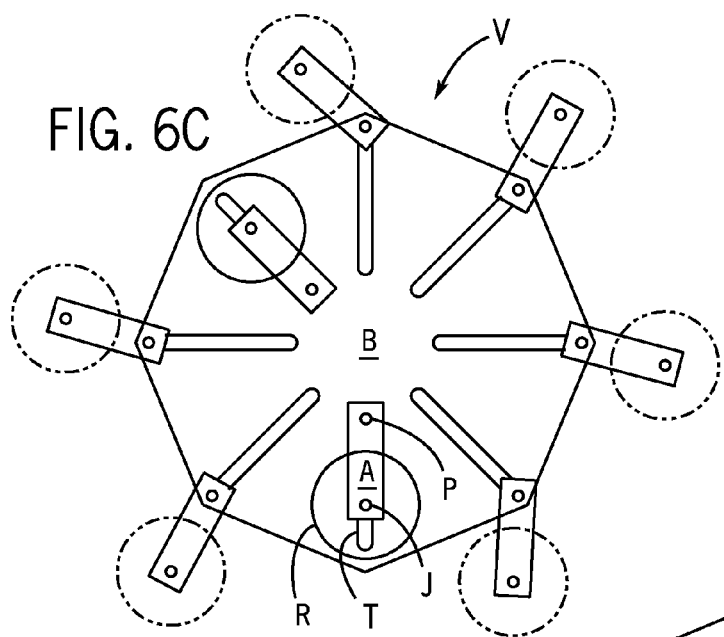
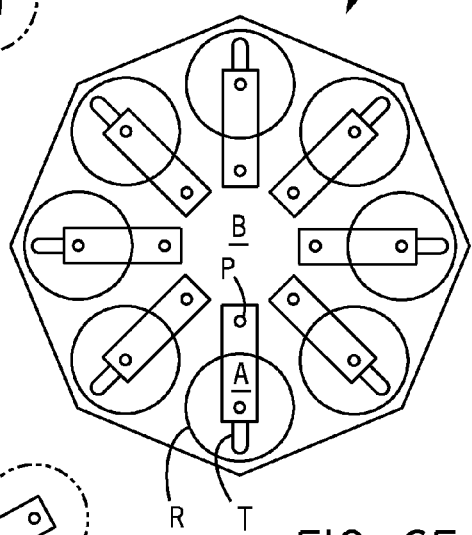
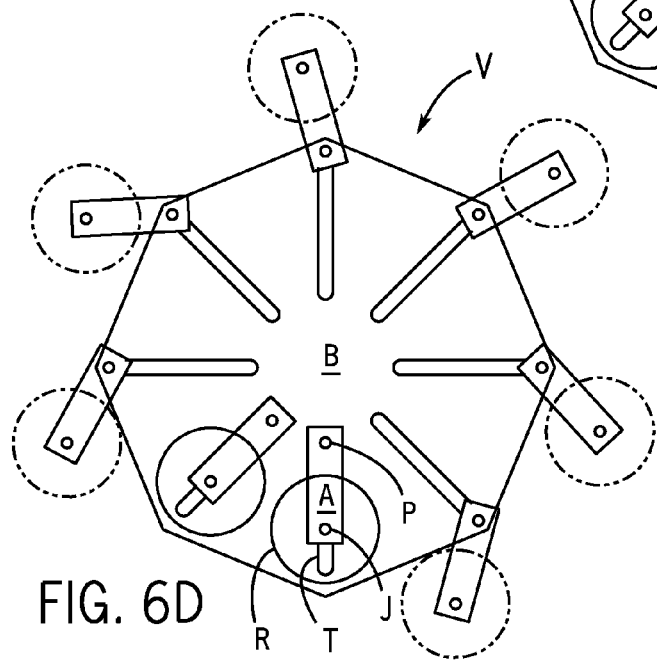

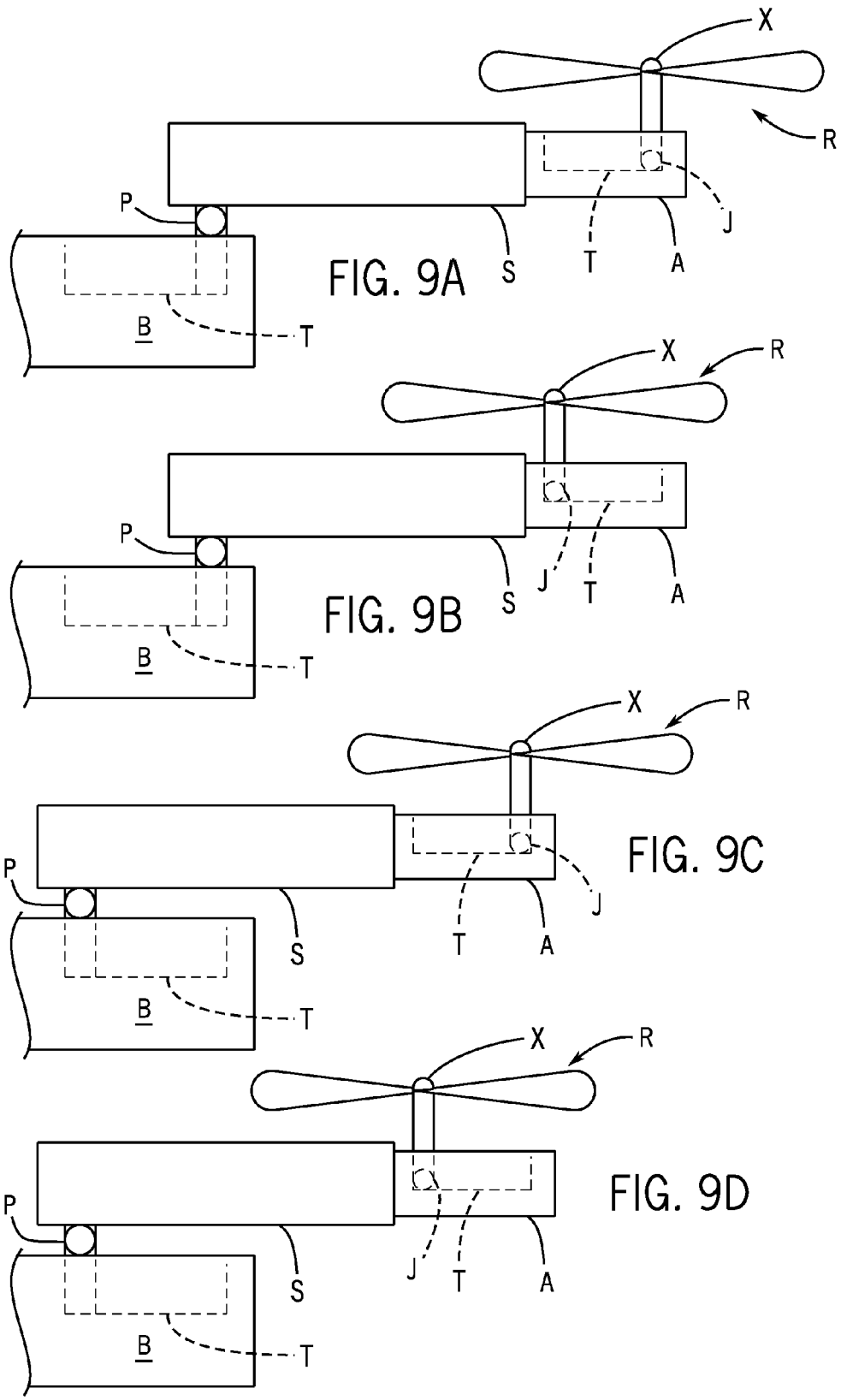

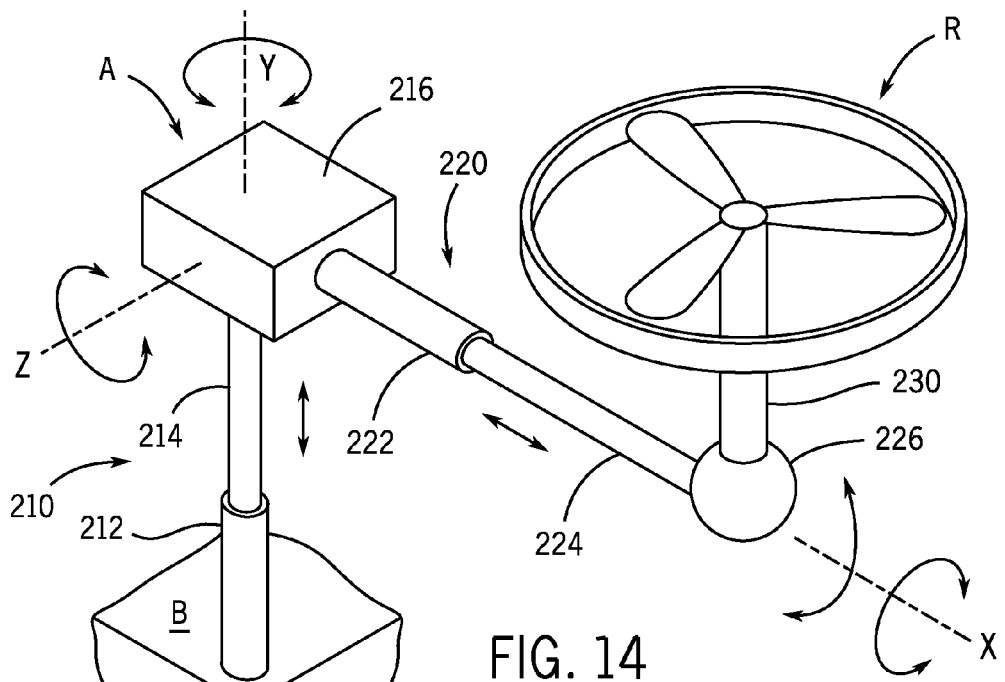
FIG. 14
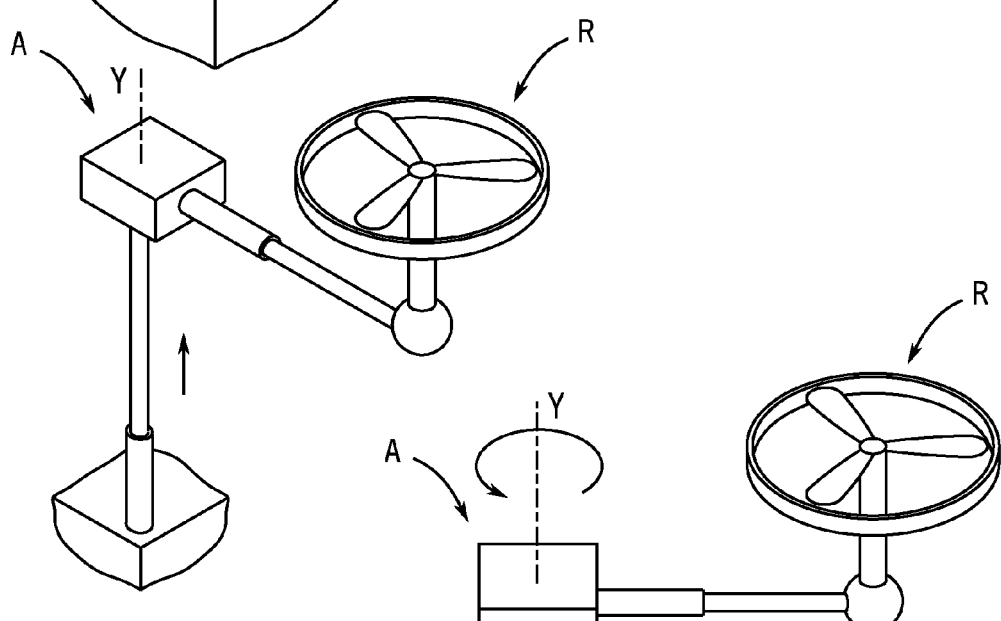
FIG. 15A
FIG. 15B

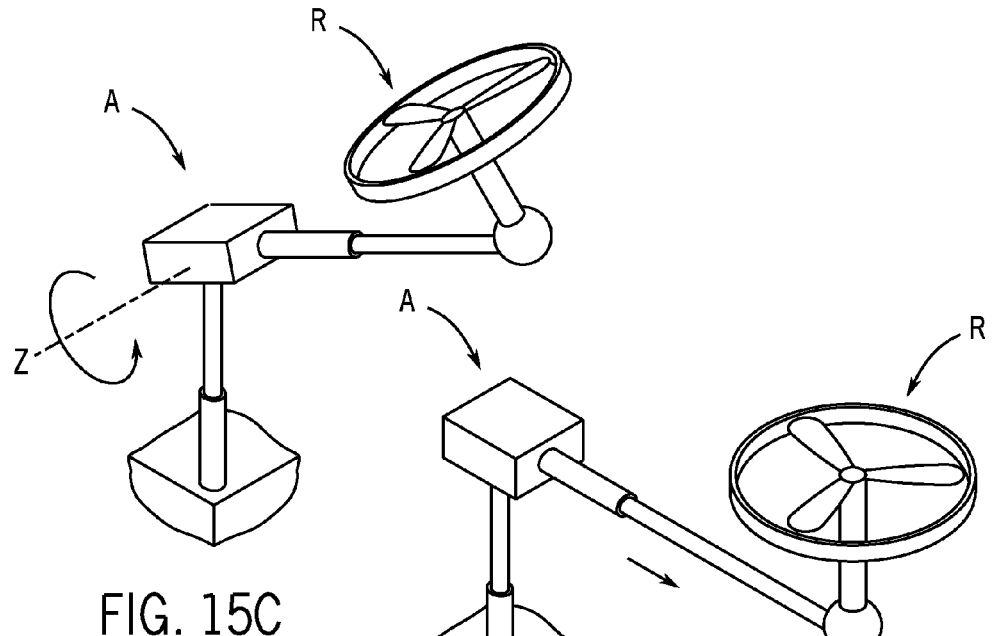
FIG. 15C
FIG. 15D
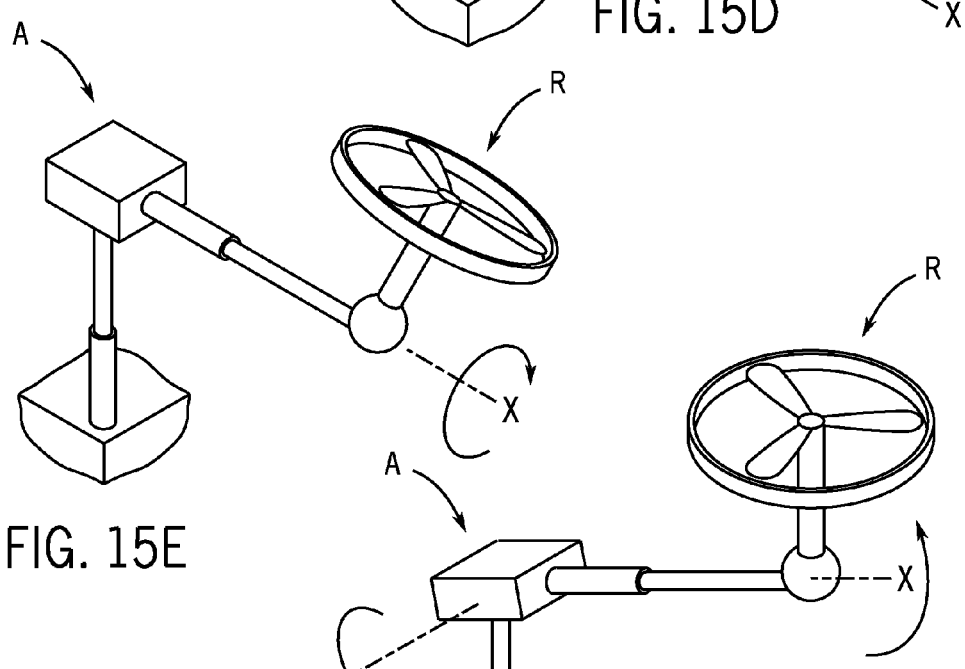
FIG. 15E
FIG. 15F

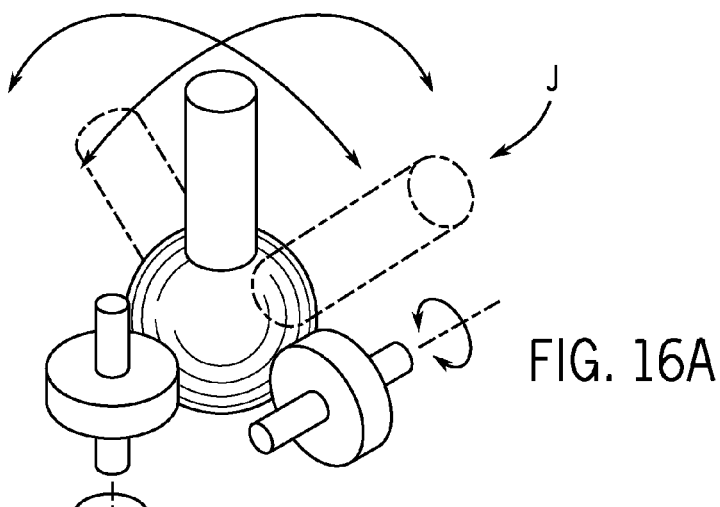
FIG. 16A
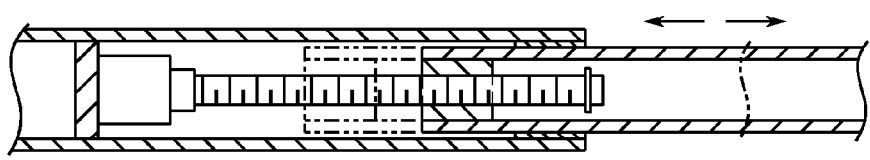
FIG. 16B
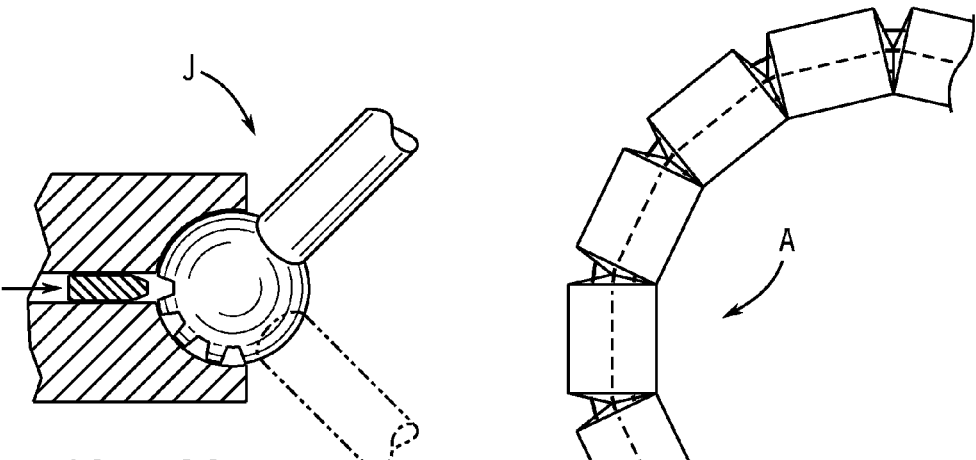
FIG. 16C
FIG. 16D

RECONFIGURABLE UNMANNED AIRCRAFT SYSTEM

If an Application Data Sheet (ADS) has been filed on the filing date of this application, it is incorporated by reference herein. Any applications claimed on the ADS for priority under 35 U.S.C. § § 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)).

PRIORITY APPLICATIONS

[None]

The present application constitutes a continuation of U.S. patent application Ser. No. 14/560,606, entitled RECONFIGURABLE UNMANNED AIRCRAFT SYSTEM, naming Alistair K. Chan, Jesse R. Cheatham III, Hon Wah Chin, William David Duncan, Roderick A. Hyde, Muriel Y. Ishikawa, Jordin T. Kare, Tony S. Pan, Robert C. Petroski, Clarence T. Tegreene, David B. Tuckerman, Thomas Allan Weaver, Lowell L. Wood, Jr. As inventors, filed 4 Dec. 2014, which is currently co-pending or is an application of which a currently co-pending application is entitled to the benefit of the filing date and is herein incorporated by reference in its entirety.

RELATED APPLICATIONS (a) U.S. patent application Ser. No. 14/501,302, titled SYSTEM AND METHOD FOR ADMINISTRATION AND MANAGEMENT OF AN AIRSPACE FOR UNMANNED AIRCRAFT, naming R. Hyde et al. as inventors, filed Sep. 30, 2014 is related to and incorporated by reference in the present application; (b) U.S. patent application Ser. No. 14/501,343, titled UNMANNED AIRCRAFT CONFIGURED FOR OPERATION IN A MANAGED AIRSPACE OF FLYWAY, naming R. Hyde et al. as inventors, filed Sep. 30, 2014 is related to and incorporated by reference in the present application; (c) U.S. patent application Ser. No. 14/501,365, titled SYSTEM AND METHOD FOR OPERATION OF UNMANNED AIRCRAFT WITHIN A MANAGED AIRSPACE OR FLYWAY, naming R. Hyde et al. as inventors, filed Sep. 30, 2014 is related to and incorporated by reference in the present application; (d) U.S. patent application Ser. No. 14/546,487, titled SYSTEM AND METHOD FOR MANAGEMENT OF AIRSPACE FOR UNMANNED AIRCRAFT, naming R. Hyde et al. as inventors, filed Nov. 18, 2014 is related to and incorporated by reference in the present application; (e) U.S. patent application Ser. No. TBD, titled SYSTEM AND METHOD FOR OPERATION AND MANAGEMENT OF RECONFIGURABLE UNMANNED AIRCRAFT, naming R. Hyde et al. as inventors, filed Dec. 4, 2014 is related to and incorporated by reference in the present application.

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

BACKGROUND

The present invention relates to a reconfigurable unmanned aircraft system. The present invention also relates to a reconfigurable unmanned aircraft configured to operate in an airspace. The present invention further relates to a system and method for configuring reconfigurable unmanned aircraft. The present invention further relates to a system and method for operation and management of reconfigurable unmanned aircraft in an airspace. The present inventions generally relate to improvements to unmanned aircraft and for unmanned aircraft systems and methods.

It is known to use unmanned aircraft (e.g. referred to as unmanned air/aerial vehicle (UAV), unmanned aircraft system (UAS) to include an operator/pilot at a remote location, drone, etc.). Such unmanned aircraft (UAV/craft or UAV/drone craft) at present exist in a wide variety of forms (shapes/sizes), types (e.g. winged craft, rotor-driven craft, etc.), propulsion systems (e.g. engines, thrust-production, etc.), capacities, etc., with a wide variety of capabilities, carrying capacities, control systems, telemetry systems, robustness, range, etc., and as exist at present are able to perform a wide variety of functions in military, commercial, and recreational applications. At present, the typical UAV/drone craft is significantly smaller than a typical manned aircraft and typically may lack the functionality of typical commercial aircraft; some UAV/drone craft have sophisticated on-board control systems; some UAV/drone craft are operated by pilots at remote stations with data communications and instrumentation/feedback from the craft; other UAV/drone craft may have relatively simple control systems (e.g. basic remote control by line of sight by the operator). Differences in use and operation of UAV/drone craft and typical manned aircraft allow for differences in design and other design variations that facilitate functionality modifications and enhancements for UAV/drone craft.

The size and form and operation of UAV/drone craft are different from typical commercial aircraft and may vary significantly between types of UAV/drone craft; UAV/drone craft may be provided in various forms, including in forms that range from relatively simple to relatively difficult to control in flight conditions (and in comparison to a typical manned aircraft). Airworthiness/robustness, controllability/telemetry, data communications and failure modes for UAV/drone systems may vary widely between UAV/drone craft and in comparison to manned aircraft. Costs to build/purchase and operate a UAV/drone system may vary widely between UAV/drone craft and in comparison to manned aircraft. UAV/drone craft may be configured to perform functions for which a manned aircraft is generally not suitable (for various reasons) such as local/light parcel delivery, surveillance/monitoring, communications, military/government action, etc. UAV/drone craft may be designed and constructed to have widely varied capabilities for widely varied functions. Some UAV/drone craft may be designed as "expendable" or for finite/one-time use; some UAV/drone craft may be designed for cost-efficiency and simplicity; other UAV/drone systems may be designed for lengthy useful lives in operation.

It is known to provide a UAV/craft for use in any of a wide variety of functions and operations including parcel/item delivery, monitoring/surveillance, data transmission/communications, hobby/entertainment, advertising/marketing, etc. Such known UAV craft are provided in a variety of types and forms of a basic type or sets of types. UAV/drone systems also have gained appeal in a segment of the recreation/hobby/toy industry.

One common form of UAV/craft is configured with a base and one or a set of rotors (e.g. to provide lift/thrust for propulsion) as in a conventional helicopter. It is known to design and construct such a UAV/craft in each of variety of designed arrangements given by a predetermined number of rotors, for example, with one rotor, two rotors, three rotors (tri-copter), four rotors (quad-copter), five rotors (penta-copter), six rotors (hexa-copter), eight rotors (octa-copter), etc.

Such known arrangements are by design and construction given a predetermined number of rotors in a predetermined position relative to the base; such existing arrangements are not configured to be modified after construction either in the number or placement of rotors; such UAV/craft are constructed for stable operation as configured in terms of rotor number/placement and do not comprise into use and operation as constructed. Such UAV/craft are by design/construction generally provided with a design capability (within an operating range) for thrust/life, carrying payload, etc. and other flight characteristics.

It is known to provide an aircraft (such as UAV/drone craft) that can be transformed in form by reconstruction, see for example, U.S. Patent Application Publication No. 20140263823 titled "Transformable Aerial Vehicle" and U.S. Pat. No. 7,922,115 titled "Modular Unmanned Air-Vehicle". However, such known UAV/drone craft have limitations in terms of transformability and/or functionality as implemented. For example, one method of transformation is to employ manual reconstruction of the arrangement of the UAV/craft, for example, rather than using a control/computing system. Such structures and systems for disassembly and/or reassembly of a UAV/craft in implementation do not fully achieve available benefits of efficiency and performance if such structures and system for UAV/craft require manual intervention and/or substantial time to implement a transformation.

One failure mode for UAV/craft is the failure of a rotor (e.g. malfunction of a rotor mechanism or motor/engine for a rotor/rotor system). If a UAV/craft suffers the malfunction/failure of a rotor and is not able to operate (e.g. to retain lift/thrust without the rotor), the likely result is that the UAV craft will be disabled or inoperable (and if failure occurs in flight the UAV/craft may crash land and/or be lost). Such known UAV/craft may or may not be able to operate functionally without one or more rotors out of operation; any capability of transformation that such known UAV/craft may have is not as completely useful in a real-time situation of a rotor failure or rotor malfunction if the UAV/craft is unable to perform without service/attention at a station (e.g. manual transformation/servicing at a station).

In use a UAV/craft may be called upon to carry payload/cargo that is of a varied type or form; such payload may be widely varied in mass, size, form or shape, etc. Payload that is asymmetrical and/or that is not readily able to be symmetrically located (in/on/under the base) relative to the rotors may present mass balance difficulties for a UAV/craft; the presence of an asymmetrical cargo may cause imbalances with respect to the rotors and may affect stability, efficiency or possibly operability of the UAV/craft. Payload may be multi-component (e.g. multiple items) or have large mass; payload may be light-weight and flexible; payload may comprise fluid (e.g. subject to leaks, etc.) or solids (e.g. subject to shifting in position). Depending upon how the payload is carried, a payload may provide inertia effects (e.g. lagging, swinging, sliding, etc.) in flight. Balancing the payload/cargo with respect to the rotors of a multi-rotor UAV/craft may present difficulties in deployment of the UAV/craft (e.g. require surplus weight/mass and/or division/disassembly of the items in the payload or other such action) before the UAV/craft may begin the mission.

SUMMARY

Accordingly, it would be advantageous to provide a reconfigurable unmanned aircraft system. It would also be advantageous to provide a reconfigurable unmanned aircraft configured to operate in an airspace. It would further be advantageous to provide a system and method for configuring a reconfigurable unmanned aircraft. It would further be advantageous to provide a system and method for operation and management of a reconfigurable unmanned aircraft in an airspace.

The present invention relates to an aircraft for unmanned flight that is selectively reconfigurable to modify flight characteristics. The aircraft comprises a base, a first rotor on a first boom coupled to the base, a second rotor on a second boom coupled to the base, and a third rotor on a third boom coupled to the base. Position of at least one rotor relative to the base can be modified by at least one of translation of the rotor relative to the boom; pivoting of the boom relative to the base; translation of the boom relative to the base. Flight characteristics can be modified by configuration and reconfiguration of position of at least one rotor relative to the base.

The present invention relates to a selectively reconfigurable aircraft for unmanned flight providing flight characteristics. The aircraft comprises a base, a first rotor on a first boom coupled to the base, and a second rotor on a second boom coupled to the base. Position of the first rotor relative to the base can be modified by at least one of translation of the rotor relative to the boom; pivoting of the boom relative to the base; translation of the boom relative to the base. Position of the second rotor relative to the base can be modified by at least one of translation of the rotor relative to the boom; pivoting of the boom relative to the base; translation of the boom relative to the base. Flight characteristics can be modified by reconfiguration of the position of at least one rotor relative to the base.

The present invention relates to a method of reconfiguring selectively reconfigurable aircraft for unmanned flight. The method comprises the steps of positioning a first rotor on a first boom coupled to the base, positioning a second rotor on a second boom coupled to the base, and modifying the position of at least one rotor relative to the base. Position of the rotor relative to the base can be modified by at least one of translation of the rotor relative to the boom; pivoting of the boom relative to the base; translation of the boom relative to the base. Flight characteristics can be modified by reconfiguration of the position of at least one rotor relative to the base.

The present invention relates to a method of reconfiguring selectively reconfigurable aircraft for unmanned flight having a set of rotors configured to provide lift for propulsion with at least one rotor that is at least partially malfunctioning. The method comprises the steps of identifying the rotor that is malfunctioning, identifying at least one rotor that is able to function and is in an initial position, and repositioning the at least one rotor that is able to function from the initial position to a reconfigured position. The at least one functional rotor when after reconfiguration in the reconfigured position is able to compensate for the loss of function of the malfunctioning rotor.

The present invention relates to a method of operating a reconfigurable multi-rotor unmanned aircraft with each rotor in a rotor position on a movable boom relative to a base of the aircraft for flight on a mission to provide intended flight characteristics in operating conditions. The method comprises the steps of configuring the aircraft in first configuration with intended flight characteristics for ascent to start a flight and configuring the aircraft in a second configuration with intended flight characteristics for flight in operating conditions. The first configuration comprises a first rotor position for at least one rotor. The second configuration comprises a second rotor position for at least one rotor. Position of at least one rotor relative to the base can be modified by at least one of translation of the rotor relative to the boom; pivoting of the boom relative to the base; translation of the boom relative to the base.

The present invention relates to a method of configuring an aircraft having a set of repositionable rotors for unmanned flight on a mission to carry a payload from an initial configuration into a configuration for the mission. The method comprises the steps of determining properties of the payload including at least mass properties, determining the manner in which the payload will be coupled to the aircraft, determining a configuration for the mission for each of the rotors in the set of rotors at least partially in consideration of the properties of the payload, and positioning the set of rotors into the configuration for the mission for the aircraft to perform the mission.

The present invention relates to a method of reconfiguring a selectively reconfigurable unmanned aircraft having a first rotor on a first boom coupled to a base and a second rotor on a second boom coupled to the base for a mission to carry a payload. The method comprises the steps of determining the effect of the payload on flight characteristics and modifying the position of at least one rotor relative to the base. Position of the rotor relative to the base can be modified by at least one of translation of the rotor relative to the boom; pivoting of the boom relative to the base; translation of the boom relative to the base. Flight characteristics can be modified by reconfiguration of position of at least one rotor relative to the base.

The present invention relates to a method of operating a reconfigurable multi-rotor unmanned aircraft having flight characteristics for a mission comprising flight with payload in operating conditions. The method comprises the steps of configuring the aircraft in an ascent configuration with flight characteristics for ascent to start a flight and configuring the aircraft in a first flight configuration with flight characteristics for flight in operating conditions. Configuring the aircraft comprises positioning of at least one rotor of the aircraft into the configuration. Flight characteristics of the aircraft include consideration of properties of any payload carried by the aircraft.

The present invention relates to a selectively reconfigurable aircraft for unmanned flight with payload providing flight characteristics. The aircraft comprises a base, a first rotor on a first boom coupled to the base, a second rotor on a second boom coupled to the base, and a monitoring system configured to monitor conditions of the aircraft including any payload. The payload comprises properties. Position of the first rotor relative to the base can be modified by at least one of translation of the rotor relative to the boom; pivoting of the boom relative to the base; translation of the boom relative to the base. Position of the second rotor relative to the base can be modified by at least one of translation of the rotor relative to the boom; pivoting of the boom relative to the base; translation of the boom relative to the base. Flight characteristics can be modified by reconfiguration of the position of at least one rotor relative to the base.

The present invention relates to a method of managing a fleet of reconfigurable aircraft of a type having a set of rotors to provide thrust for unmanned flight to perform a set of missions. The method comprises the steps of configuring a first aircraft in a first configuration to perform a first mission and configuring a second aircraft in a second configuration to perform a second mission. The first aircraft is substantially the same as the second aircraft. Configuration of an aircraft comprises positioning at least one rotor of the set of rotors of the aircraft to provide for intended flight characteristics. Each of a plurality of aircraft in the fleet can be configured in a configuration to perform each of a plurality of missions.

The present invention relates to a selectively reconfigurable aircraft for unmanned flight providing flight characteristics. The aircraft comprises a base, a first rotor on a first boom coupled to the base, and a second rotor on a second boom coupled to the base. Position of the first rotor relative to the base can be modified by at least one of translation of the rotor relative to the boom; pivoting of the boom relative to the base; translation of the boom relative to the base. Position of the second rotor relative to the base can be modified by at least one of translation of the rotor relative to the boom; pivoting of the boom relative to the base; translation of the boom relative to the base. The first rotor and the second rotor are coupled so the first rotor and the second rotor can be repositioned in coordinated movement relative to the base. Flight characteristics can be modified by reconfiguration of the position of at least one rotor relative to the base.

The foregoing summary is illustrative only and is not intended to be in any way limiting. In addition to the illustrative aspects, embodiments, and features described above, further aspects, embodiments, and features will become apparent by reference to the drawings and the following detailed description.

FIGURES

FIGS. 5A to 5E are schematic plan views of an aircraft with reconfigurable arm/boom system according to an embodiment.

FIGS. 6A to 6E are schematic plan views of an aircraft with reconfigurable arm/boom system according to an embodiment.

FIGS. 9A to 9D are schematic elevation views of a rotor system with reconfigurable arm/boom system for an aircraft according to an embodiment.

FIG. 14 is a schematic perspective view of an arm/boom system for a rotor system for an aircraft according to an embodiment.

FIGS. 15A to 15F are schematic perspective views of an arm/boom system for a rotor system for an aircraft according to an embodiment.

FIGS. 16A to 16D are schematic diagrams of mechanisms for an arm/boom system for a rotor system for an aircraft according to various embodiments.

DESCRIPTION

A reconfigurable unmanned aircraft system is disclosed according to exemplary and alternative embodiments. The system comprises a reconfigurable unmanned aircraft configured to operate in an airspace. A system and method for configuring a reconfigurable unmanned aircraft and a system and method for operation and management of a reconfigurable unmanned aircraft in an airspace are also disclosed according to an exemplary and alternative embodiments.

Referring to FIGS. 1 to 23C, a selectively reconfigurable aircraft (shown as a UAV/craft V) for unmanned flight is shown representationally and schematically according to exemplary embodiments. According to the exemplary embodiments, the UAV/craft is reconfigurable to modify flight characteristics in response to operating conditions under management and control of a system as indicated representationally and schematically in FIGS. 24-29. Methods of use and operation of the UAV/craft and UAV/craft system are shown representationally and schematically according to exemplary embodiments in FIGS. 30 to 36B.

Reconfigurable UAV/Craft—Introduction

According to exemplary embodiments shown in the FIGURES, the reconfigurable UAV/craft is an aircraft generally of a "helicopter" type with an aircraft/space frame or base and structure such as members (e.g. arms or booms) each providing for attachment of a rotor. See FIGS. 1-2. In operation (e.g. as for a "helicopter" type aircraft) the rotors generate thrust and lift to propel the aircraft (including with any payload) under the direction of a control system; as indicated, the reconfigurable UAV/craft comprises a set of rotors to generate thrust and lift. See FIGS. 1, 2, 3A-D.

According to an exemplary embodiment, the UAV/craft may be of any suitable type or basic form of "helicopter" used for unmanned flight and provided (as necessary or useful) with any/all associated aircraft systems. Representative aircraft systems are known and described, for example, in (among other literature) patent documents such as (a) U.S. Pat. No. 8,775,013 titled "System and Method for Acoustic Signature Health Monitoring of Unmanned Autonomous Vehicles (UAVS)"; (b) U.S. Patent Application Publication No. 20140129059 titled "Method and Apparatus for Extending the Operation of an Unmanned Aerial Vehicle"; (c) U.S. Patent Application Publication No. 2014/0263823 titled "Transformable Aerial Vehicle"; and (d) U.S. Pat. No. 7,922,115 titled "Modular Unmanned Air-Vehicle".

According to an exemplary embodiment shown representationally and schematically in the FIGURES, the aircraft comprises a base B with a rotor system providing a set of rotors R on an arm/boom system A coupled to the base. See e.g. FIGS. 1-2 and 4A-B. According to exemplary and alternative embodiments of the UAV/craft, flight characteristics of the UAV/craft can be modified by reconfiguration of the position of at least one rotor relative to the base. See e.g. FIGS. 4A-C, 5A-E, 5A-E, 10A-B, 11A-H and 13A-C.

Figure 10A:
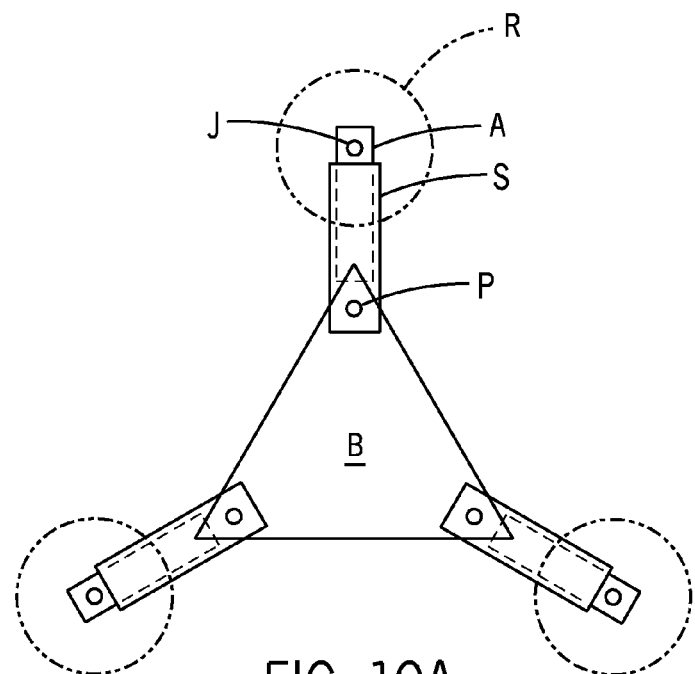
FIGS. 10A to 10B are schematic plan views of an aircraft with reconfigurable arm/boom system according to an embodiment.

According to an exemplary embodiment, position of a rotor relative to the base of the UAV/craft can be modified by at least one of (1) translation of the rotor relative to the boom (e.g. FIGS. 10A, 14); (2) pivoting of the boom relative to the base (e.g. FIGS. 4B, 14); (3) translation of the boom relative to the base (e.g. FIGS. 6B, 14); (4) retraction of the boom relative to the base (e.g. FIGS. 9C, 14); (5) pivoting of the rotor relative to the boom (e.g. FIGS. 14, 15F); (6) raising the height of the boom relative to the base (e.g. FIGS. 11B, 14); (7) lowering the height of the boom relative to the base (e.g. FIGS. 11D, 14); (8) rotation of the rotor relative to the boom (e.g. FIGS. 11C, 14); (9) rotation/twist of the boom relative to the base (e.g. FIG. 15E). See generally FIGS. 6A-E, 11A-H, 13A-C, 14 and 15A-F.

As indicated, movement of position of a rotor of the UAV/craft can be referenced within a polar or Cartesian or orthogonal axis system respect to at least one of a (a) longitudinal direction or axis (x), (b) vertical direction or axis (y), or (c) lateral direction or axis (z). See e.g. FIG. 14 (indicating representative axis system orientation according to an exemplary embodiment).

Figures 12A, 12B, 12C:
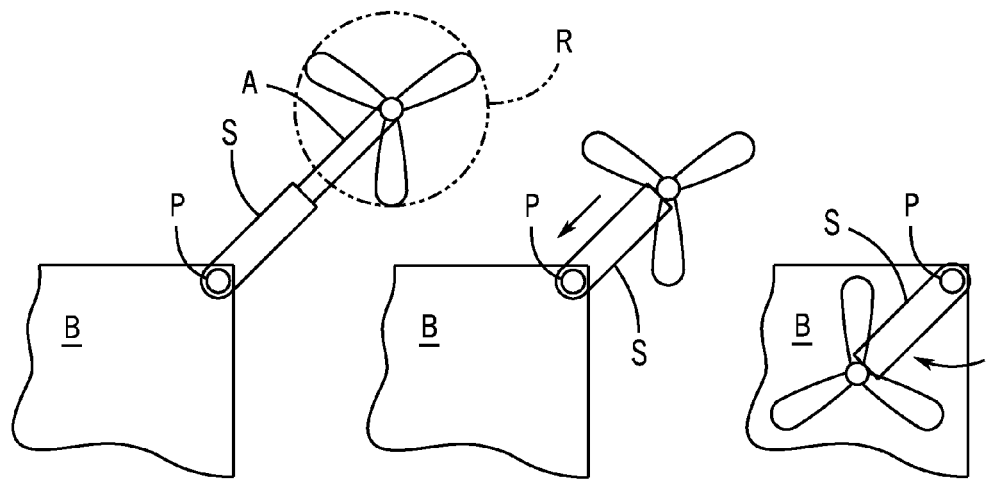
FIGS. 12A to 12C are schematic elevation views of a rotor system with reconfigurable arm/boom system for an aircraft according to an embodiment.
Figures 13A, 13B:
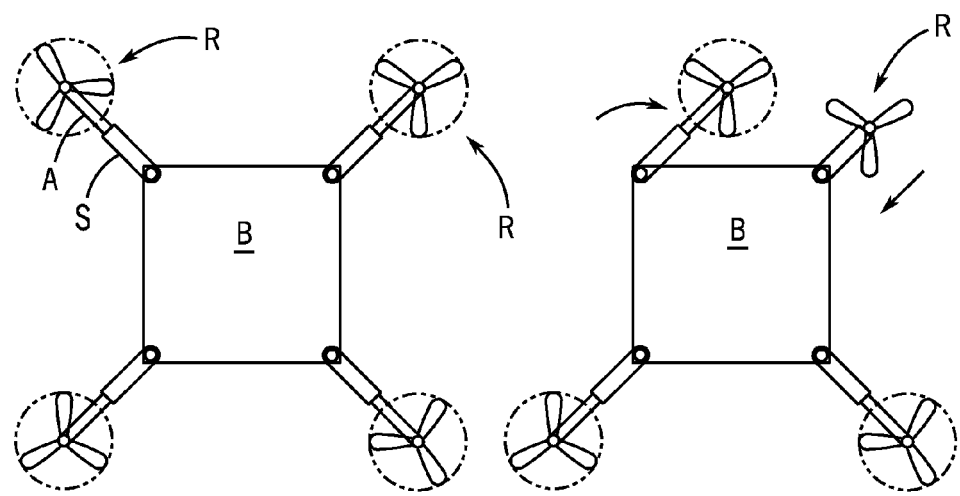
FIGS. 13A to 13C are schematic plan views of an aircraft with reconfigurable arm/boom system according to an embodiment.
Figure 13C:
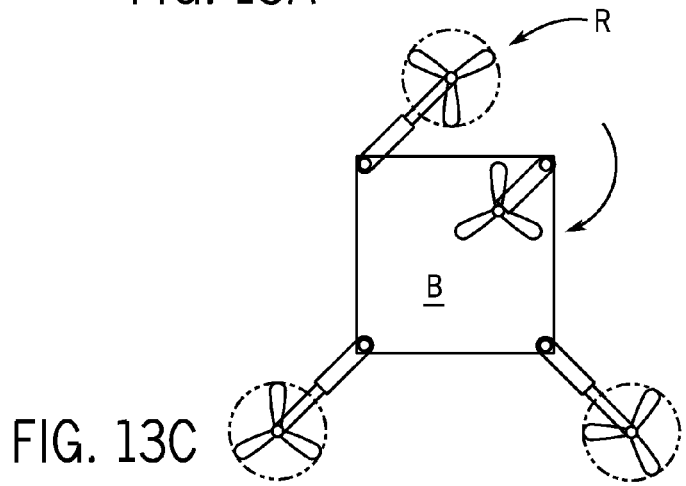

As shown representationally and schematically according to an exemplary embodiment, the position of a rotor relative to the base (and/or relative to another rotor or rotors) of the UAV/craft can be modified by at least two coordinated movement/motions of the arm/boom (e.g. FIGS. 12A-C). The position of a rotor relative to the base can be modified by at least one coordinated motion of the rotor and the arm/boom (e.g. FIGS. 9A-D). The coordinated motion may be substantially simultaneous or sequential (or in another manner). According to an exemplary embodiment, position of a rotor relative to the base (and/or relative to another rotor or rotors) of the UAV/craft can be modified by coordinated movement/motion of multiple rotors and/or multiple arms/booms (e.g. FIGS. 23A-C).

Reconfigurable UAV/Craft

Figure 1:
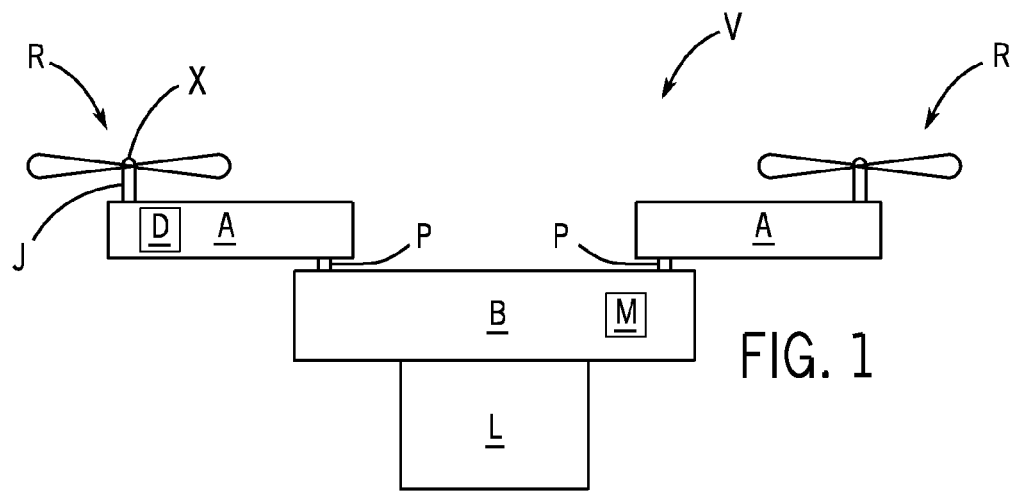
FIG. 1 is a schematic elevation view of a rotor system with reconfigurable arm/boom system for an aircraft according to an embodiment.
Figure 2:
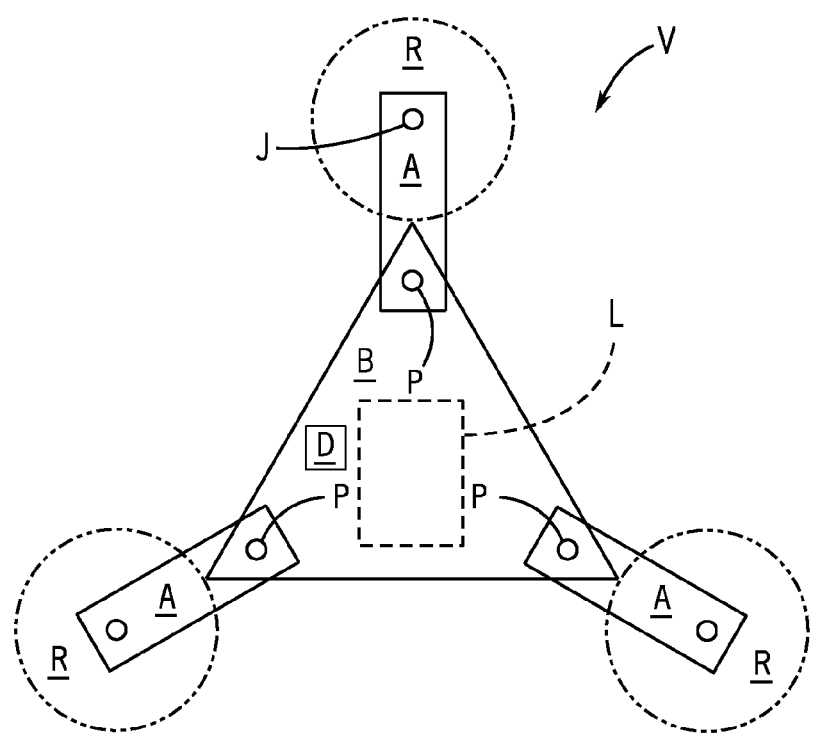
FIG. 2 is a schematic plan view of an aircraft with reconfigurable arm/boom system according to an embodiment.

Referring to FIGS. 1 and 2, a reconfigurable UAV/craft V (aircraft) is shown representationally and schematically according to an exemplary embodiment. The UAV/craft comprises a body or base/frame structure shown representationally and schematically as base B and a set of members or arm/frame structures (e.g. space frame constructed from a member or members) shown representationally and schematically as arm/boom A. According to an exemplary embodiment, the UAV/craft operates as a "helicopter" aircraft with a set of rotors each shown representationally and schematically as rotor R that in operation generate lift and thrust to propel the UAV/craft during flight/use.

As indicated, the flight characteristics of the reconfigurable UAV/craft are provided by (among other things) the positioning/relative positioning of each rotor in the rotor system; flight characteristics of the reconfigurable UAV/craft may be modified by positioning/repositioning the rotor system of the UAV/craft; after repositioning the reconfigured UAV/craft may have modified flight characteristics (e.g. suited for a particular function/operating conditions). See e.g. FIGS. 10A-B, 17A-C, 18A-B, 19A-B, 20A-C, 21A-D, 22A-C and 23A-C.

According to an exemplary embodiment, as shown representationally and schematically in FIGS. 1 and 2, the UAV/craft V is configured to carry a payload L (e.g. in or on or under or within or attached to the base); as shown schematically in FIG. 1, payload L is located under base B of UAV/craft V; as shown schematically in FIG. 2, payload L is located (at least partially) within base B (e.g. in a payload/cargo compartment) of UAV/craft V. See also FIGS. 20A-C and 21A-D (e.g. example payload carrying configurations for UAV/craft).

According to an exemplary embodiment, the UAV/craft may be provided in any of a wide variety of shapes and forms (including shapes/forms of aircraft that have been used or are presently in use or may be put into use in the future). According to any preferred embodiment, the UAV/craft is configured with a plurality of operational rotors positioned relative to base to provide for safe/stable and efficient control/management and operation of the UAV/craft in expected operating conditions. See e.g. FIGS. 1, 2, 4A-C, 5A-E, 6A-E, 22A-C, 23A-C, 25 and 30-36B.

Figure 4A:
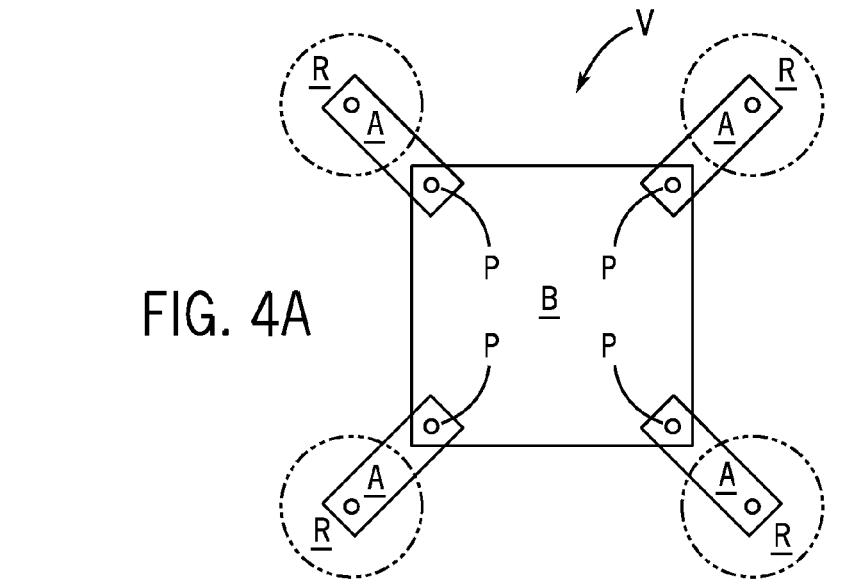
FIGS. 4A to 4C are schematic plan views of an aircraft with reconfigurable arm/boom system according to an embodiment.
Figure 6A:
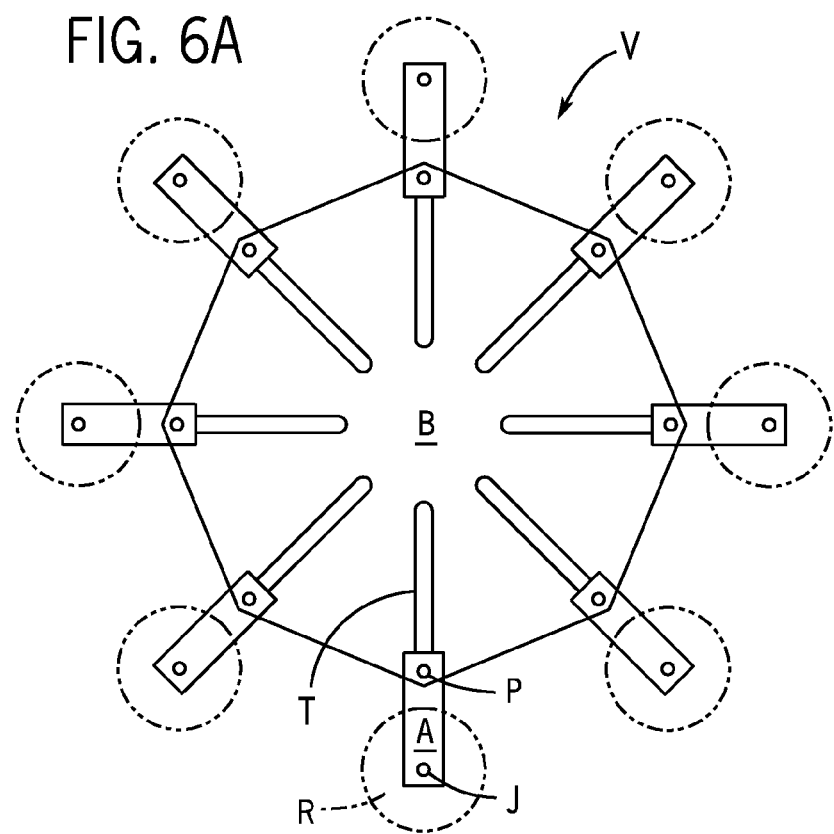

According to an exemplary embodiment, as shown representationally and schematically in FIG. 2, the UAV/craft is provided in the form of a tri-copter (three rotors); as shown representationally and schematically in FIG. 4A, the UAV/craft may be provided in the form of a quad-copter (four rotors); as shown representationally and schematically in FIG. 5A, the UAV/craft may be provided in the form of a penta-copter (five rotors); as shown representationally and schematically in FIG. 6A, the UAV/craft may be provided in the form of a octa-copter (eight rotor). According to exemplary embodiments shown representationally and schematically, the UAV/craft may be provided and/or operated in a form of a hexa-copter (six rotors, see e.g. FIG. 22B) or septa-copter (seven rotors, see e.g. FIG. 6B) or in any of a wide variety of other forms with additional rotors (e.g. ten rotors, twelve rotors, etc.). (According to an exemplary embodiment, the UAV/craft may be constructed with additional rotors provided in the rotor system.) As indicated, according to any exemplary embodiment at least one of the rotors of the rotor system of the reconfigurable UAV/craft will be a repositionable rotor.

According to an exemplary embodiment, the UAV/craft may be configured to perform any of a wide variety of functions including but not limited to carrying a payload such as for parcel/item delivery, monitoring/surveillance, data transmission/communications, hobby/entertainment, advertising/marketing, etc. According to an exemplary embodiment, the UAV/craft may be provided in any of a wide variety of configurations for any of a wide variety of functions and operated and/or controlled by any of a wide variety of systems as presently known and used in the art or as may be known and used in the art in the future. See generally FIGS. 1, 2, 4A-6D, 21A-23C, and 24-28B. The system and method of the present application as shown and described representationally and schematically, can be adapted and implemented for use with any such UAV/craft according to the exemplary embodiments and according to other/alternative embodiments.

As shown representationally and schematically according to an exemplary embodiment in FIGS. 1-2 and FIGS. 3A through 3D, the UAV/craft comprises a rotor system with at least one rotor assembly R. According to an exemplary embodiment, the rotor assembly/system R comprises a fan (turbo fan) having a set of blades or vanes N (see FIGS. 3A-B) by delivery of power from a power plant (e.g. at the rotor/arm system and/or with base B as part of an energy/power system such as shown representationally and schematically in FIG. 25) under direction of a control system for the aircraft (see FIGS. 24-28B). According to an exemplary embodiment, the rotor system may be provided in any of a wide variety of forms/types and arrangements such as presently known and in use or developed in the future; each rotor may have any of a wide variety of number and type of blades/vanes. As shown schematically in FIGS. 3A and 3B the rotor may be provided with "open" blades/vanes (see FIG. 3A), or may be provided with a rim or protective structure shown as rim system M (see FIG. 3B). According to an exemplary embodiment, the rotor may have fixed blades/vanes (e.g. of a set number/design) or may have adjustable blades/vanes (e.g. embodying an arrangement adapted from U.S. Pat. No. 2,473,134 titled "Adjustable Rotor Blade" (e.g. FIGS. 1-4) and U.S. Pat. No. 2,844,207 titled "Adjustable Fan Blade Assembly" (e.g. FIGS. 1-3)); adjustment of the pitch/position of blades/vanes of a rotor (apart of in addition to the tilt/attitude of a rotor) in the rotor system of the UAV/craft may provide for adjustment of flight characteristics of the UAV/craft (alone or in combination with reconfiguration of rotor position).

Figure 3A:
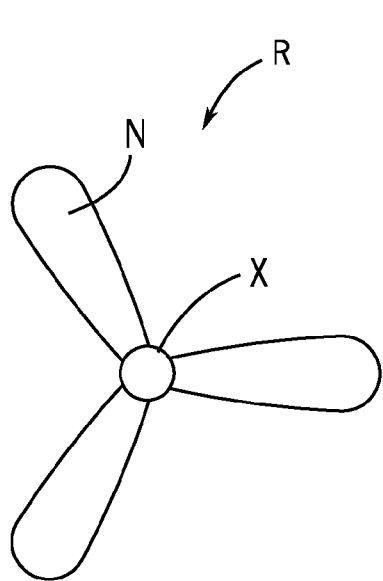
FIGS. 3A to 3D are schematic plan views of a rotor system for an aircraft according to an embodiment.
Figure 3B:
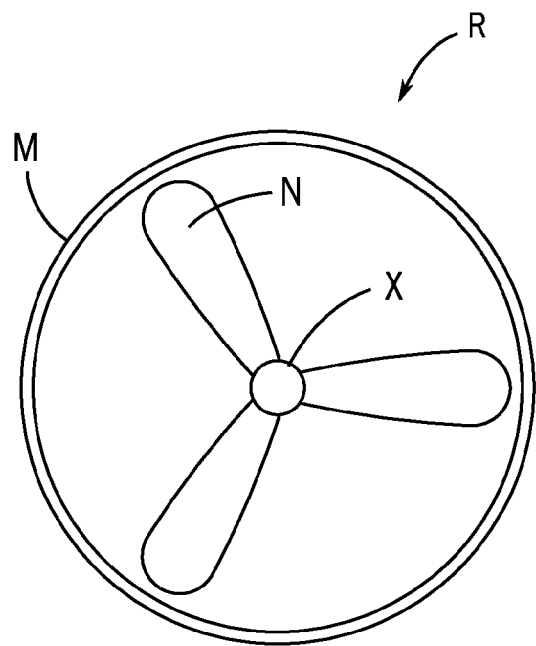
Figure 3C:
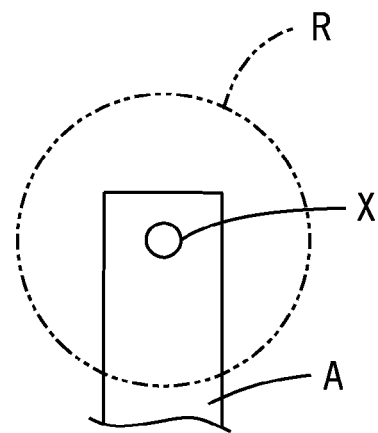
Figure 3D:
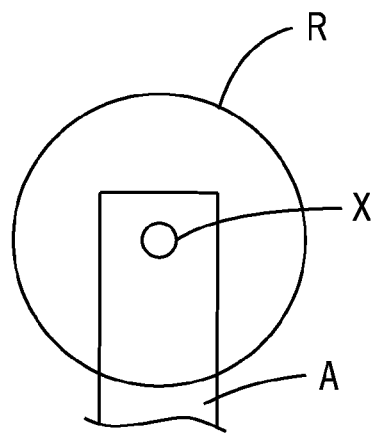

Referring to FIGS. 3C and 3D, as indicated representationally and schematically a rotor may be in operation (see FIG. 3C) (indicated by a circle in broken line) or a rotor may be stopped/inoperable (see FIG. 3D) (indicated by a circle in solid line); according to an exemplary embodiment, when a rotor is in operation it is configured to generate lift and thrust to facilitate (along with each other operating rotor) propulsion so that the UAV/craft can take flight to perform a function or mission. See generally FIGS. 30-36B.

According to an exemplary embodiment, the rotor system of the UAV/craft may be driven by an electric motor or other type of power plant (e.g. as known and used presently); the base of the UAV/craft may comprise the power plant and other associated systems providing for operation of the rotors according to an exemplary embodiment (see FIGS. 1, 2 and 25); associated with the power plant will be an energy/energy storage system such as a battery system and/or fuel storage (and/or fuel cell, solar panel/array, etc.); according to an alternative embodiment, the UAV/craft may comprise a hybrid energy/power system comprising at least two different subsystems (e.g. fuel/electric, etc.). According to any preferred embodiment, the UAV/craft will comprise a power/energy system as can be used to power and control rotational speed/thrust of rotor as well as to power and control mechanisms/subsystems used to configure the UAV/craft (e.g. position/reposition rotors/arms, etc.) and other on-board systems (e.g. control/computing systems, data/network communications, etc.).

As indicated representationally and schematically according to an exemplary embodiment shown generally in FIGS. 2 and 24-36B, the control system and power plant (e.g. motor, engine, etc.) are configured to operate the rotors of the rotor system of the UAV/craft at a speed that facilitates control and operation of the UAV/craft (with energy provided by an energy supply/storage such as a battery system, fuel supply, energy generation system, etc.). According to an exemplary embodiment, the UAV/craft is driven by electric motors with a battery system as the energy storage/supply. See also FIGS. 25 and 28B.

Referring to FIGS. 1, 2, 4A-D, 5A-E and 6A-E, arrangements for a reconfigurable UAV/craft are shown representationally and schematically according to exemplary embodiments. As shown representationally and schematically in FIGS. 1 and 2, aircraft V has rotors R each provided on a boom/arm A coupled to base B at (e.g. by) a mechanism shown schematically as joint P configured to allow boom A and rotor R to be positioned and repositioned relative to base B, for example, by rotation/movement (see FIGS. 4B-C, 5B-E) and/or translation/movement (see FIGS. 6B/C/D). As indicated representationally and schematically in FIGS. 1, 2, 4A-C, 5A-E and 6A-D, according to an exemplary embodiment by the positioning and repositioning of arms/booms A with rotors R relative to the base B (as well as to other rotors) the UAV/craft V can be configured and reconfigured in a wide variety of forms (providing modified flight characteristics for one or more functions/purposes in operating conditions). See also FIGS. 10A-B, 11A-H, 18A-B, 19A-B, 21A-D, 22A-C, 23A-C and 30-36B.

Figure 4B:
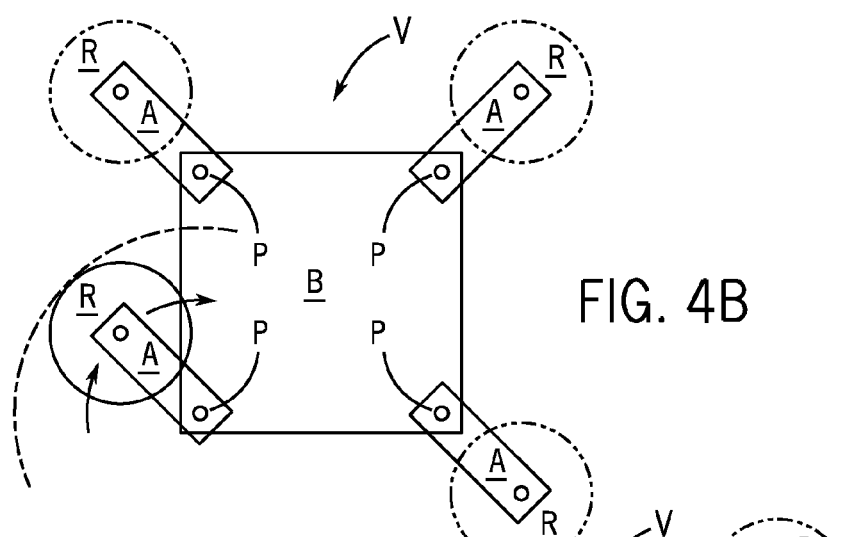
Figure 4C:
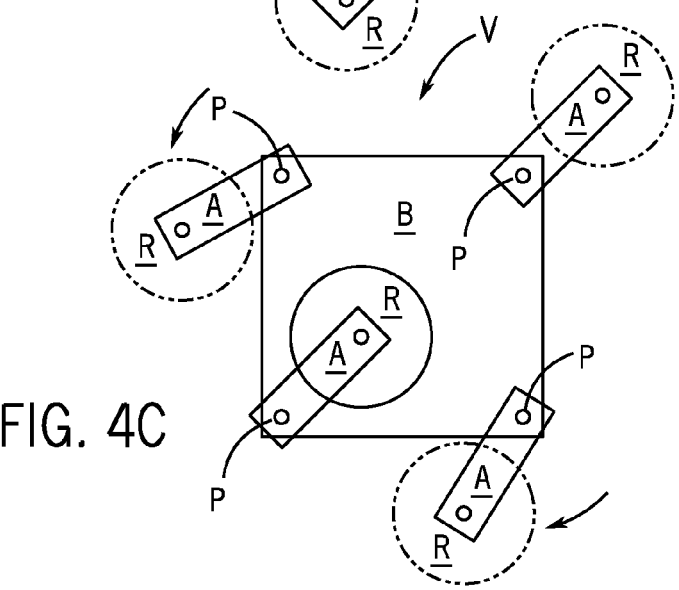

For example, as shown representationally and schematically in FIG. 4A, the UAV/craft is configured and operating as a quad-copter; as shown representationally and schematically in FIGS. 4B and 4C, the UAV/craft is reconfigured by repositioning of arms/booms A and rotors R to operate as a tri-copter (e.g. with one arm/boom and rotor taken out of operation and stowed or refracted at the base).

As shown representationally and schematically in FIG. 5A, the UAV/craft is configured and operating as a penta-copter; as shown representationally and schematically in FIGS. 4B and 5C, the UAV/craft is reconfigured by repositioning of arms/booms A and rotors R to operate as a quad-copter (e.g. with one arm/boom and rotor taken out of operation and stowed or retracted at the base); as shown representationally and schematically in FIGS. 5D and 5E, the UAV/craft is reconfigured by repositioning of arms/booms A and rotors R to operate as a tri-copter (e.g. with two arms/booms and rotors taken out of operation and stowed or retracted at the base).

Figure 6B:
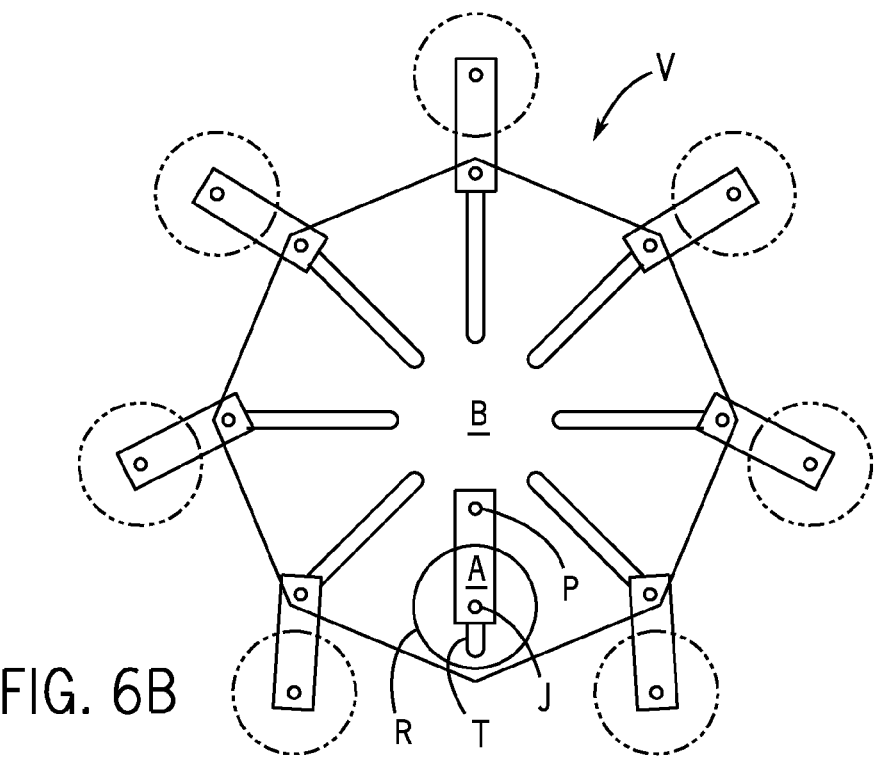
Figure 7A:
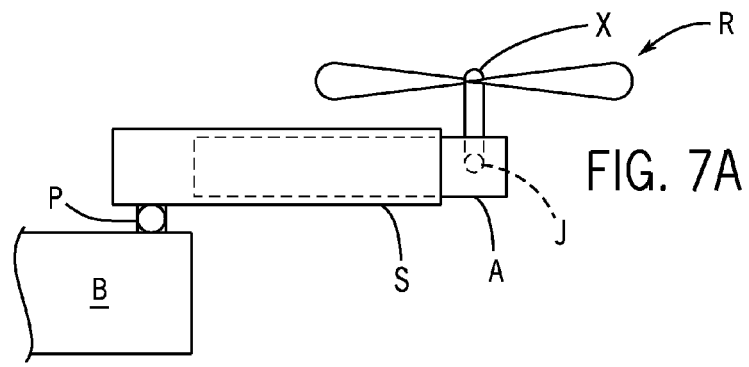
FIGS. 7A to 7D are schematic elevation views of a rotor system with reconfigurable arm/boom system for an aircraft according to an embodiment.
Figure 7B:
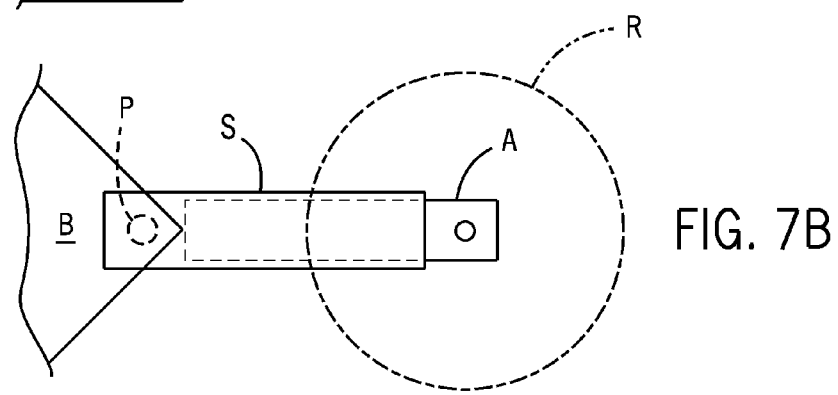
Figure 7C:
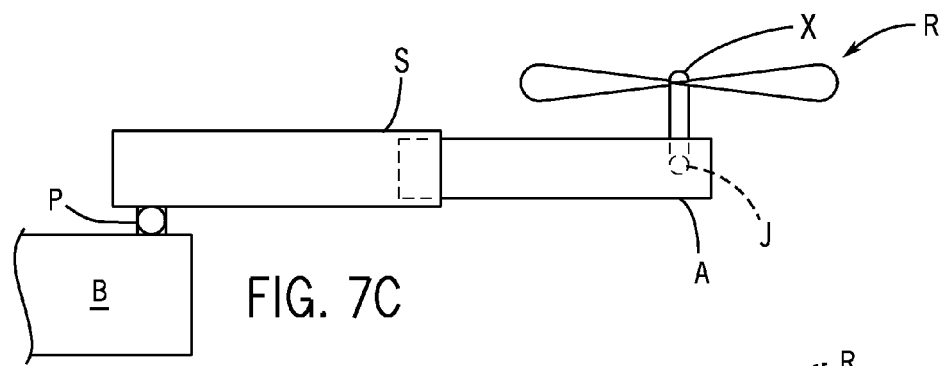
Figure 7D:
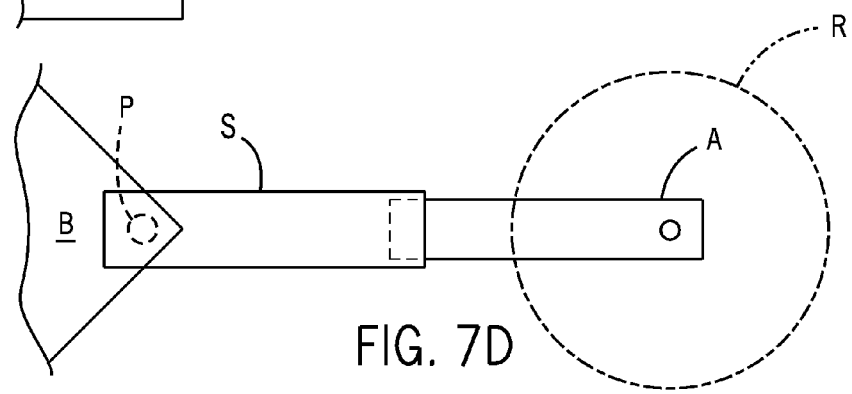

As shown representationally and schematically in FIG. 6A, the UAV/craft is configured and operating as an octa-copter; as shown representationally and schematically in FIG. 6B, the UAV/craft is reconfigured by repositioning of arms/booms A and rotors R to operate as a septa-copter; as shown representationally and schematically in FIGS. 6C and 6D; the UAV/craft is reconfigured by repositioning of arms/booms A and rotors R to operate in each of two different configurations of a hexa-copter. (As shown schematically in FIG. 6E, the UAV/craft may be configured in a relatively compact stowed or storage configuration with all arms/booms A and rotors retracted.)

As indicated representationally and schematically according to an exemplary embodiment in FIGS. 4A-C, 5A-E and 6A-D, reconfiguration of the UAV/craft may comprise coordinated repositioning of both the operational rotors and the non-operational rotors both relative to the base and relative to other rotors. For example, as indicated in FIGS. 4A to 4C, as the non-operational rotor is retracted (e.g. rotated at joint P) operational rotors may be repositioned (e.g. rotated at joint P) to compensate (e.g. some or all operational rotors may be moved into a position to provide compensatory lift/thrust, mass property balancing, etc. in the absence of lift/thrust and mass that would otherwise be provided by the non-operational rotors before reconfiguration); as indicated in FIGS. 6A to 6B, as the non-operational rotor is retracted (e.g. translated on track T with base B), operational rotors are repositioned (e.g. rotated at joint P) to compensate (e.g. for balance and thrust). See also FIGS. 5A, 5B-C and 5D-E; FIGS. 6A to 6C-D. As indicated according to an exemplary embodiment, in FIGS. 6A-E, operational rotors may also be repositioned by translation or track T and/or rotation at joint P. (As indicated representationally and schematically in the FIGURES, movement of components of the arm/boom system and rotor system may be performed in an independent and/or coordinated manner and fully and/or partially within the available range of motion as desire under control of a control system, see FIGS. 24-36B.) In coordination with the repositioning of one or more rotors, the rotational speeds of one or more rotors may also be changed when a rotor becomes inoperable. Such rotor speed adjustments may, for example, be chosen so that the net rotor torque applied to the UAV/craft remains at or near zero despite loss of torque from the inoperable rotor. In some situations, a UAV/craft may respond to a situation where one rotor becomes inoperable by deliberately turning off an additional rotor; e.g., a hexa-copter which loses use of one rotor may prefer operation as a quad-copter to that as a penta-copter.

According to an exemplary embodiment as shown representationally and schematically in FIGS. 7A-D, 8A-F and 9A-D, any of a wide variety of mechanisms and motors may be employed to position and reposition the rotors of the UAV/craft. See also FIGS. 14 and 16A-D. For example, according to an exemplary embodiment as shown representationally and schematically in FIGS. 7A-D, the arm/boom system comprises a track mechanism shown as comprising a sleeve S within which arm/boom A may retract the rotor (see FIGS. 7A-B) and/or extend the rotor (see FIGS. 7C-D) relative to the base B (e.g. for independent and/or coordinated movement). See also FIG. 16B.

Figure 8A:
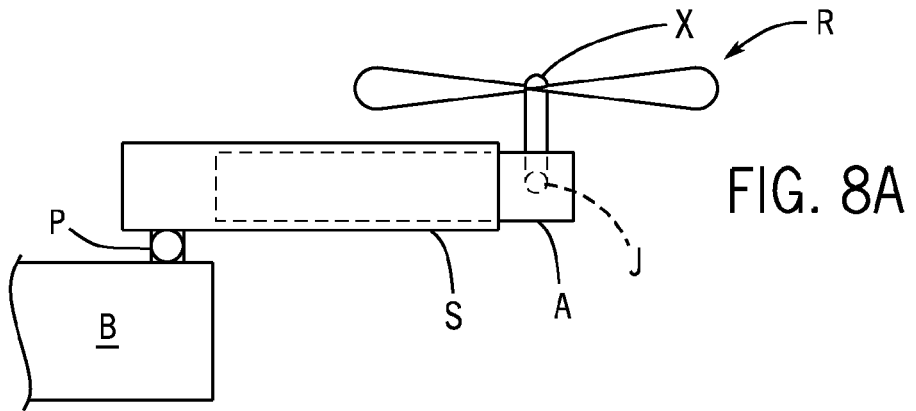
FIGS. 8A to 8F are schematic elevation views of a rotor system with reconfigurable arm/boom system for an aircraft according to an embodiment.
Figure 8B:
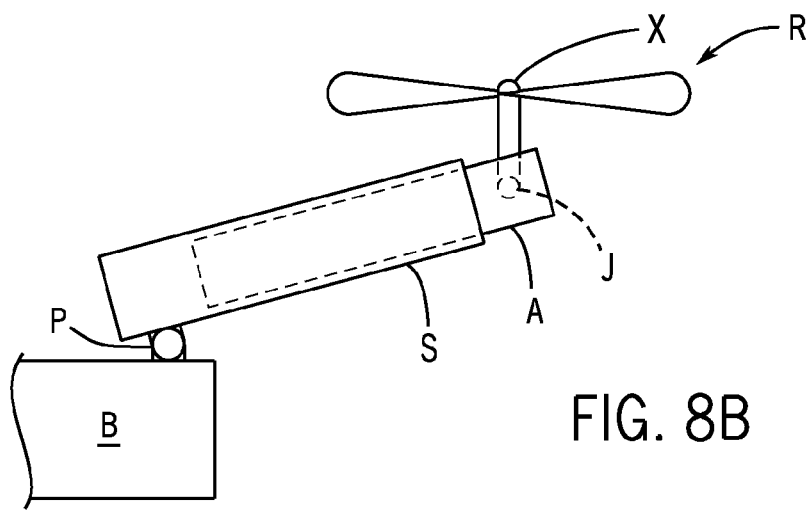
Figure 8C:
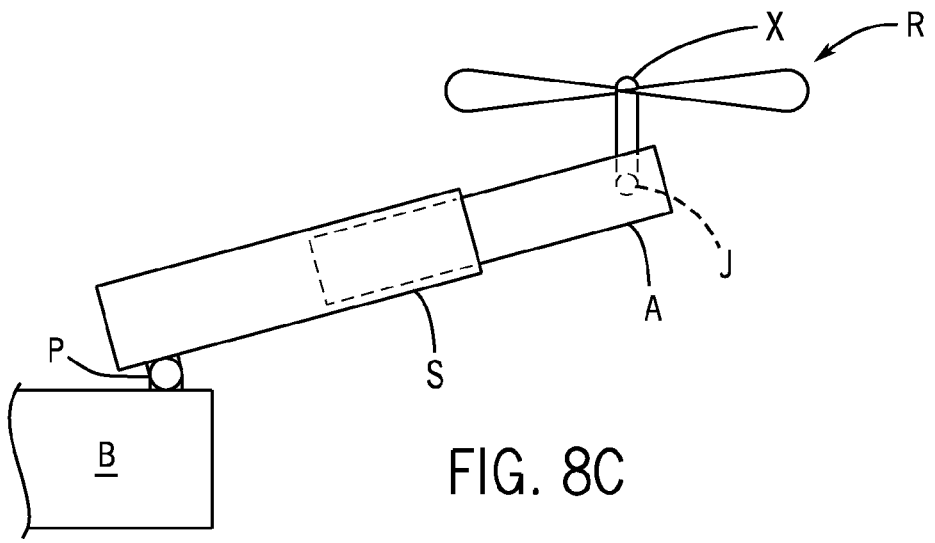
Figure 8D:
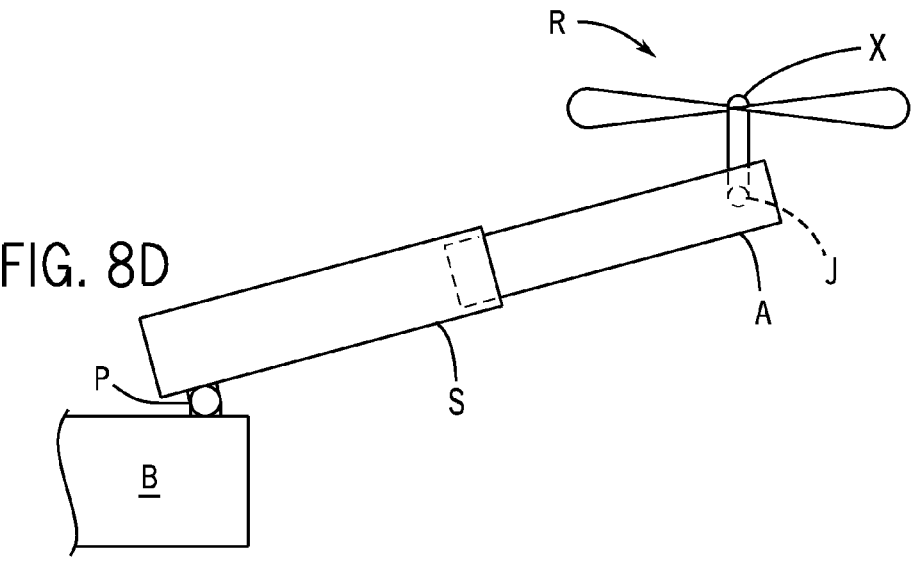
Figure 8E:
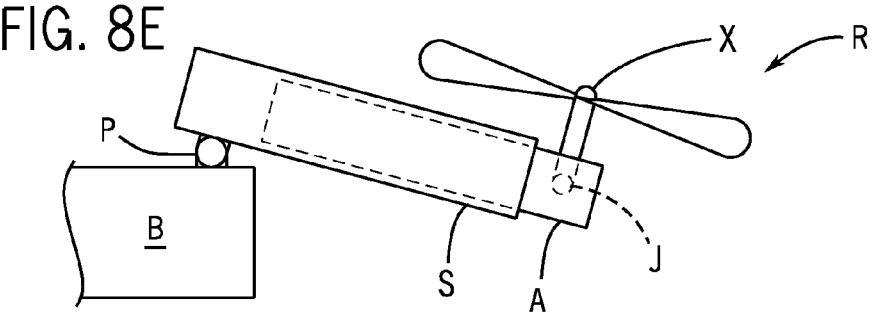
Figure 8F:
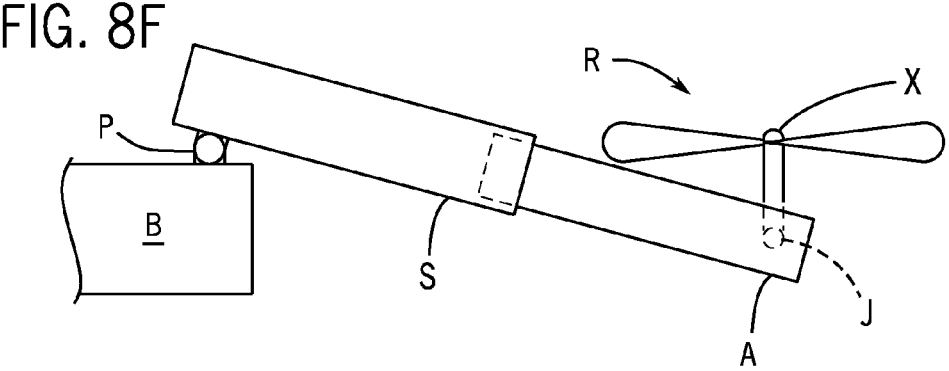

According to an exemplary embodiment as shown representationally and schematically in FIGS. 8A-F, the arm/boom system comprises a sleeve S for arm/boom A to retract/extend the rotor R relative to the base B as well as a pivot joint P at which the sleeve/arm with rotor can be raised (see FIGS. 8B-D) and lowered (see FIGS. 8E-F) relative to the base B; a pivot joint J for axis X of rotor R is provided so that the orientation/attitude of the rotor R can be monitored (or controlled) relative to the base B (e.g. compare FIG. 8E and FIG. 8F). See also FIGS. 16A/C and 21A-D.

According to an exemplary embodiment as shown representationally and schematically in FIG. 9A-D, the arm/boom system comprises a sleeve S for arm/boom A as well as a track mechanism shown as comprising a track T in base B for (independent and/or coordinated) movement of the arm/boom relative to the base and a track T in arm A for (independent or coordinated) movement of the rotor R relative to the arm. See also FIG. 16B. As indicated, the arm/boom system may also be configured to facilitate movement of the arm relative to the sleeve (e.g. translation as indicated in FIGS. 7A-D) as well as other movements and combinations of movements to reposition the rotor.

Figure 10B:
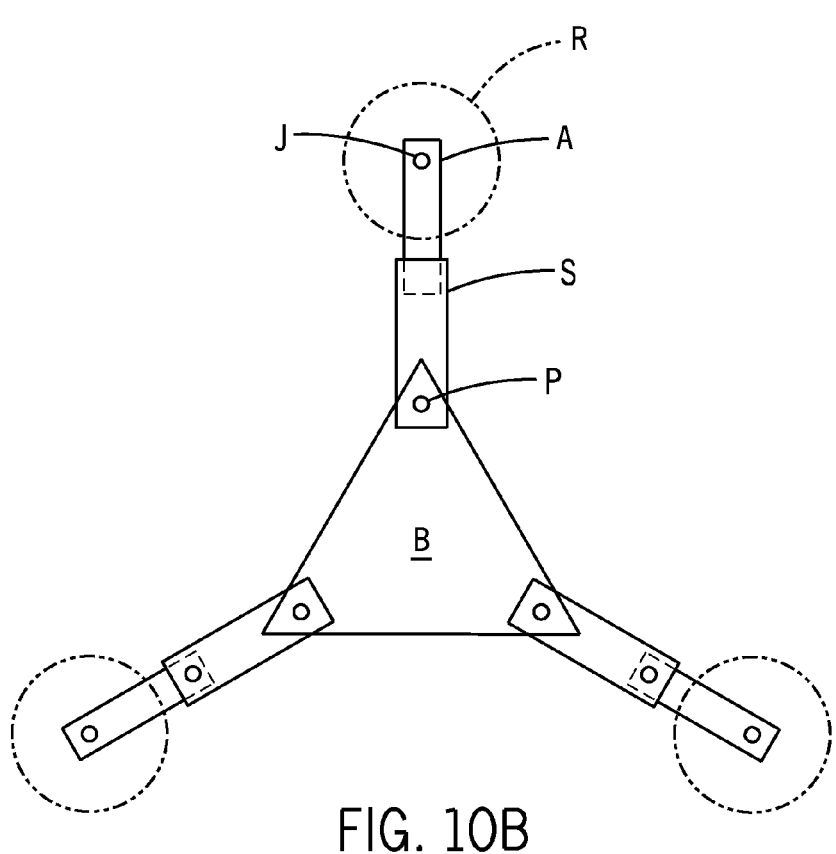
Figure 11A:
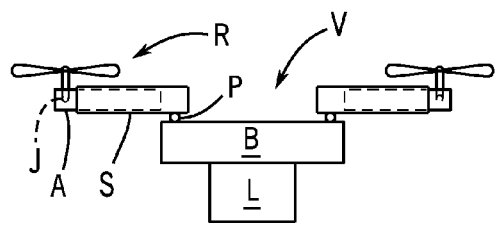
FIGS. 11A to 11H are schematic elevation views of a rotor system with reconfigurable arm/boom system for an aircraft according to an embodiment.
Figure 11B:
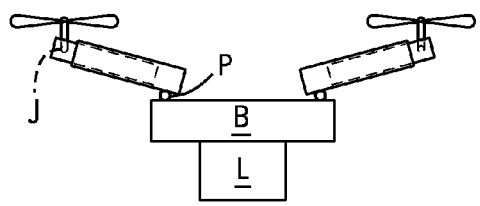
Figure 11C:
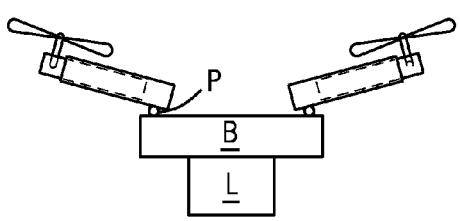
Figure 11D:
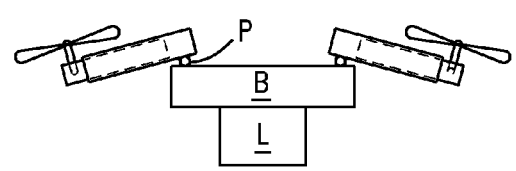
Figure 11E:
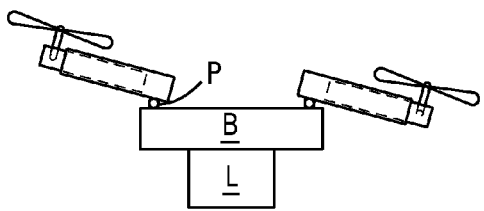
Figure 11F:
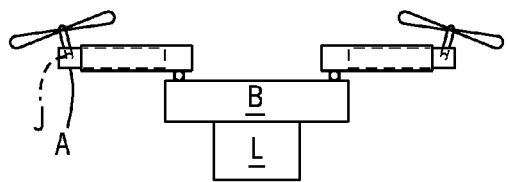
Figure 11G:
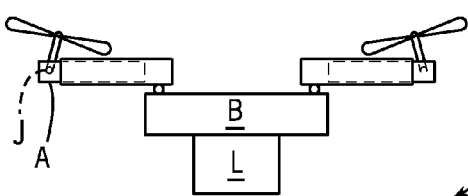
Figure 11H:
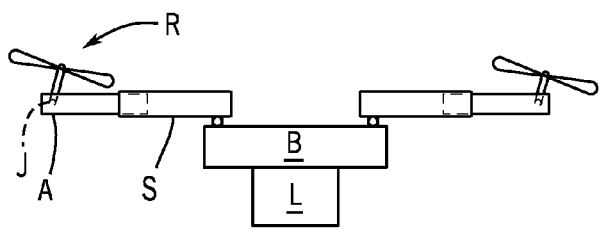

Referring to FIGS. 10A-B, a UAV/craft configured as a tri-copter is shown according to an exemplary embodiment representationally and schematically, with the arm/boom system with sleeve S so that the rotors can be extended (see FIG. 10A) or retracted (see FIG. 10B) relative to the base. Referring to FIGS. 11A-H, a UAV/craft is shown according to an exemplary embodiment representationally and schematically with the arm/boom system using pivot joint P at the base/arm interface and pivot joint J at the arm/rotor interface to indicate example configurations and reconfigurations of the UAV/craft (e.g. of the arm/rotor relative to the base). As indicated representationally and schematically in FIGS. 12A-C and FIGS. 13A-C, according to an exemplary embodiment a non-operational rotor may be retracted toward the base (see FIGS. 12B and 13B) and/or rotated within/into the base (see FIGS. 12C and 13C).

As indicated according to an exemplary embodiment, by combinations of known/available mechanism (including as shown representationally and schematically in FIGS. 16A-D) and movements (including as shown representationally and schematically in the FIGURES) of any of a wide variety of configurations and reconfigurations of the arm/boom system and rotor system and UAV/craft may be facilitated (including as shown representationally and schematically in the FIGURES); according to an exemplary embodiment, configurations may utilize/operate all available rotors (see e.g. FIGS. 10A-B) and/or configuration may utilize/operate certain available rotors while not operating other rotors (see e.g. FIGS. 4A-D, 5A-E and 6A-D). According to any preferred embodiment, the reconfigurable UAV/craft may be configured by positioning/repositioning of the rotor system to provide any of a wide range of flight characteristics/performance as intended or useful for operating conditions.

As indicated representationally and schematically in the FIGS. 6E and 10B, some or all components of the rotor system of a UAV/craft may be retracted into the base to reduce the overall size and risk of damage to extended components such as for storage and transport of the UAV/craft. See also FIGS. 6D, 7A, 10A and 21A-C. As shown schematically in FIG. 6E, when the UAV/craft is not in use all rotors may be retracted to put the UAV/craft in a compact form for storage.

UAV/Craft—Robotic Arm Mechanism

As indicated representationally and schematically according to an exemplary embodiment, in FIGS. 14 and 15A-F, the space frame/base of the UAV/craft may be configured so that the arm/boom system for a rotor may comprise a robotic arm mechanism to position/reposition the rotor to configure/reconfigure the UAV/craft. Robotic arm systems/mechanisms of known/present configurations and arrangements may be adapted and constructed for use with the UAV/craft according to exemplary and other alternative embodiments, see for example systems such as U.S. Pat. No. 6,431,019 titled "Low Cost, High-Strength Robotic Arm" (e.g. FIG. 1). See also FIG. 16D (schematic representation of mechanical arm segment).

As indicated representationally and schematically, the arm/boom system implemented using a robotic arm mechanism will provide a flexible multi-axis system for rigidly positioning and repositioning a rotor relative to the base of the UAV/craft. See e.g. FIGS. 14 and 16D. As shown schematically in FIG. 14, the arm/boom system A comprises a base assembly 210 to be attached to the base B of the UAV/craft and a boom/arm assembly 220 coupled to the base assembly 210 at an interface 216 (shown as a joint or junction); the rotor R is installed on an arm/axis assembly 230 coupled to the boom/arm assembly 220 at an interface 226 (shown as a joint or junction). The base assembly 210 comprises a base sleeve 212 (attached to base B) with an arm segment 214 (coupled to interface 216) that can be extended and/or retracted within the base sleeve 212 (e.g. to lower/raise the rotor see FIGS. 14 and 15A). The boom/arm assembly 220 comprises a base sleeve 222 (coupled to interface 216) with an arm segment 224 (coupled to interface 226) that can be extended and retracted within the base sleeve 222 (e.g. to extend/retract the rotor see FIGS. 14 and 15D). The interface 216 provides for rotation of the boom/arm assembly 220 along each of three axes (e.g. as indicated schematically in FIGS. 14 and 15B, 15C and 15E); the interface 226 provides for rotational positioning of the rotor (e.g. using a ball joint as indicated schematically in FIGS. 14 and 15F). See also FIGS. 16A/C (example representation of mechanisms).

As indicated representationally and schematically according to an exemplary embodiment, the arm/boom system implemented with a robotic arm provides for multi-dimensional movement and positioning of the rotor relative to the base, including translation of the rotor in an in/out orientation (X axis) (FIG. 15D), translation of the rotor in an up/down orientation (Y axis) (FIG. 15A), rotation of the rotor in the plane of the base (about the Y axis) (FIG. 15B), rotation of the rotor transverse to the base (about the Z axis) (FIG. 15C), rotation/twisting of the rotor (about the X axis) (FIG. 15E), rotation/orientation of the rotor relative to the arm (FIG. 15F). (As indicated, movement of components of the arm/boom system and rotor system may be coordinated and/or independent and/or in a sequence.)

According to other exemplary embodiments, other forms of robotic arms/mechanisms may be employed for the rotor system of the reconfigurable UAV/craft.

UAV/Craft—Example Mechanisms

Referring to FIGS. 16A-D, example mechanisms that may be employed in the arm/boom system of the UAV/craft according to an exemplary embodiment, are shown representationally and schematically. As indicated any of a wide variety of suitable/other mechanisms may be adapted/used in exemplary embodiments of the system, including the mechanisms specifically shown (e.g. as joint/interface mechanism J/P, track/sleeve mechanism T/S) and other known/present mechanisms and/or commercially-available systems/mechanisms.

Referring to FIG. 16A, a joint/interface mechanism (e.g. as indicated in FIGS. 7A-D, 8A-F, 14, 21A-D, etc.) is shown representationally and schematically of a type disclosed in U.S. Pat. No. 6,238,124 titled "Locking Joint Mechanism" (e.g. FIGS. 1, 3, 4, 20-23, 38A-B). See also U.S. Pat. No. 4,890,713 titled "Pan and Tilt Motor for Surveillance Camera" (e.g. FIGS. 1-3). Referring to FIG. 16B, a track/sleeve mechanism (e.g. as indicated in FIGS. 6A-D, 7A-D, 8A-F, 9A-D, 22A-C, etc.) is shown representationally and schematically of a type disclosed in U.S. Pat. No. 8,226,063 titled "Power Seat Track Drive Assembly" (e.g. FIGS. 2, 7, 8). See also U.S. Pat. No. 8,534,147 titled "Electromotive Linear Drive" (e.g. FIG. 1) and U.S. Pat. No. 4,614,128 titled "Linear Drive Device with Two Motors" (e.g. FIGS. 2, 4, 5). Referring to FIG. 16C, a joint/interface mechanism (e.g. as indicated in FIGS. 7A-D, 8A-F, 21A-D, etc.) is shown representationally and schematically of a type disclosed in U.S. Pat. No. 5,409,269 titled "Ball Joint Mechanism" (e.g. FIGS. 1, 2, 4) and U.S. Pat. No. 6,101,889 titled "Ball Screw and Nut Linear Actuator Assemblies and Methods of Constructing and Operating Them" (e.g. FIGS. 1, 2, 5, 7). Referring to FIG. 16D, a flexible arm mechanism of a type that may be used for the arm/boom system is shown representationally and schematically of a type disclosed in U.S. Pat. No. 6,431,019 titled "Low Cost, High-Strength Robotic Arm" (e.g. FIG. 1). (According to alternative and other exemplary embodiments, other mechanisms may be adapted and used for the rotor/arm system for the UAV/craft.)

According to any exemplary embodiment, the joint/interface mechanism J and track/sleeve mechanism T indicated in FIGS. 16A-D could be used to implement the joint/interface mechanisms J/P and track/sleeve mechanisms T/S indicated in other FIGURES; as indicated, according to the various/other exemplary and alternative embodiments, any of a wide variety of other known and/or suitable mechanisms (e.g. with associated control/drive systems, motors, linkages, couplings, gearing, etc.) may used to implement the functionality of the reconfigurable UAV/craft system.

UAV/Craft—Spatial/Geometric Arrangement of Rotors

As indicated according to any exemplary embodiment, the arm/boom system for the rotor system is configured to configure and reconfigure the rotor system in a geometric and spatial arrangement (e.g. in a three-dimensional space but in any event at least a two-dimensional plane).

Figure 17A:
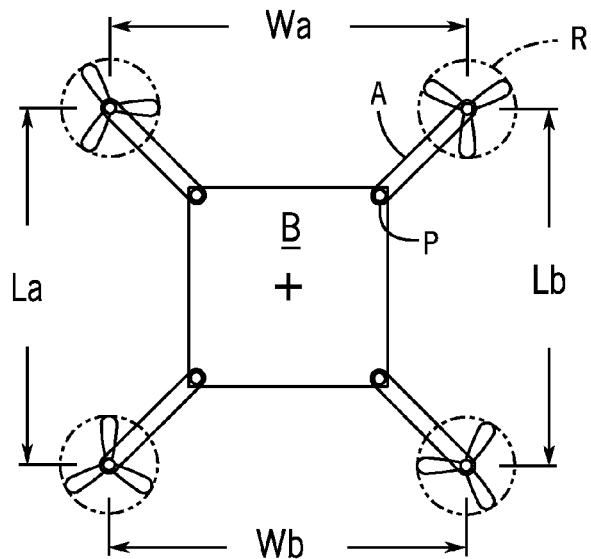
FIGS. 17A to 17C are schematic plan views of an aircraft with reconfigurable arm/boom system according to an embodiment.
Figure 17B:
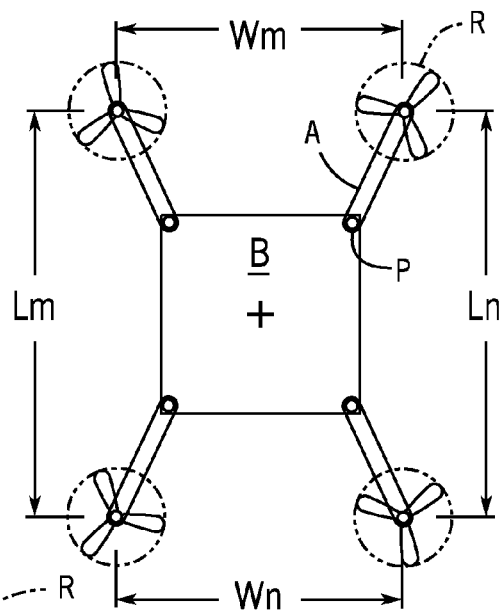
Figure 17C:
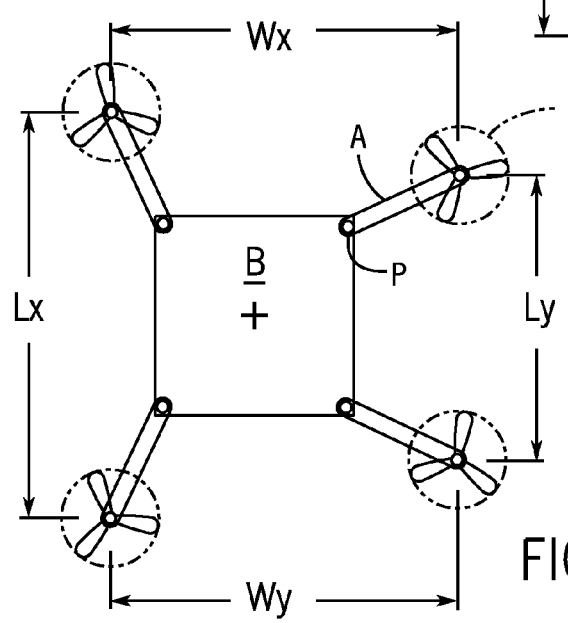

As indicated representationally and schematically in FIGS. 17A-C according to an exemplary embodiment for a reconfigurable UAV/craft with a quad-copter arrangement, configuration relative positions of rotors may be set in a spatial/geometric arrangement (in two and three dimensions) for functional purposes intended to achieve desired flight characteristics in or for operating conditions of the UAV/craft (e.g. to perform functions on a mission). For example, as shown schematically in FIG. 17A, a generally symmetrical arrangement of rotors may be provided to improve stability (e.g. such as for ascent/lift-off and descent/landing) for the UAV/craft. The rotors (in plan view) are in a generally "square" configuration (e.g. $W_a=W_b=L_a=L_b$). As shown schematically in FIG. 17B, an arrangement of rotors may be provided to adjust the aerodynamic profile of the UAV/craft (e.g. such as to reduce drag in flight). The rotors (in plan view) are generally in a rectangular/non-square configuration (e.g. $W_m=W_n$ and $L_m=L_n$ and $W_m<L_m$ and $W_n<L_n$); the profile at the UAV/craft as given by the rotor arrangement is narrowed along the direction of forward travel. As shown schematically in FIG. 17C, an arrangement of rotors may be provided to adjust the aerodynamic profile of the UAV/craft (e.g. intended to compensate for a cross-wind). The rotors (in plan view) are in a trapezoidal configuration (e.g. $W_x=W_y$ and $L_x>L_y$); the profile of the UAV/craft as given by the rotor arrangement is narrowed at the side facing an external force (e.g. cross-wind).

Figure 21A:
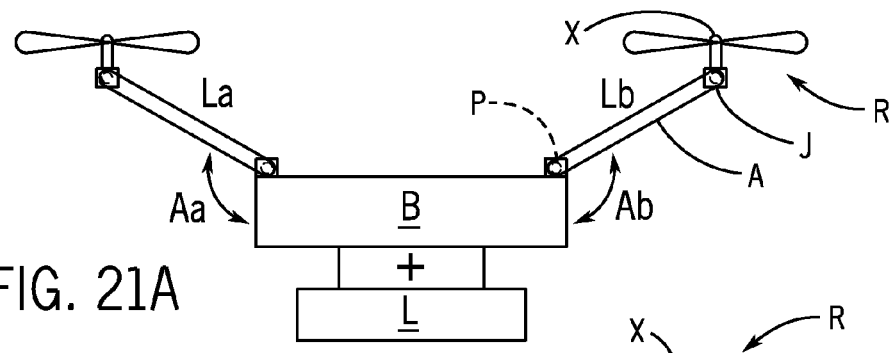
FIGS. 21A to 21D are schematic elevation views of a rotor system with reconfigurable arm/boom system for an aircraft according to an embodiment.
Figure 21B:
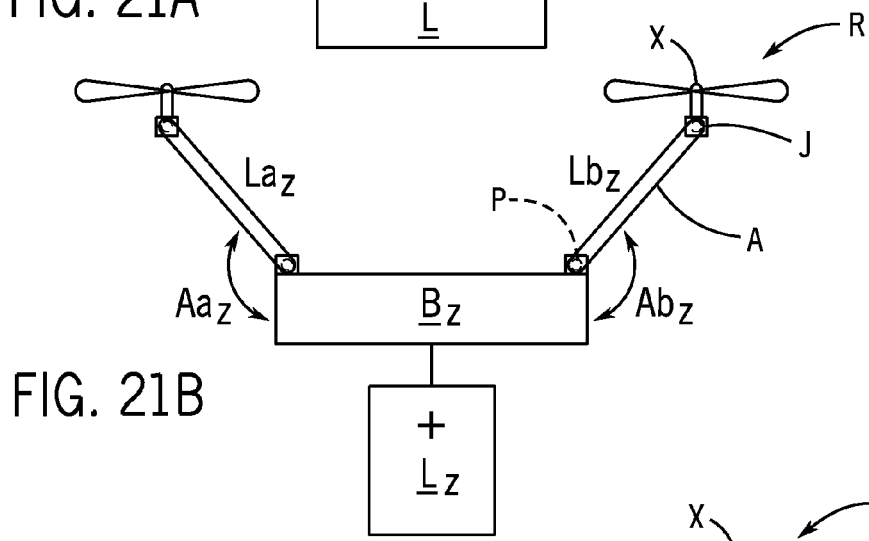

Referring to FIG. 21A, the reconfigurable UAV/craft is carrying a symmetrical payload that retains the center of mass of the UAV/craft generally in a central location as shown schematically with a corresponding symmetrical rotor configuration; rotor configuration is set at an arm/boom length to the frame/base of $L_a/L_b$ ($L_a=L_b$) and angle of an arm/boom relative to base is set at $A_a/A_b$ ($A_a=A_b$). In FIG. 21B, the reconfigurable UAV/craft is carrying a symmetrical payload indicated schematically as having a relatively substantial mass (in comparison to the mass indicated in FIG. 21A) with a corresponding reconfiguration of the UAV/craft that is symmetrical with a reduction of the lateral distance between the rotors; rotor configuration is set at an arm/boom length to the frame/base of $L_{az}$ and $L_{bz}$ ($L_{az}=L_{bz}$) and angle of arm/boom relative to base is set at $A_{az}$ and $A_{bz}$ ($A_{az}=A_{bz}$); as noted the angle of arm/boom relative to base has increased.

Figure 21C:
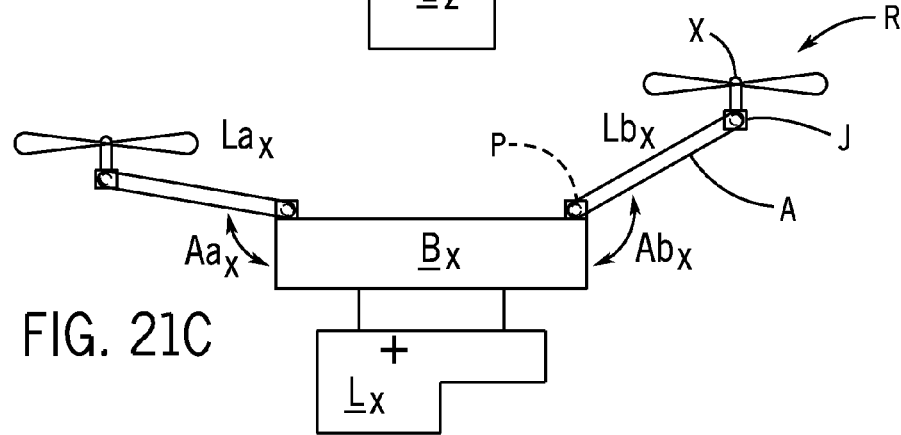
Figure 21D:
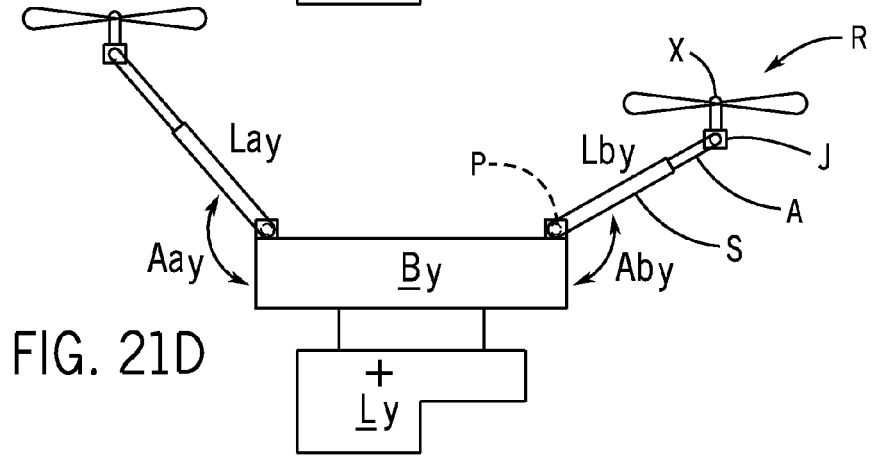

In FIGS. 21C-D, the UAV/craft is carrying a payload that is asymmetrical and the corresponding rotor configuration of the UAV/craft is asymmetrical in an effort to compensate for the off-center location of the center of mass of the loaded UAV/craft. As indicated schematically, the rotor position may be reconfigured by extending/retracting and/or adjusting the angle of the arm/boom relative to the base/frame (and payload); for example in FIG. 21C, angle of one arm/boom $A_{az}$ relative to the base/frame is less than the angle of the other arm/boom $A_{bx}$ relative to the base/frame; in FIG. 21D, the length of one arm/boom $L_{ay}$ relative to the base/frame is larger than the length of the other arm/boom $L_{by}$ relative to the base/frame.

As indicated according to an exemplary embodiment, other arrangement of rotors and other intended purposes may be considered in the determination of configurations and operation of the reconfigurable UAV/craft. According to an exemplary embodiment the control system (see FIGS. 24-28B), will control the configuration/reconfiguration and positioning/repositioning of the rotor system to desired geometric/spatial relationships for the desired flight characteristics of the reconfigurable UAV/craft.

Operation/Management—Rotor Speed Control

According to an exemplary embodiment, the rotor system of the reconfigurable UAV/craft is configured to provide a variable amount of thrust (e.g. with variable speed control of one or more rotors under direction of a control system, see FIGS. 24-28B). The flight characteristics of the reconfigurable UAV/craft can be modified (separately or in addition to by repositioning of the rotor system) by control/adjustment of rotor speed.

According to an exemplary embodiment, each rotor has a desired operating range of rotor rotational speed for operation; the operating range comprises a low threshold speed and a high threshold speed (e.g. determined by design or conditions). The low speed is a designed minimum speed and the high speed is a designed maximum speed. According to an exemplary embodiment, a threshold rotor speed may be based on at least one of energy efficiency or stability performance.

According to an exemplary embodiment, the control system (e.g. master control system) of the reconfigurable UAV/craft may comprise a first subsystem (e.g. operation control) for changes in rotor rotational speed and a second subsystem (e.g. configuration control) for configuration/reconfiguration of the arm/boom system and/or rotor system; if a change in flight characteristics is desired (e.g. due to changes in operating conditions) the control system initially will seek to use operation control to change in rotor rotational speed (e.g. as a "quick" response from the system); the control system then will seek to use reconfiguration control to change rotor position (e.g. a "slower" response from the system) to modify flight characteristics of the reconfigurable UAV/craft. See e.g. FIGS. 25 and 34A-B.

In operation according to an exemplary embodiment, the UAV/craft responding to a change in operation/flight conditions with a change of flight characteristics may seek to change rotor speed; but eventually (e.g. if required speed changes are large and/or beyond an off-design-point rotor speed threshold) response to the operating/flight conditions may require a reconfiguration of the UAV/craft by repositioning of the rotor system. According to an exemplary embodiment, the system will seek to operate all rotors efficiently (i.e., rotors are most efficient at a given design speed) to a threshold level using rotor speed control; beyond the threshold level change allowing rotor speed control alone the system will reconfigure the rotor system (e.g. one or more rotors or arms/booms); according to an exemplary embodiment, after or in conjunction with reconfiguration the system may adjust rotor speeds (e.g. operate rotors at or within the design speed/threshold). As indicated, coordinated control of rotor speed with configuration of rotor position facilitates a wider range of available flight characteristics and operating performance (e.g. balancing/reducing loads/operational intensity/speed, wear, etc.); according to any preferred embodiment, the control system of the reconfigurable UAV/craft is able to operate the rotor system at regulated speeds within the threshold operating range (e.g. within restrictions but achieving desired lift/thrust) under a wide range of operating conditions/demands by coordinating rotor speed control with rotor position configuration for the UAV/craft.

UAV/Craft—Control/Computing Systems

According to an exemplary embodiment as shown representationally and schematically in FIGS. 24-28B, the system and method can be implemented using a computing system programmed or otherwise configured to manage the operations, functions and associated data/network communications. Referring to FIGS. 24-28B according to an exemplary embodiment shown representationally and schematically, a control system is provided to manage, configure and operate the UAV/craft.

Figure 24:
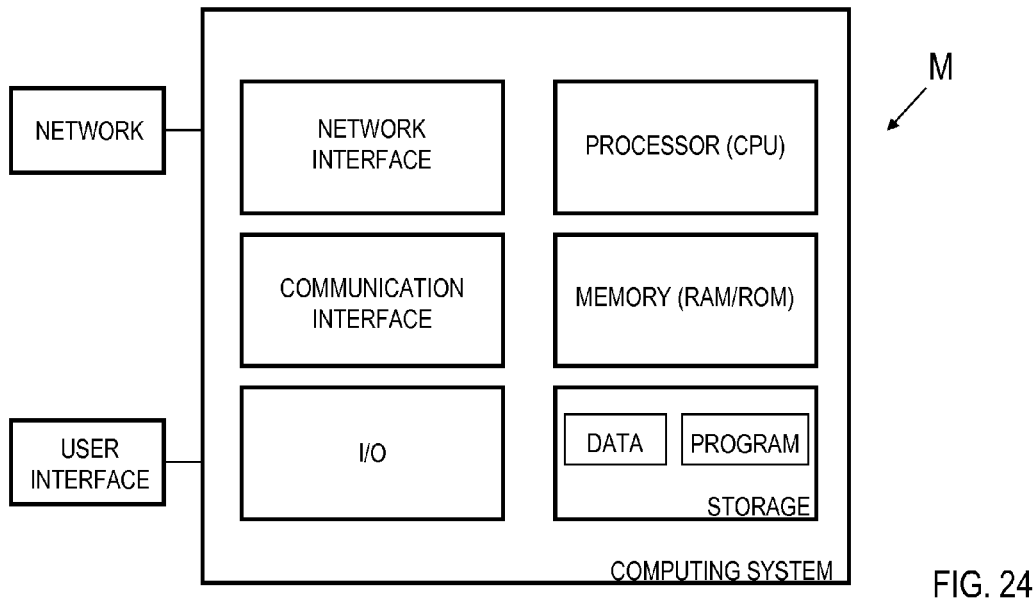
FIG. 24 is a block diagram of a computing system for an aircraft system according to an embodiment.

Referring to FIG. 24, a computing system is shown schematically according to an exemplary embodiment, to comprise a processor and memory/storage for data/programs as well as network/communication interfaces and input/output (I/O) system (e.g. allowing interaction through a user interface, etc.).

Figure 25:
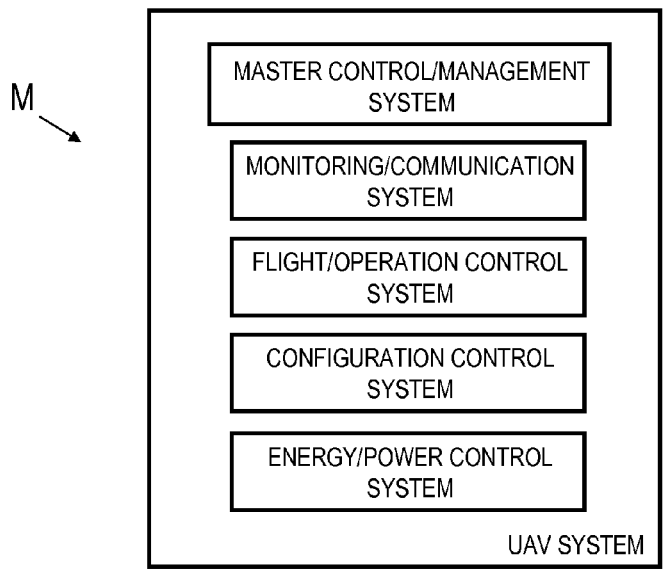
FIG. 25 is a block diagram of an aircraft system with reconfigurable arm/boom system according to an embodiment.

As shown schematically according to an exemplary embodiment in FIG. 25, the UAV/craft system comprises multiple functional subsystems (which may be independent or combined in implementation) including a master control system, monitoring/communication system, flight/operation control system, configuration control system, energy/power control system (and other associated subsystems).

Figure 26:
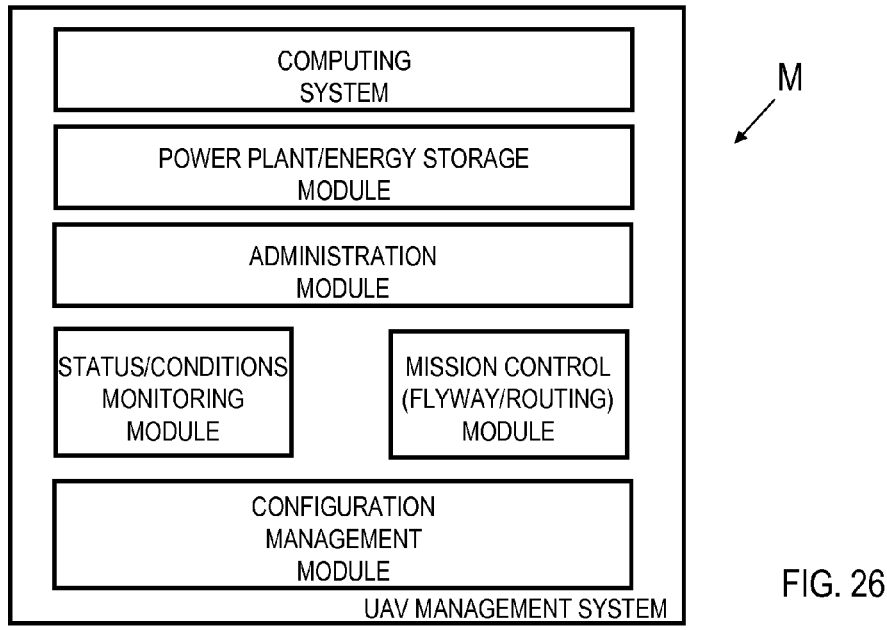
FIG. 26 is a block diagram of a management system for an aircraft with reconfigurable arm/boom system according to an embodiment.

As shown schematically according to an exemplary embodiment in FIG. 26, functional modules may be associated with a computing system to manage and operate the UAV/craft, including for the power plant/energy storage systems (e.g. motors and/or engines, battery and/or fuel systems, etc.), administration, status/condition monitoring, mission control, configuration management, etc.

Systems/modules M (e.g. individually and/or collectively) for control, operation, management, administration, data/networking, communications, telemetry, power, energy, configuration, monitoring, etc. that may be installed on or associated with the UAV/craft according to an exemplary embodiment are indicated representationally and schematically in FIG. 1. See also FIGS. 24-26 and 28B.

Figure 27:
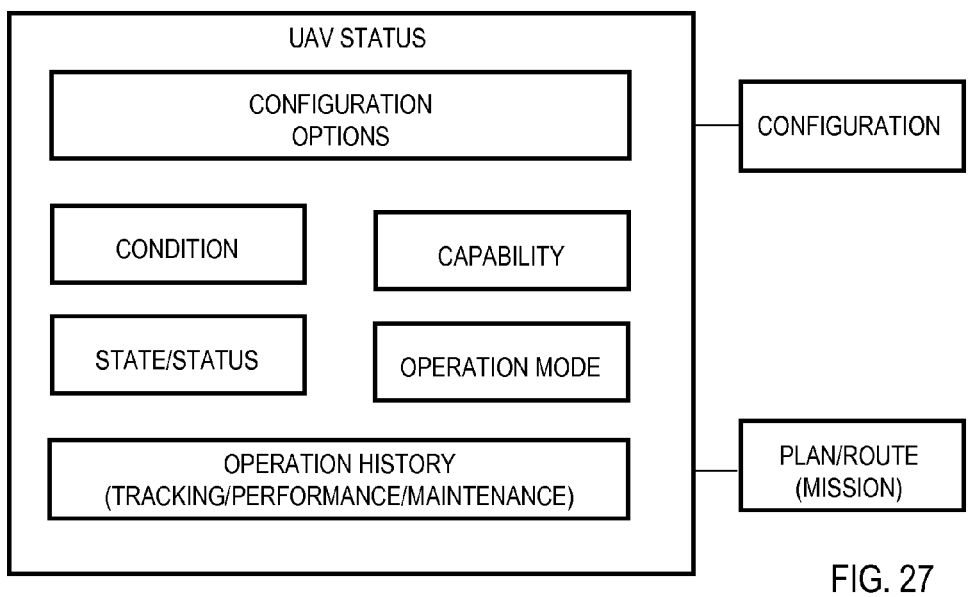
FIG. 27 is a block diagram of a status monitoring system for an aircraft with reconfigurable arm/boom system according to an embodiment.

As shown schematically according to an exemplary embodiment in FIG. 27, UAV/craft status monitoring comprises management of the configuration and mission (e.g. plan/route) for the UAV/craft as well as monitoring of configuration options, conditions (e.g. operating conditions), capability/mode of operation, state/status of systems, etc.; monitoring may comprise tracking of operation history (e.g. data available to assess status/state of health/operating condition such as to facilitate predictive/advance identification of potential system issues, e.g. rotor failures/malfunctions, etc.).

Figure 28A:
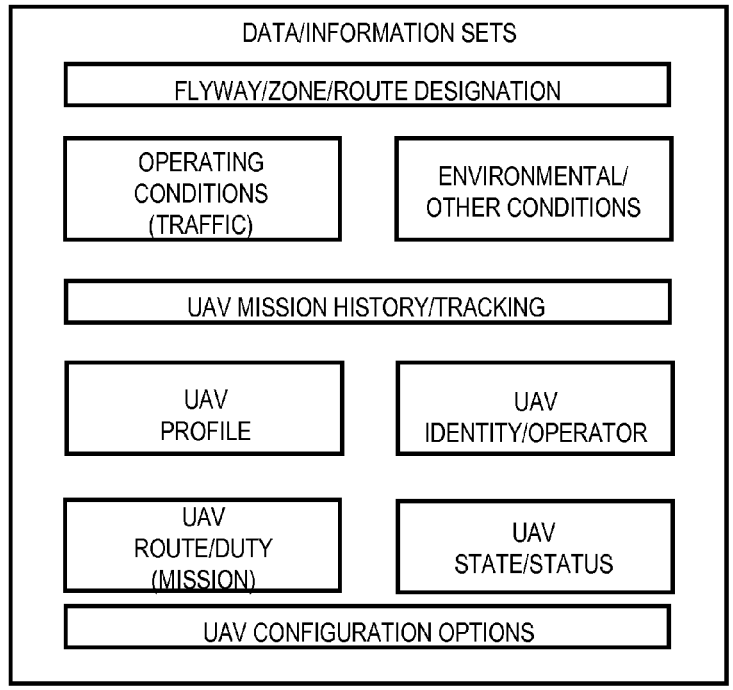
FIG. 28A is a block diagram of data/information sets for an aircraft system with reconfigurable arm/boom system according to an embodiment.
Figure 28B:
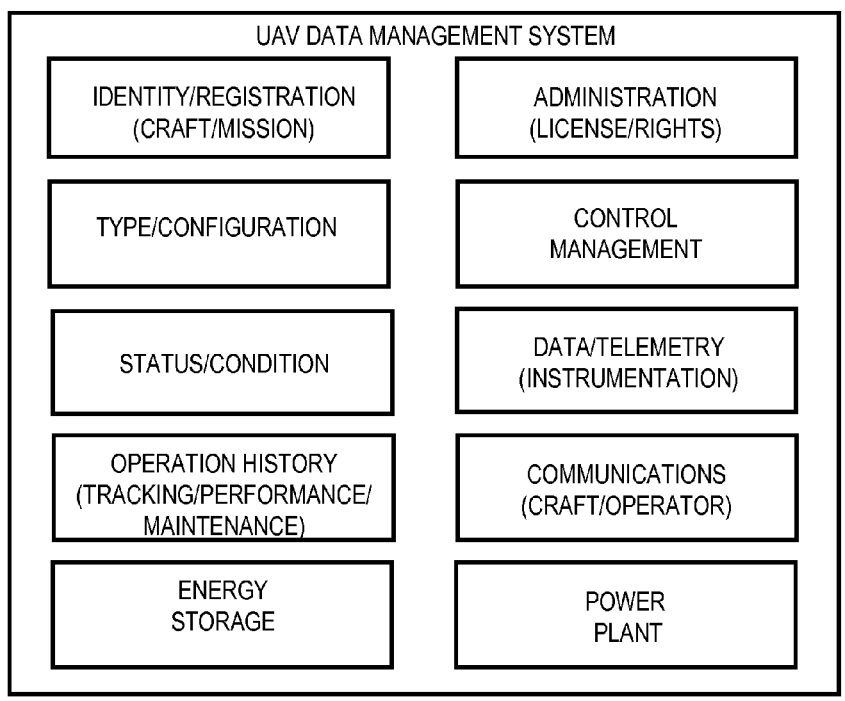
FIG. 28B is a block diagram of a data management system for a UAV/aircraft system with reconfigurable arm/boom system according to an embodiment.

As shown schematically according to an exemplary embodiment in FIGS. 28A-B, data and data management for the system and method may comprise collection/monitoring and use of data from a variety of data sources (e.g. internal/ network or external/internet/etc.) related to a variety of UAV/craft systems and functions, including conditions, UAV profile, configuration, status, instrumentation, energy/ power systems, etc.

Flight Characteristics/Operating Conditions

According to an exemplary embodiment, the reconfigurable UAV/craft can be reconfigured to modify the flight characteristics in response to any of a wide range of operating conditions that are anticipated or encountered in operation of the UAV/craft on a mission (e.g. performing a function on a flight/route in an airspace).

The flight characteristics of the UAV/craft may comprise at least one of aerodynamic profile, maneuverability, available thrust (e.g. total available thrust), available lift (e.g. total available lift), energy consumption, energy efficiency, mass, center of gravity, mass properties, center of mass, balance, stability, controllability, maneuverability, control axes, maximum relative ground velocity, maximum relative air speed, ascent rate, descent rate, sink rate, flight altitude, aerodynamic drag, number of operational rotors, control system type, equipment status, etc. (or any other characteristic affecting the flight/performance of the UAV/craft).

According to exemplary embodiments, the flight characteristics of the reconfigurable UAV/craft can be modified by at least one of (a) changing rotation speed of at least one rotor or (b) changing position/configuration of at least one rotor of the rotor system relative to the base or another rotor or (c) changing pitch of blades/vanes of at least one rotor of the rotor system. Referring more specifically to the FIGURES, according to an exemplary embodiment, flight characteristics of the reconfigurable UAV/craft can be modified by at least (1) translation of the rotor along the boom; (2) pivoting of the boom relative to the base; (3) extension of the boom and rotor relative to the base; (4) retraction of the boom relative to the base; (5) pivoting of the rotor relative to the boom; (6) raising the height of the boom relative to the base; (7) lowering the height of the boom relative to the base; (8) rotation of a rotor relative to the base; (9) rotational twist of the boom relative to the base; (10) changing spacing of the rotor relative to another rotor; (11) changing incline of the rotor; (12) changing horizontal position of the rotor relative to the base; (13) changing the vertical position of the rotor relative to the base; (14) moving the rotor inward relative to the base; (15) moving the rotor outward relative to the base; (16) tilting the rotor; (17) adjusting the pitch of vanes of a rotor; (18) changing the rotation speed of the rotor; (19) changing the rotor thrust; (20) disabling the rotor. As indicated, according to an exemplary embodiment the control system of the reconfigurable UAV/craft may command one and/or various and/or multiple actions in an effort to modify flight characteristics of the reconfigurable UAV/ craft, before or during operation and/or in a sequential and/or coordinated manner.

According to an exemplary embodiment, the flight characteristics of the reconfigurable UAV/craft will be modified before a mission (e.g. in anticipation of the operating conditions); the flight characteristics of the reconfigurable UAV/craft may also be modified during a mission (e.g. in anticipation of changed operating conditions, in response to encountered operating conditions for a mission, etc.).

The operating conditions for a mission by aircraft may comprise at least one of operability of each rotor, energy storage capacity, remaining energy storage, payload profile, payload mass, payload type, payload shape, payload size, payload changes, route, altitude, traffic, weather conditions, weather effects, wind velocity, wind direction, distance of mission, remaining distance of mission, time for mission, remaining time for mission, fuel storage capacity, remaining fuel, energy storage capacity, remaining stored energy, etc. (or any other of the various conditions that the UAV/craft will encounter during a flight/mission).

According to the exemplary embodiments, the reconfigurable UAV/craft will be designed/constructed and can be configured and/or to be reconfigured to operate efficiently in a wide range of operating conditions. See generally FIGS. 4A-C, 5A-D, 6A-E, 10A-B, 11A-H, 13A-C, 17A-C, 18A-B, 19A-B, 20A-C, 21A-D, 22A-C and 23A-C (schematic representation or example forms/configurations).

Configuration/Reconfiguration for Mission/Duty

According to an exemplary embodiment, the reconfigurable UAV/craft will be capable of configuration and reconfiguration for any of a wide variety of functions/duties on a wide variety of routes to perform a wide variety of missions/ mission segments. See e.g. FIGS. 30-31, 32A-B. For example, as indicated according to an exemplary embodiment, the UAV/craft will be able to be configured and reconfigured to perform missions and mission segments that involve pick-up and delivery of payload of a wide variety of types, mass/weight, size, shape, etc. See e.g. FIGS. 1-2, 18A-B, 19A-B, 20A-C, 21A-D, 22A-C, 23A-C and 30-36B. (Payload may comprise items for delivery such as parcels/ packages and/or items for use such as on-board cameras/ sensors, etc.)

As indicated in FIGS. 32A-32B and 36A-36B, the UAV/ craft may be configured/reconfigured before and during a mission that may comprise multiple mission segments. As shown schematically according to an exemplary embodiment in FIG. 32B, the UAV/craft may be employed to perform a multi-segment mission (each mission segment indicated A/B/C/D) in a corresponding set of configurations/ reconfigurations (each configuration indicated A/B/C/D). For example, mission segment A may be to carry a sizable payload with the UAV/craft in configuration A (see e.g. FIG. 22A) (octa-copter); mission segment B may be to travel without payload with the UAV/craft being reconfigured to configuration B (see e.g. FIG. 6A) (octa-copter without payload) to a pick-up location (and/or to perform surveillance or monitoring while in transit using an on-board camera/video system); mission segment C may be to pick up a two-component payload and carry the payload to a location with the UAV/craft being reconfigured to configuration C (see e.g. FIG. 22B) (hexa-copter); mission segment D may be to return to a base station with the UAV/craft being reconfigured to configuration D (see e.g. FIG. 22C) (quadcopter) (and/or with the UAV/craft to provide wireless data communications while in transit using an on-board data communications/network system indicated as payload component A).

Figure 22A:
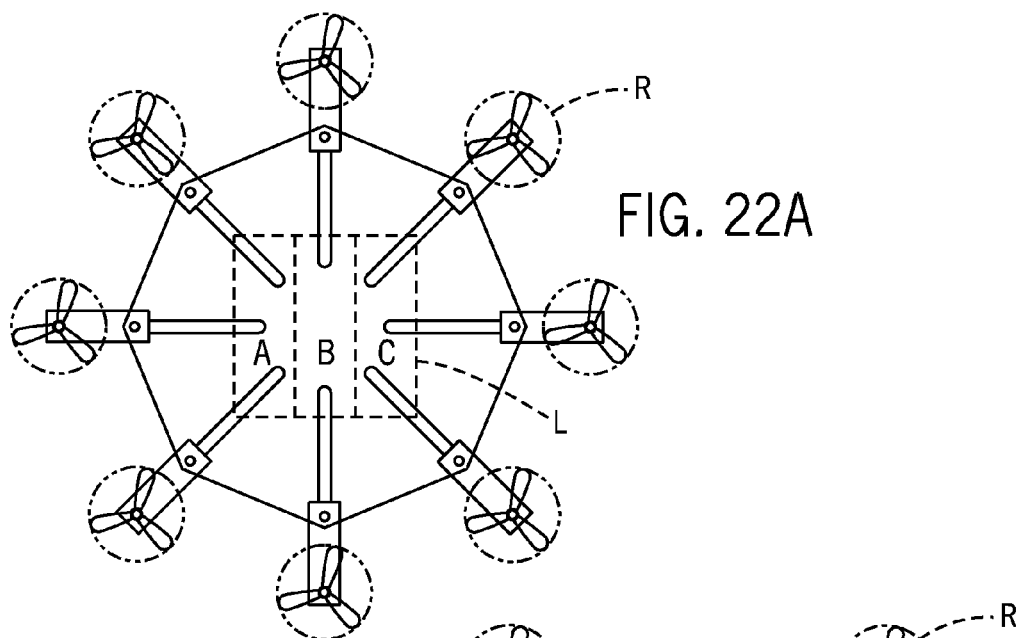
FIGS. 22A to 22C are schematic plan views of an aircraft with reconfigurable arm/boom system according to an embodiment.
Figure 22B:
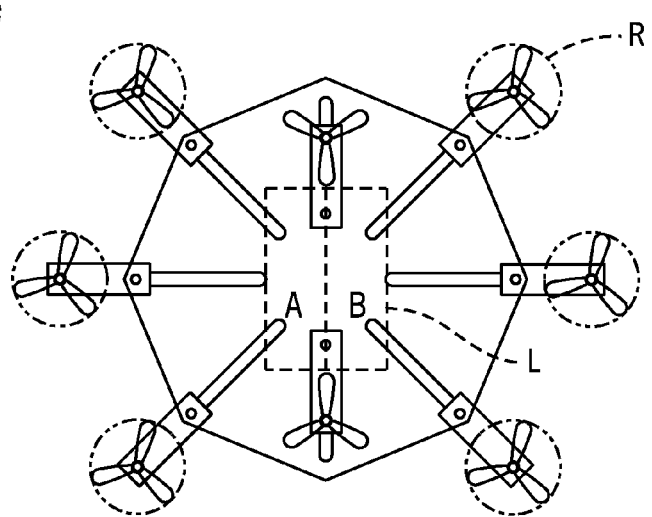
Figure 22C:
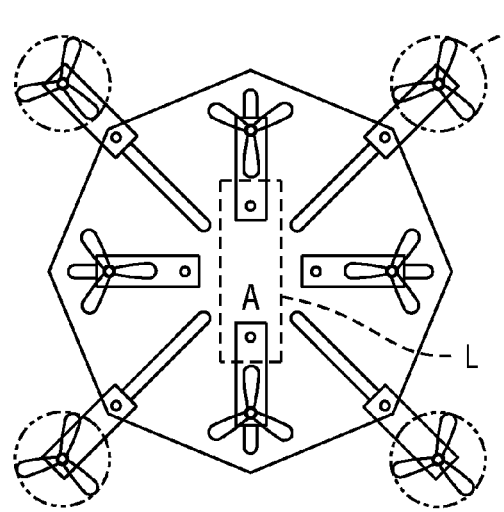
Figure 23A:
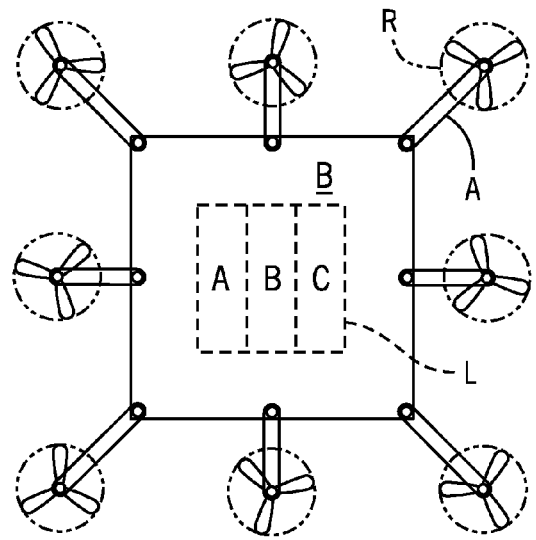
FIGS. 23A to 23C are schematic plan views of an aircraft with reconfigurable arm/boom system according to an embodiment.
Figure 23B:
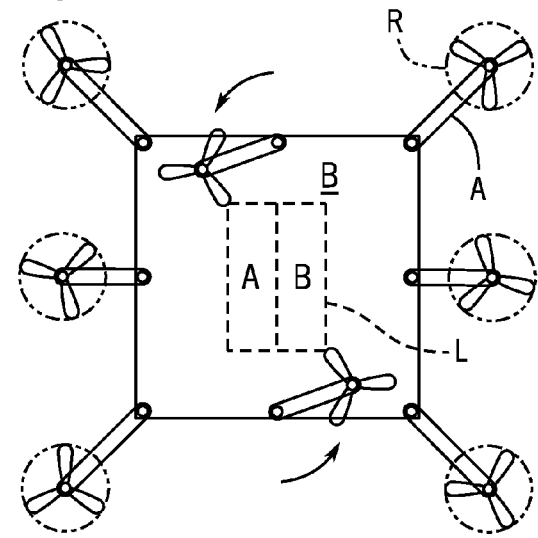
Figure 23C:
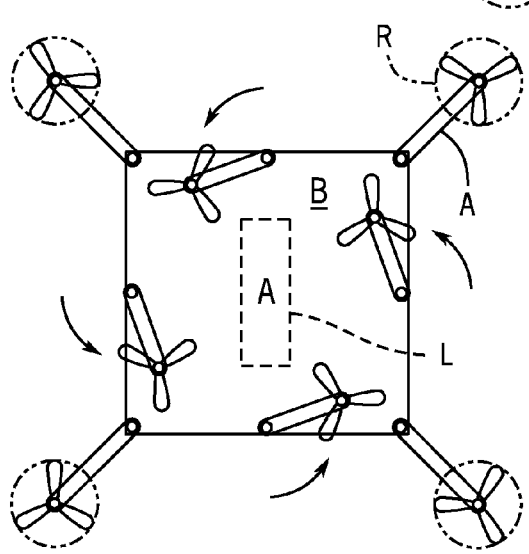

According to an exemplary embodiment as shown representationally and schematically, the same reconfigurable UAV/craft may be configured/reconfigured to carry a variety of types of payload (e.g. payload components) by positioning/deployment of the rotor system so as to configure the UAV/craft with the capacity to carry the payload (e.g. to perform the duties of the mission/mission segment); to carry heaver/bulkier payload (or otherwise for "heavy-duty" mission segments), the UAV/craft may deploy a larger number of rotors of the rotor system and/or may position the rotors to support/balance the heavy-duty payload (see e.g. FIGS. 21B and 22A); to carry lighter payload (or otherwise for "light-duty" mission segments), the UAV/craft may deploy a lesser number of rotors of the rotor system and/or may position the rotors to support/balance the light-duty payload (see e.g. FIGS. 21A and 22C).

According to exemplary and alternative embodiments, the same UAV/craft is able by configuration/reconfiguration to operate as a multi-function aircraft having different flight/performance characteristics (e.g. carrying capacity, efficiency, etc.) and able to adapt to (or be adapted for) variations in operating conditions (e.g. rotor operability, wind/weather, etc.): (a) according to an exemplary embodiment, the rotor position configuration of the UAV/craft may be modified and/or the number of operational rotors may be modified; (b) according to an exemplary embodiment, the UAV/craft may by variations of rotor speed (e.g. control of thrust at a rotor) be able to adapt to variations in operating conditions or performance demands/needs; (c) according to an alternative embodiment, the rotor system of the UAV/craft may comprise rotors that have adjustable vanes/blades so that further adaptations are able to be made in response to operating conditions and/or performance needs/demands; (d) according to another alternative embodiment, the carrying capacity of a UAV/craft system may be enhanced by joining/latching two or more UAV/craft together (e.g. using conventional and/or other fastening/coupling techniques and structures) so that two UAV/craft function as a single aircraft with enhanced lift capability that may be used to transport larger payload than a single UAV/craft would be advised to carry.

According to an exemplary embodiment, the reconfiguration of the rotor system of the reconfigurable UAV/craft for a mission/purpose can be directed by a control system (e.g. a control system onboard the UAV/craft or remote from the craft and connected by a communication/data link) with rotors/booms capable of being independently positioned (e.g. and with rotor position monitored by a monitoring system/sensor). See e.g. FIGS. 1, 6A-E, 14, 24-28B (e.g. system for control of motor system/mechanisms for reconfiguration). According to an alternative embodiment, the relative positioning of rotors in the rotor system may be constrained (e.g. coupled by a control system/program and/or by a mechanism/linkage) so that two or more of the rotors/booms move as a coordinated unit; a coupling (e.g. mechanism, gear system, linkage, frame, member, motor/drive system, etc.) may be configured to retain during movement/reconfiguration of the relative position of two or more of the rotors and/or the relative position of the booms on which the rotors are mounted (e.g. a coordinated system for control of motor system/mechanisms for reconfiguration). See e.g. FIGS. 1, 5A-E, 14, 17A-C, 24-28B. According to any preferred embodiment, the configuration system of the UAV/craft will be capable of repositioning one or more rotors of the rotor system in a manner that will retain airworthiness (among other flight characteristics), including but not limited to by imposing limited options/system constraints on repositioning/reconfiguration of the rotor system/boom. See e.g. FIGS. 25, 26 and 28B. As indicated, according to an exemplary embodiment, the reconfigurable UAV/craft may be configured so that the rotor system can be reconfigured at any of a variety of times/situations including before and during a mission.

Payload Considerations

According to an exemplary embodiment, the reconfigurable UAV/craft is configured to carry a payload (e.g. equipment, items for pick-up/delivery, etc.). As shown representationally and schematically in FIGS. 1, 2 and 18A-23C according to an exemplary embodiment, payload can be carried by the UAV/craft in variety of arrangements (e.g. in, on, under, within, attached, mounted, suspended, stowed, etc. with respect to the base/body). According to an exemplary embodiment, the UAV/craft can be adapted to carry payload of any presently known type/form in any presently known arrangement. According to an exemplary embodiment the space frame and/or base of the UAV/craft can be adapted for the type/form of payload to be carried. (Referring to FIGS. 1, 2 and 20A-C and 21A-D according to exemplary embodiments, the UAV/craft is configured to be loaded with/to carry a variety of forms of payload in various different configurations.)

The payload may comprise equipment such as a monitoring system, a communication system, a surveillance system, a data gathering system, or any other types of items/articles. As indicated, the payload will comprise properties including mass properties such as mass, shape, moment of inertia, center of mass, etc. as well as shape and dimension (e.g. size). The payload may have other characteristics such as fragility, volatility, thermal/temperature restrictions, force/acceleration restrictions, etc. The payload may have an asymmetrical/irregular or eccentric/unbalanced shape or packaging. The payload may have multiple components (e.g. multiple payload sections). See e.g. FIGS. 22A-C and 23A-C. According to an exemplary embodiment, the payload may comprise at least one of an article to be delivered (see FIGS. 20A-C) or a plurality of articles to be delivered (see FIGS. 22A-C and 23A-C).

According to an exemplary embodiment, the reconfigurable UAV/craft may comprise a monitoring system to monitor the status/conditions aircraft systems/subsystems including the payload; the monitoring system may comprise a device or sensor to monitor the condition of the payload (e.g. integrity and placement of the payload).

According to an exemplary embodiment shown representationally and schematically, the payload may be supported using the base in a variety of arrangements (see FIGS. 20A-C and 21A-D); the payload may be contained within the base (see FIG. 20B); the payload may be externally mounted to the base (see FIGS. 20A and 21A-D). As indicated, the form/shape of the payload as well as the mass properties/moment of the payload and the attachment method of the payload each may affect the flight characteristics and operating conditions of the UAV/craft with payload.

According to an exemplary embodiment, the flight characteristics of the reconfigurable UAV/craft can be modified at the time a payload is associated (e.g. before a mission); the payload properties including mass as carried by the UAV/craft can be evaluated/assessed; and the position of at least one rotor can be modified to compensate for the position/properties of the mass of the payload relative to the base (e.g. mass, center of mass, moment arm/force, etc.). According to an exemplary embodiment, position of at least one rotor of the rotor system can be repositioned relative to the base to compensate for the properties/mass of the payload as carried by the UAV/craft. See FIGS. 20A-C, 21A-D, 22A-C and 23A-C. According to any preferred embodiment, the rotor system of the reconfigurable UAV/craft with payload may be configured in a compact maneuverable configuration that minimizes drag effects and facilitates control/control movements of UAV/craft for stable and efficient operation on a mission (in consideration of static/dynamic effects of the payload as carried or as may occur in flight, including lagging/shifting/moments/forces, etc.).

Referring specifically to FIGS. 18A-B, 19A-B, 20A-B, 21A-B, 21A-D, 22A-C and 23A-C, according to an exemplary embodiment as shown representationally and schematically, the rotor position and configuration of the UAV/craft can be modified to carry payload in a variety of configurations and situations/operating conditions and to adapt flight characteristics in response to payload configurations/conditions.

As indicated representationally and schematically according to an exemplary embodiment, configuration/reconfiguration of the reconfigurable UAV/craft in response to properties of payload and other operating conditions may be implemented for any of a variety of purposes/intent as suitable within the operational parameters of the UAV/craft (see e.g. FIGS. 30-36B); configuration/reconfiguration of the reconfigurable UAV/craft may be implemented prior to a mission to achieve energy efficiency and/or to reduce aerodynamic drag and/or to reduce travel time and/or otherwise to improve performance on the mission with payload; reconfiguration of the reconfigurable UAV/craft may be implemented during a mission in response to weather conditions and/or a detected malfunction of a rotor/equipment and or to traffic/routing and/or other operating conditions anticipated or encountered by the UAV/craft on the mission. Before and during the mission, considerations relating to flight characteristics such as fuel/energy efficiency, enhanced performance/speed, properties of the payload (e.g. weight, center of mass, inertia effects, handling/fragility, etc.), safety/precautions, etc. may be the basis for configuration/reconfiguration of the UAV/craft with payload.

Figure 18A:
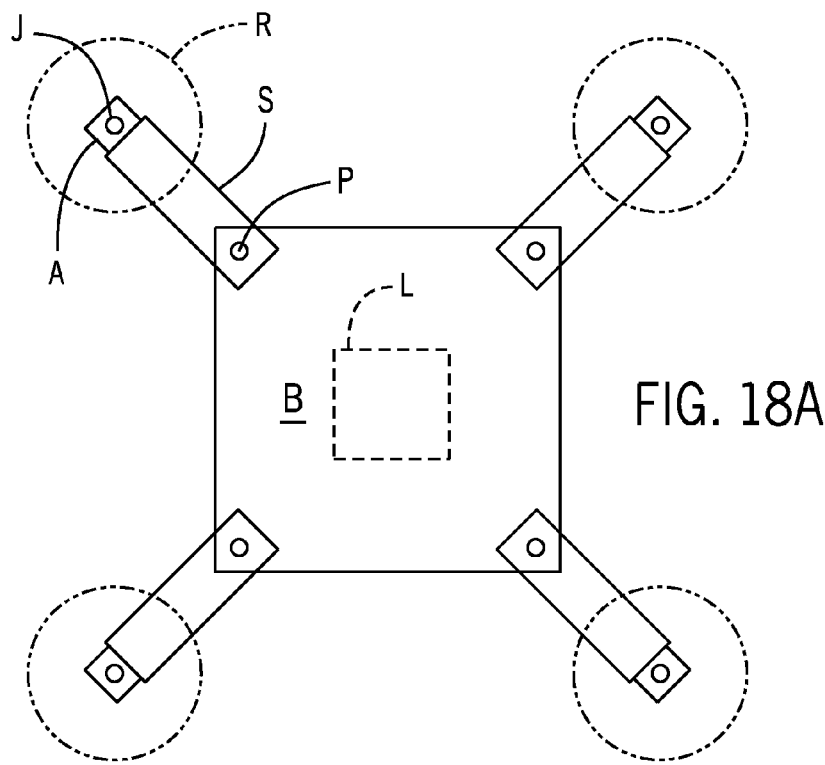
FIGS. 18A and 18B are schematic plan views of an aircraft with reconfigurable arm/boom system according to an embodiment.
Figure 18B:
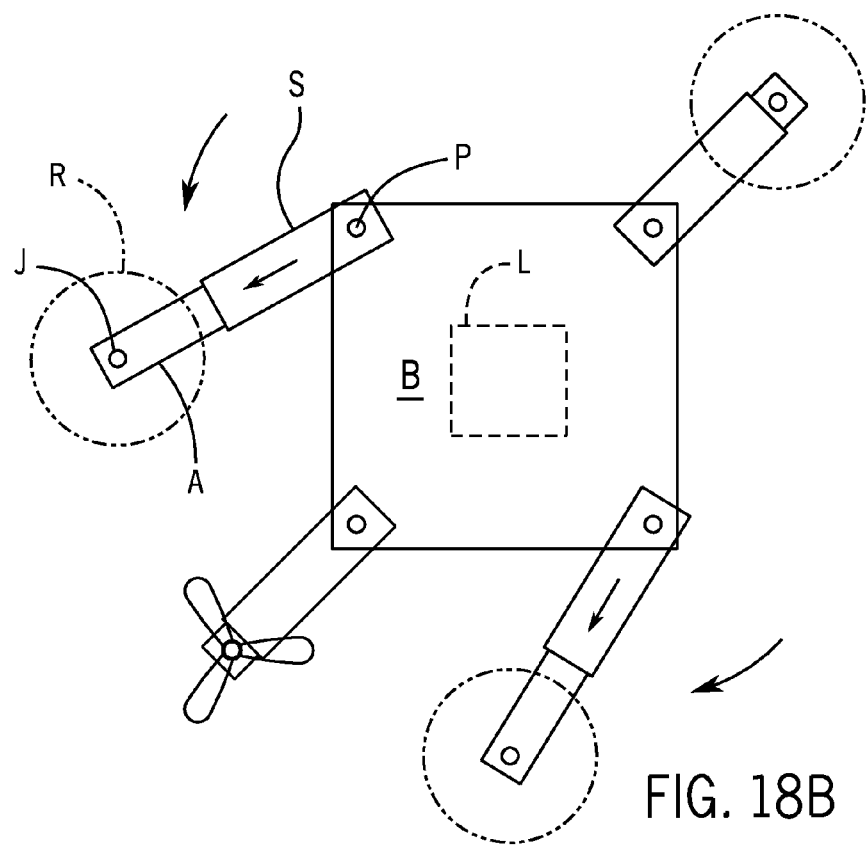
Figure 19A:
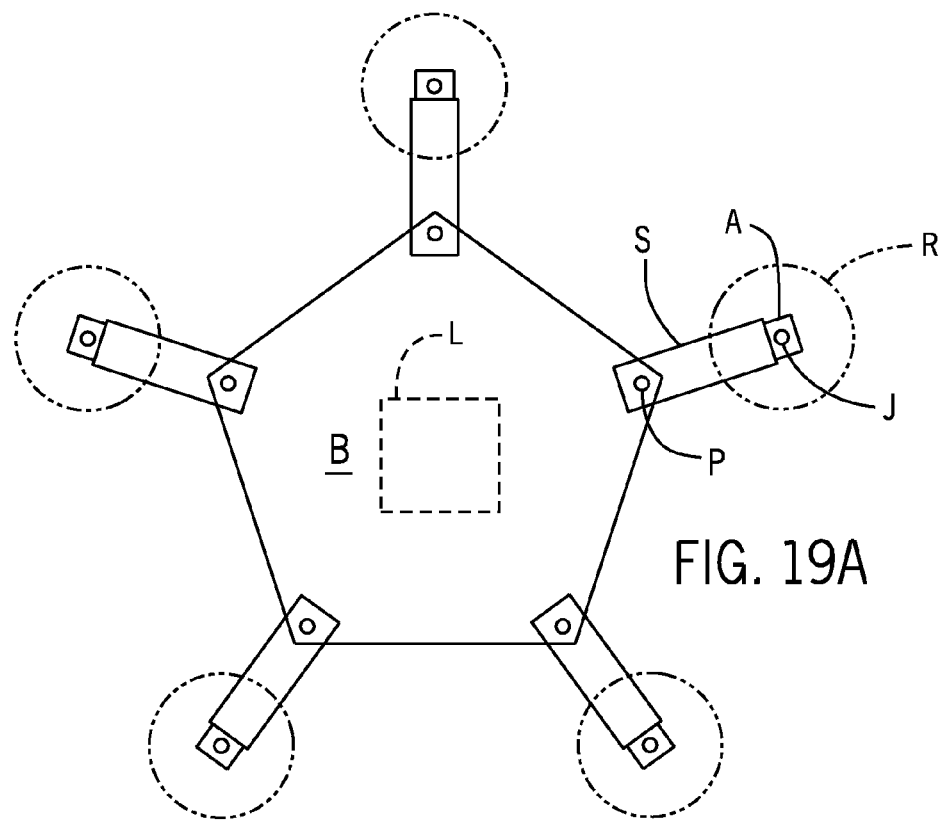
FIGS. 19A and 19B are schematic plan views of an aircraft with reconfigurable arm/boom system according to an embodiment.
Figure 19B:
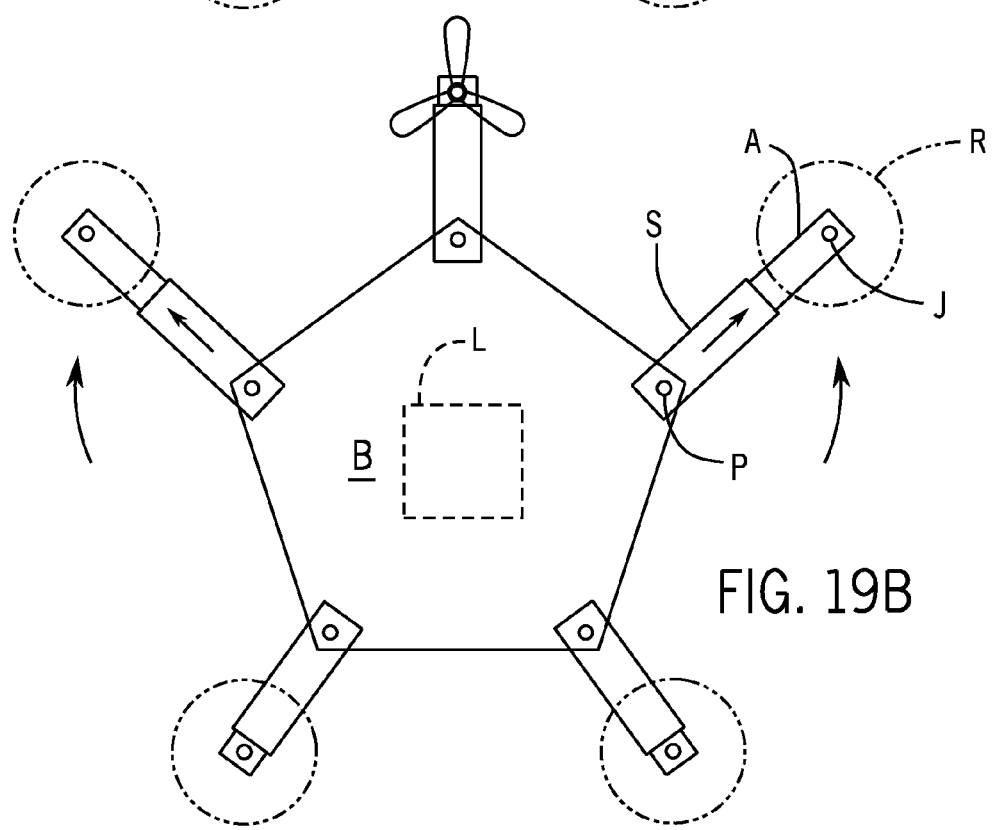

As shown schematically in FIGS. 18A-B, the UAV/craft is carrying payload L (e.g. in/on/under base B) and is configured to operate (before reconfiguration) as a quad-copter (FIG. 18A) or to operate (after reconfiguration) as a tri-copter (FIG. 18B). As shown in FIG. 18B, one rotor is non-operational and the UAV/craft is operating with three rotors in service (and repositioned) to compensate to carry payload L; as shown in FIG. 18A the same type/form of UAV/craft is operating with four rotors in service. As shown schematically according to an exemplary embodiment in FIGS. 19A-B, the UAV/craft is carrying payload L and is configured to operate as a penta-copter (FIG. 19A) or to operate as a quad-copter (FIG. 19B) (e.g. by taking one rotor out of service/operation and repositioning other rotors to compensate as necessary/useful for the purpose/intent).

Figure 20A:
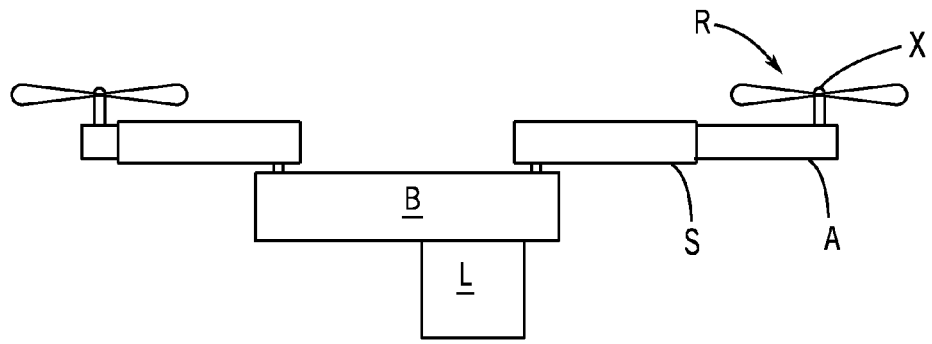
FIGS. 20A and 20B are schematic elevation views of a rotor system with reconfigurable arm/boom system for an aircraft according to an embodiment.
Figure 20B:
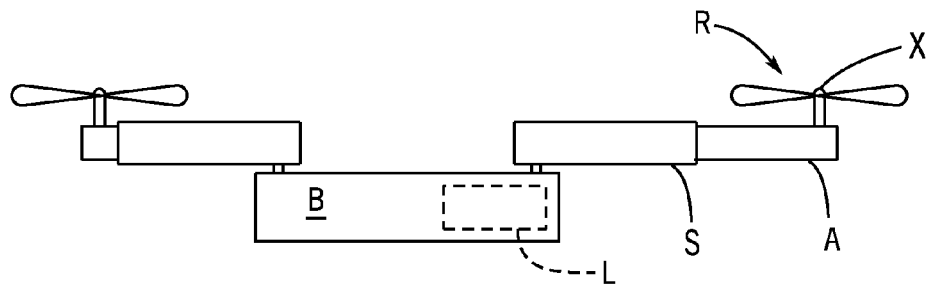
Figure 20C:
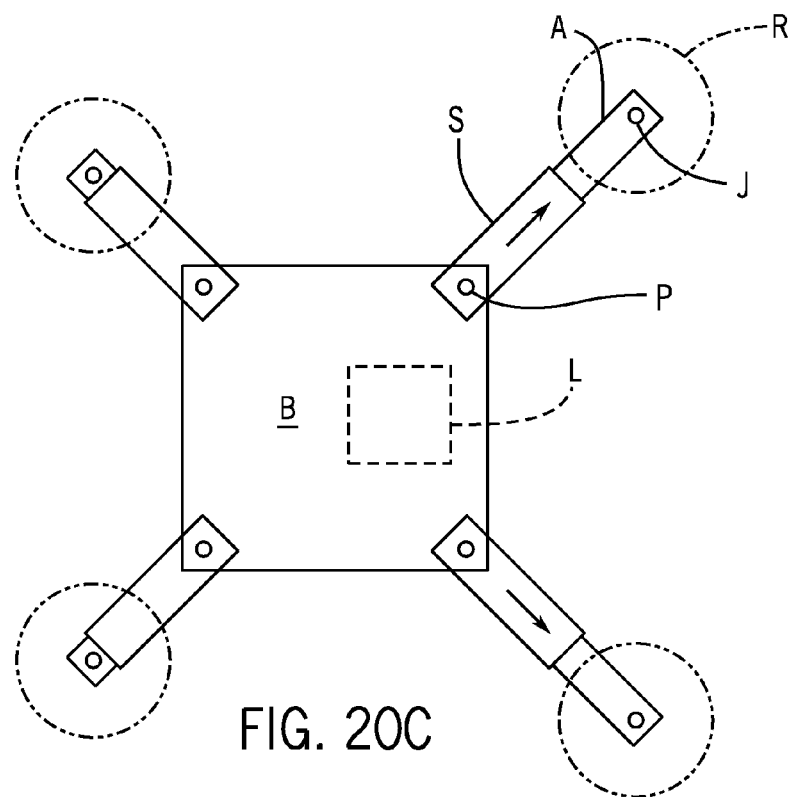
FIG. 20C is a schematic plan view of an aircraft with reconfigurable arm/boom system according to an embodiment.

As shown representationally and schematically according to an exemplary embodiment in FIGS. 20A-C, the UAV/craft is carrying a payload L that is off-center/asymmetrical with respect to the body/base B (see e.g. FIGS. 20A-B); intended to compensate for the mass property effect of the off-center payload, the rotors of the UAV/craft have been repositioned to reconfigure the UAV/craft to carry the payload notwithstanding the asymmetry. As shown schematically, two rotors have been extended (e.g. using a sleeve/arm mechanism, see also FIGS. 7A-D) so that the relative position of the payload is more generally symmetrical with respect to the set of rotors of the UAV/craft.

Referring to FIGS. 21A-D, various other payload/base arrangements are shown representationally and schematically according to an exemplary embodiment with corresponding configurations of the rotors at the UAV/craft intended to compensate for mass property/other effects of the payload. In FIG. 21A, a symmetrical payload that retains the center of mass of the UAV/craft generally in a central location is shown schematically with a corresponding symmetrical rotor configuration; rotor configuration is set at an arm/boom length to the frame/base of $L_a/L_b$ ($L_a=L_b$) and angle of an arm/boom relative to base is set at $A_a/A_b$ ($A_a=A_b$). In FIG. 21B, a symmetrical payload indicated schematically as having a relatively substantial mass (in comparison to the mass indicated in FIG. 21A) results in a reconfiguration of the UAV/craft that is symmetrical with a reduction of the lateral distance between the rotors; rotor configuration is set at an arm/boom length to the frame/base of $L_{az}$ and $L_{bz}$ ($L_{az}=L_{bz}$) and angle of arm/boom relative to base is set at $A_{az}$ and $A_{bz}$ ($A_{az}=A_{bz}$); as noted the angle of arm/boom relative to base has increased. In FIGS. 21C-D, the payload is asymmetrical and the corresponding rotor configuration of the UAV/craft is asymmetrical in an effort to compensate for the off-center location of the center of mass of the loaded UAV/craft. As indicated schematically, the rotor position may be reconfigured by extending/retracting and/or adjusting the angle of the arm/boom relative to the base/frame (and payload); for example in FIG. 21C, angle of one arm/boom $A_{az}$ relative to the base/frame is less than the angle of the other arm/boom $A_{bx}$ relative to the base/frame; in FIG. 21D, the length of one arm/boom $L_{ay}$ relative to the base/frame is larger than the length of the other arm/boom $L_{by}$ relative to the base/frame.

Referring to FIGS. 22A-C and FIGS. 23A-C, according to an exemplary embodiment shown representationally and schematically, the UAV/craft is carrying a multi-component payload L with components A/B/C (e.g. payload segments). According to an exemplary embodiment, the mission of the UAV/craft is to make successive deliveries of each component A/B/C of payload L as separate locations. At the start of the mission the UAV/craft is configured as an octa-copter with the complete payload L comprising components A/B/C (see FIGS. 22A and 23A); after the first delivery (of component C) the payload comprises components A/B (at reduced mass) and the UAV/craft is configured as a hexa-copter (see FIGS. 22B and 23B); after the second delivery (of component B) the payload comprises component A (of further reduced mass) and the UAV/craft is configured as a quad-copter (see FIGS. 22C and 23C). As indicated representationally and schematically, the UAV/craft of FIGS. 22A-C is reconfigured by a different mechanism (e.g. rotors or arms/booms retracting/extending by translation in tracks) than the UAV/craft of FIGS. 23A-C (e.g. rotors or arms/booms retracting/extending by rotation into/within base).

As indicated representationally and schematically according to an exemplary embodiment, the non-operational rotors may be retracted in the base as to reduce drag effects and enhance the aerodynamic profile/performance of the UAV/craft with payload; according to an exemplary embodiment the energy efficiency and/or performance of the UAV/craft may be improved (e.g. in a corresponding manner) as the mass of the payload is reduced (e.g. as components of the payload are delivered). As also indicated schematically in FIGS. 22A-C and 23A-C, repositioning of the rotors to reconfigure the UAV/craft may be performed as a coordinated motion of multiple rotors each on corresponding arms/booms in a sequence substantiality, simultaneously, or in a variation/combination of coordinated/sequential movements. See e.g. FIGS. 6A-D, 11A-H, 12A-C and 13A-C.

According to the exemplary embodiments shown representationally and schematically, the reconfiguration of rotor position can be implemented to rebalance mass properties of the UAV/craft with payload, including in view of the form/shape and size/mass of the payload and the manner in which the payload is associated with the UAV/craft. For example, the mass property effects of the payload of the UAV/craft may vary depending upon whether the payload is supported with the base, contained within the base, externally mounted to the base, suspended from the base, etc.; the shape of the payload may also determine how the payload is associated with the UAV/craft. See FIGS. 21B (payload suspended from the base of the UAV/craft) and 21C-D (payload with irregular, eccentric, asymmetrical mass properties). The flight characteristics of the reconfigurable UAV/craft can be modified at the time a payload is associated with the base; a subsequent reconfiguration may be intended to compensate for shape/dimensions of a payload or to compensate for mass properties of a payload; a subsequent reconfiguration may be during a mission to rebalance mass properties after partial delivery of payload. According to an exemplary embodiment, as the payload having a mass is carried the position of at least one rotor is modified to compensate for the mass of the payload (including the position of the mass of the payload relative to the base.

A method of configuring a reconfigurable UAV/craft for a mission to carry a payload having a shape may comprise the steps of determining the properties of the payload; determining the manner in which the payload will be coupled to the aircraft/base; determining a modified configuration for the rotor system to compensate for the shape and mass of the payload relative to the base; and positioning the rotor system in order to balance the mass of the payload relative to the craft/base. According to an embodiment, a reconfigurable UAV/craft may begin a mission with a short low altitude hovering phase in which it empirically determines its center of mass characteristics (e.g. offsets due to payload or fuel imbalances) and then repositions the rotor system in order to balance the center of mass and lift loads, before continuing its ascent and mission. According to an exemplary embodiment, the system may respond to a shift in the payload (e.g. shift in center of gravity or mass of the payload) by reconfiguration of the rotor system to compensate for the change the mass properties and/or to preserve or restore/reestablish intended flight dynamics.

Location for Reconfiguration During Mission

According to an exemplary embodiment, the reconfigurable UAV/craft will initially be configured prior to the start of a mission/flight while on the ground at a station. The UAV/craft will initiate the flight with a flight configuration (or after transitioning from an ascent configuration to the flight configuration immediately after ascent, see FIGS. 17A and 17B).

Once in operation/flight on the mission the reconfigurable UAV/craft may be able to maintain flight stability so that reconfiguration may take place without landing the UAV/craft; maintaining flight stability during reconfiguration may comprise an intermediate repositioning of rotors (e.g. to maintain mass balance in the repositioning process) and/or an operation with intermediate rotor speed for operational rotors (e.g. to maintain elevation/lift and stability). According to an exemplary embodiment, the UAV/craft may be commanded by the control system to hover at a designated elevation and/or to or above locate to a specified location (e.g. for safety/precautionary purposes) during reconfiguration. According to an exemplary embodiment, if a reconfiguration is necessary or advisable during a mission/flight, the UAV/craft may be commanded or directed to land at a specified location (e.g. lot or station) for reconfiguration; after reconfiguration the UAV/craft will resume the mission/flight if operational (or may return to a service center/station). According to a preferred embodiment, the monitoring system of the reconfigurable UAV/craft is able to provide data to inform the control system/program as to the status/condition of the aircraft/subsystems to facilitate a determination of how/where/whether reconfiguration should be performed.

Methods of Operation/Management

Figure 33:
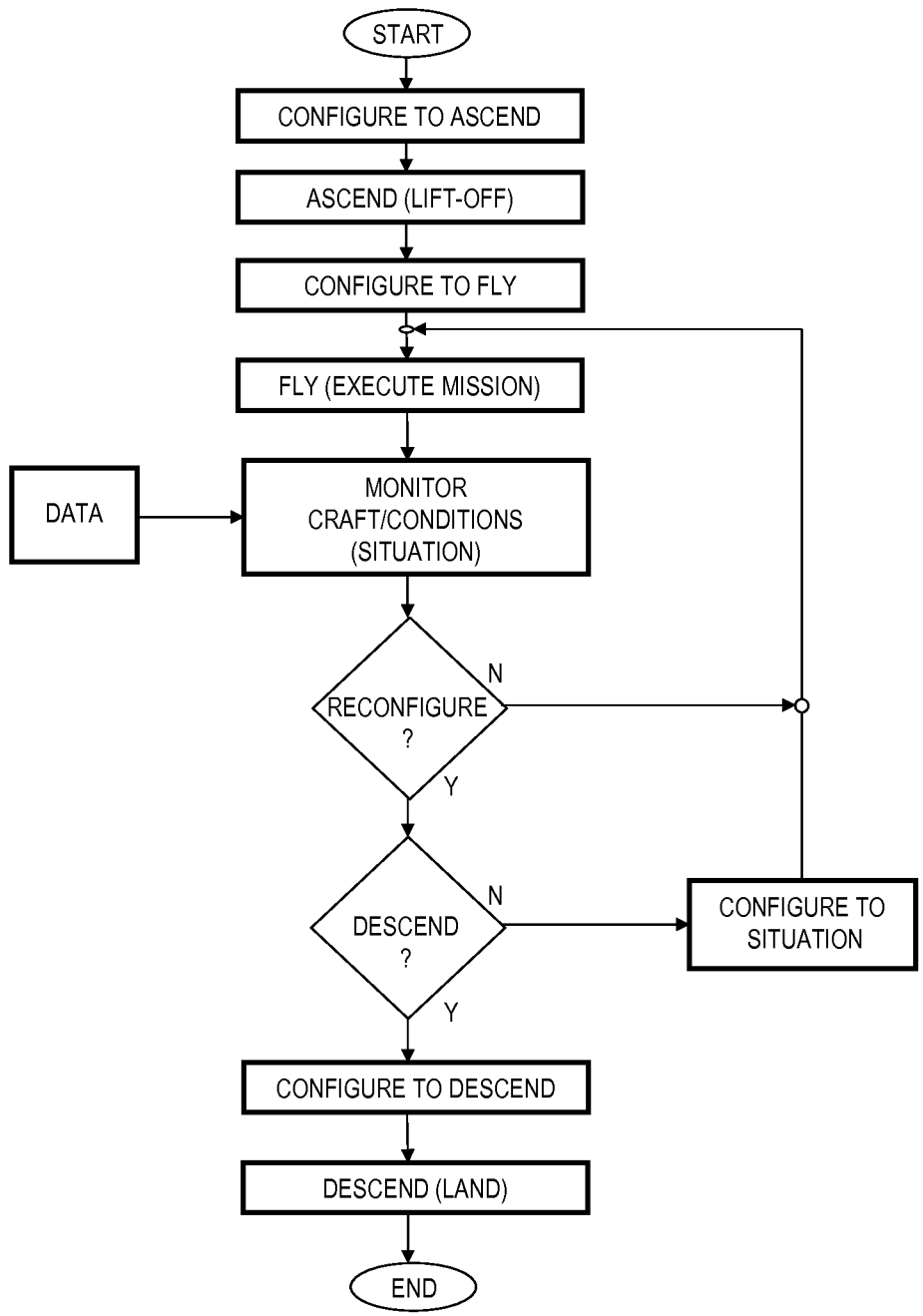
FIG. 33 is a flow diagram for a method of operation of a system for configuration/reconfiguration and use of an aircraft on a mission according to an embodiment.
Figure 34A:
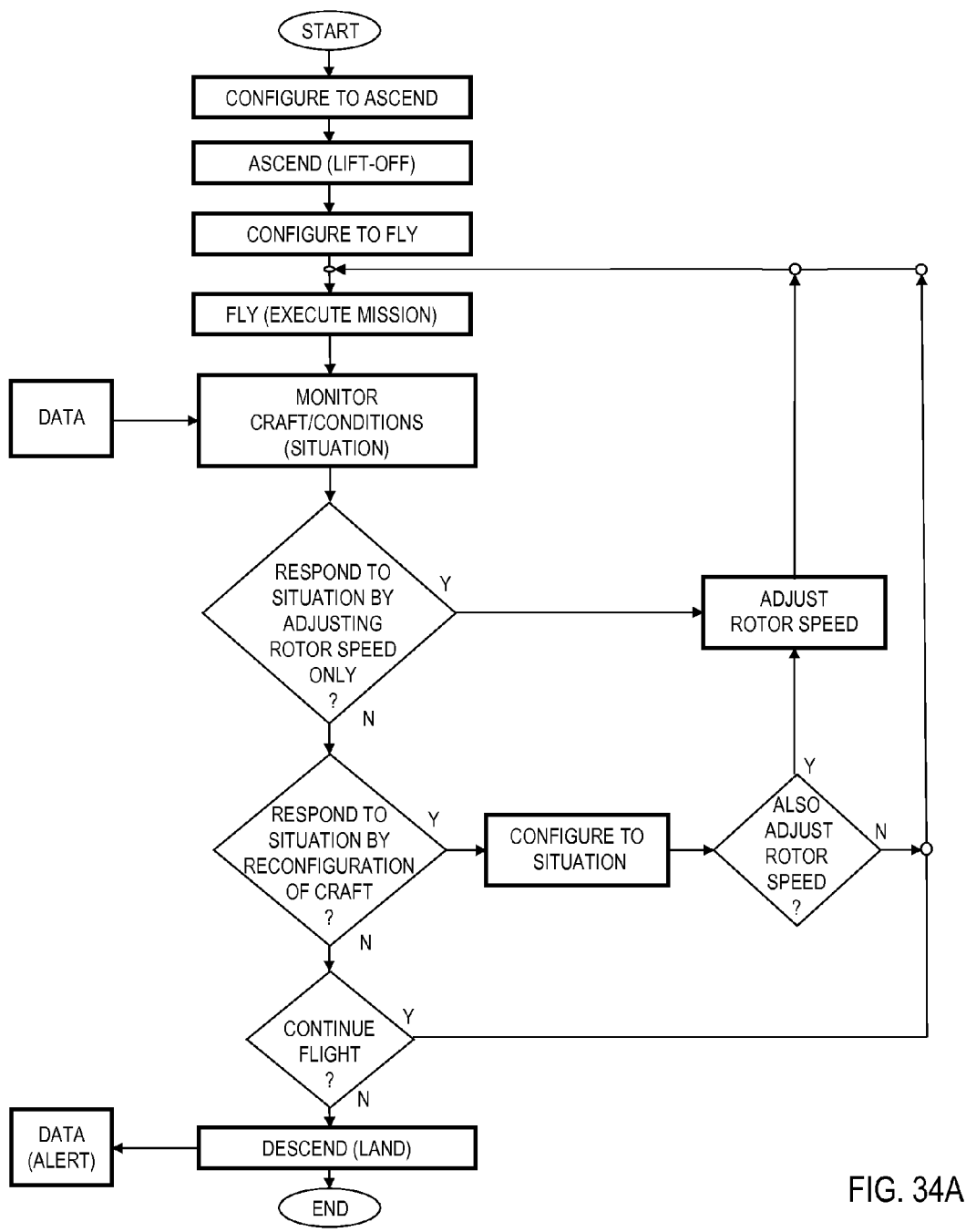
FIGS. 34A and 34B are flow diagrams for a method of operation of a system for configuration/reconfiguration and use of an aircraft on a mission according to an embodiment.
Figure 34B:
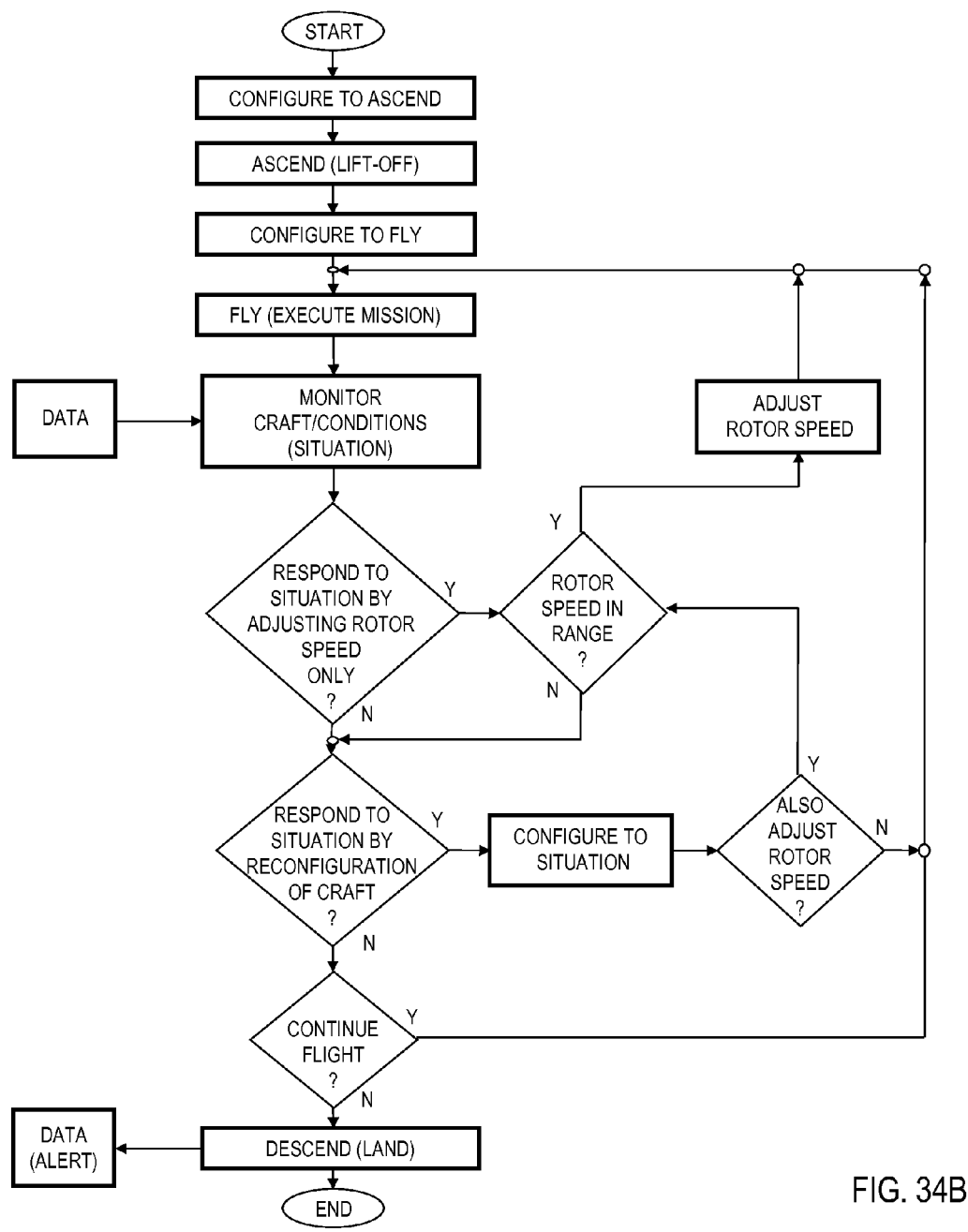
Figure 35:
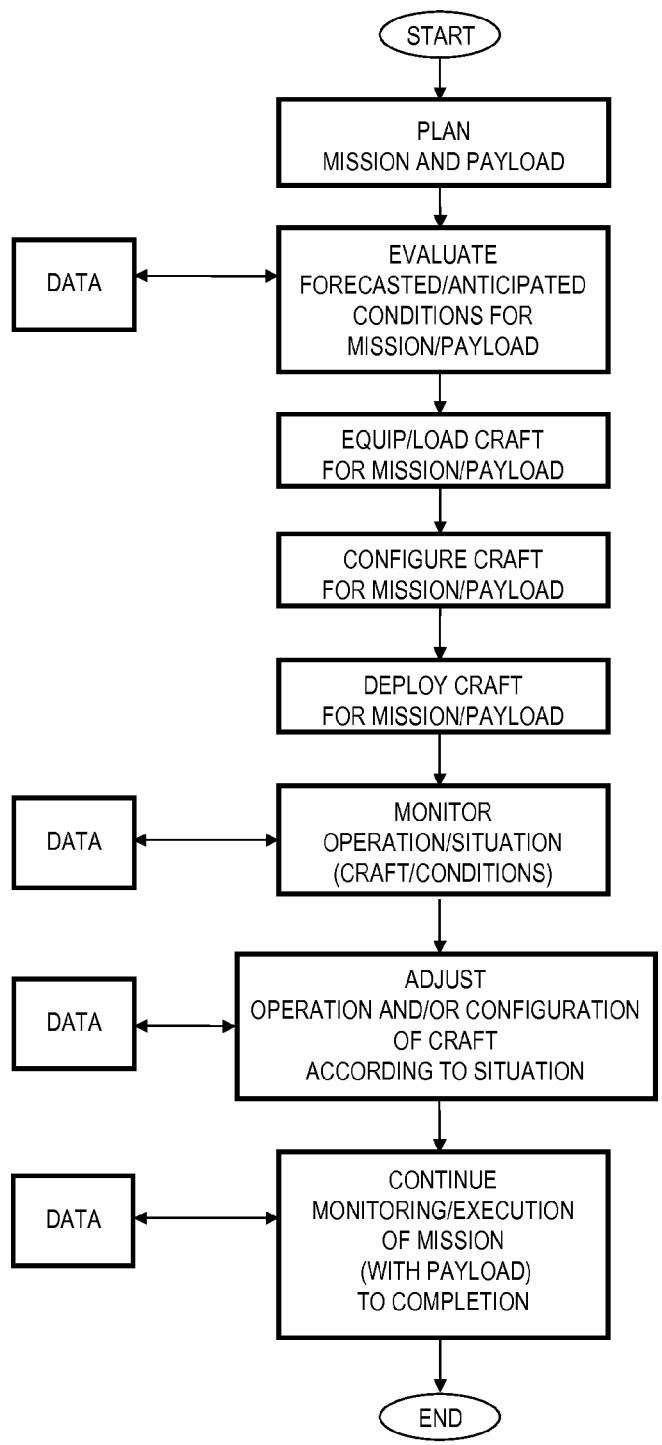
FIG. 35 is a flow diagram for a method of operation of a system for configuration/reconfiguration and use of an aircraft on a mission to carry a payload according to an embodiment.
Figure 36A:
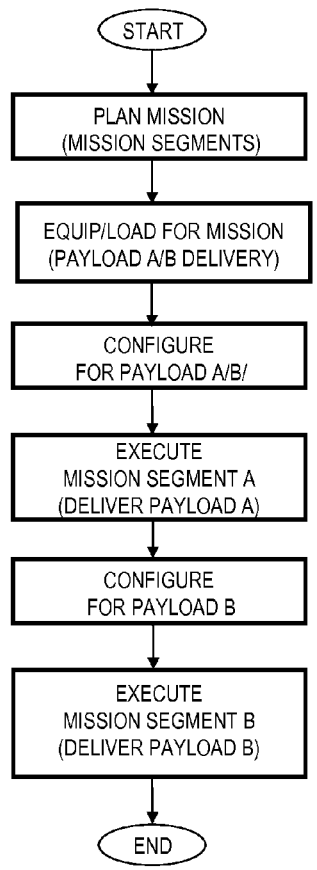
FIGS. 36A and 36B are flow diagrams for a method of operation of a system for configuration/reconfiguration and use of an aircraft on a mission to carry a payload according to an embodiment.
Figure 36B:
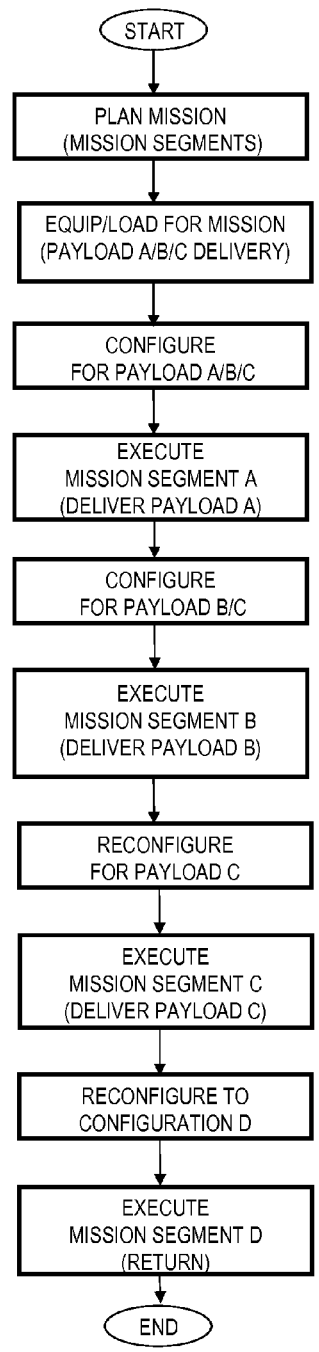

According to an exemplary embodiment, the reconfigurable UAV/craft system may be used to perform a variety of duties/functions implemented with apparatus/systems/subsystems according to methods for operation/management as indicated representationally and schematically in FIGS. 30 to 34A/B (generally) and FIGS. 35 to 36A/B (with payload). See also FIGS. 24 to 28B (system/system and data/management functions).

Figure 30:
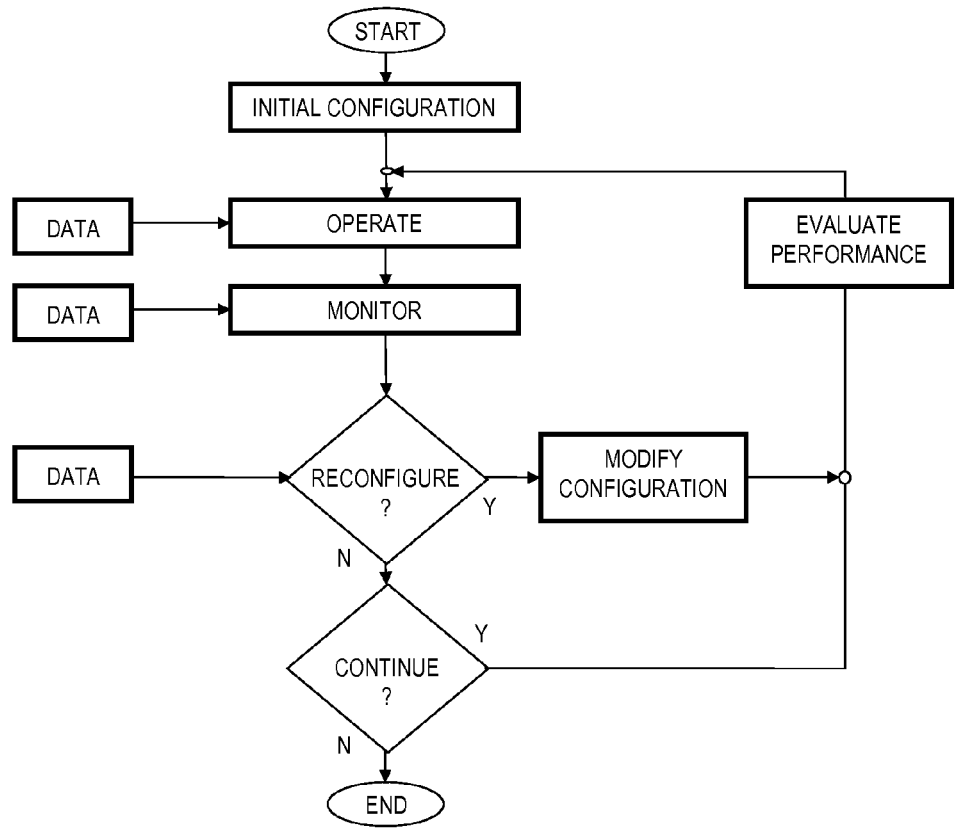
FIG. 30 is a flow diagram for a method of operation of a system for configuration/reconfiguration and use of an aircraft on a mission according to an embodiment.

Referring to FIG. 30, according to an exemplary embodiment of a method of operation/management the reconfigurable UAV/craft is configured in an initial configuration and operated to perform a duty/mission while operating conditions are being monitored; if monitoring of operating conditions indicates that reconfiguration is advisable (e.g. monitoring of acoustic data, data from stress/strain/force gauges/sensors at a rotor/rotor mount, etc. indicates a potential rotor malfunction may be imminent) the UAV/craft will determine whether to reconfigure. As shown, if the UAV/craft is reconfigured (e.g. configuration is modified to adjust rotor positioning to adjust capability to the conditions or to shutdown/retract the malfunctioning/about-to-fail rotor while repositioning the operable rotors) the UAV/craft can complete some or all of the remaining mission segments. As indicated, according to an exemplary embodiment the method comprises use of data from data sources (e.g. on aircraft systems, network data, control/commands, operating programs, data communications, etc.) by the UAV/craft system in operation, monitoring, configuration, etc. See FIGS. 24-28B (control system/program implementation).

Figure 31:
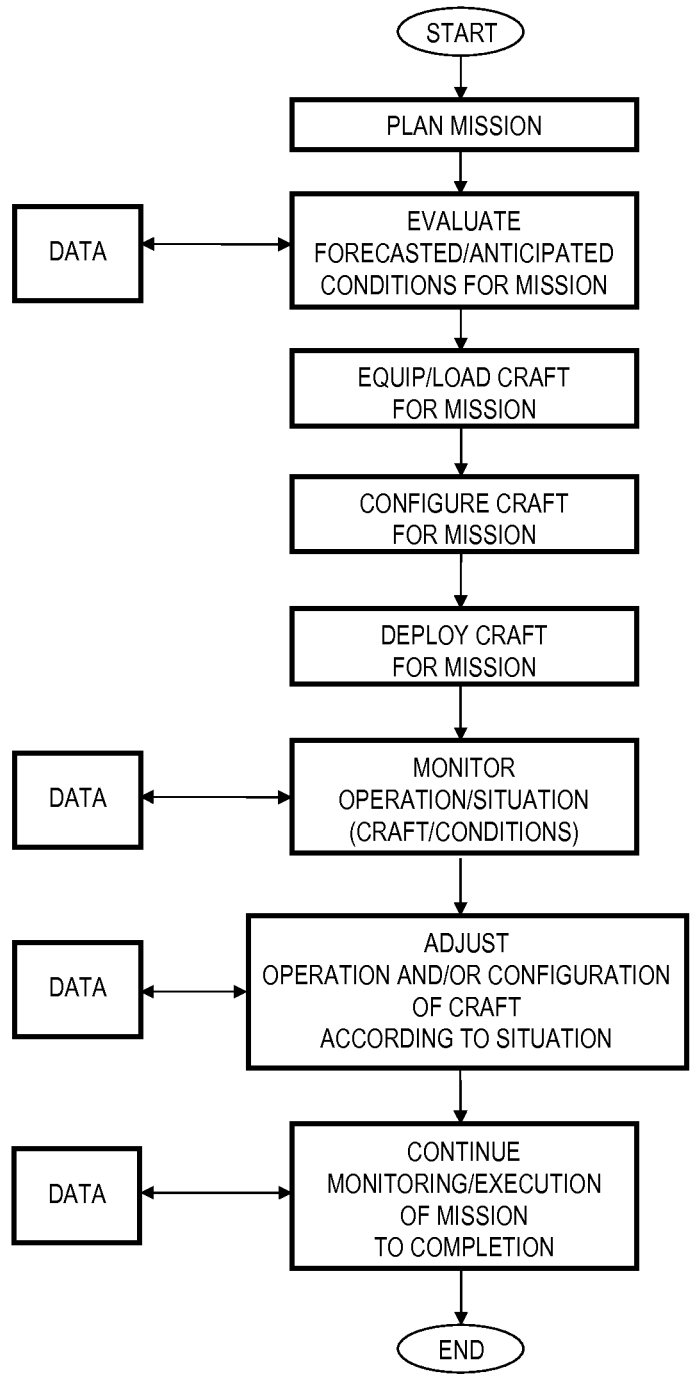
FIG. 31 is a flow diagram for a method of operation of a system for configuration/reconfiguration and use of an aircraft on a mission according to an embodiment.

Referring to FIG. 31, a method of planning/configuring a reconfigurable UAV/craft for a mission is shown representationally and schematically according to an exemplary embodiment. The mission (including mission segments, duty/route, etc.) is planned; forecasted/anticipated conditions (e.g. operating conditions expected to be encountered) for the mission are evaluated (including using data from data sources/analytics); the UAV/craft is configured for the mission (including by deployment and positioning of the rotor system) in consideration of the mission/payload and anticipated operating conditions, among other considerations; the UAV/craft is deployed to begin the mission in the configuration. The operation of the UAV/craft in the configuration (including situation/conditions of operation) is monitored; adjustment in the operation (e.g. control of rotor speed) and/or configuration (e.g. reconfiguration of rotor position) may be implemented for the UAV/craft as necessary or advisable in the situation (e.g. under operation of a control system/program); operation of the UAV/craft is monitored in real-time as the mission is executed to completion. (As indicated, data may be interchanged between the UAV/craft and a base station/data sources during operation.)

Operation/Management Method—Mission Segments/Configurations

Figure 32A:
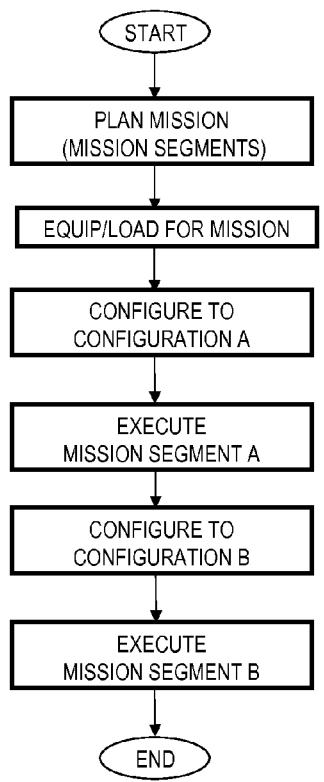
FIGS. 32A and 32B are flow diagrams for a method of operation of a system for configuration/reconfiguration and use of an aircraft on a mission according to an embodiment.
Figure 32B:
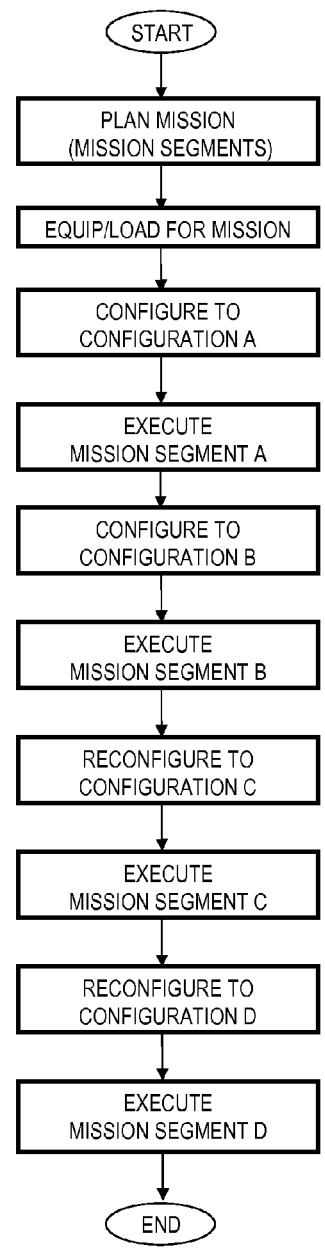

Referring to FIGS. 32A and 32B, according to a method as shown representationally and schematically according to an exemplary embodiment, a reconfigurable UAV/craft may be deployed for a (planned) mission comprising multiple mission segments (e.g. multiple separate/discrete tasks or functions); as indicated, the reconfigurable UAV/craft may be configured and equipped and loaded initially then reconfigured for each mission segment as the mission is executed to completion. See FIG. 32A (mission with segments A/B and corresponding craft configurations A/B) and FIG. 32B (mission with segments A/B/C/D and corresponding craft configurations A/B/C/D).

Referring to FIG. 33, the reconfigurable UAV/craft may be provided with certain set (e.g. pre-programmed) configurations (e.g. of the rotor system) for certain routine/regular/other functions or operations of the UAV/craft; as indicated, the UAV/craft has an "ascend" configuration for the rotor system (e.g. intended to optimize performance/stability as the UAV/craft ascends to take flight at a station/stop); the UAV/craft has a "descend" configuration of the rotor system (e.g. intended to optimize or enhance performance/stability as the UAV/craft lands at a station/stop to complete a flight). As indicated, during flight (after ascent/take-off) the UAV/craft may be monitored (e.g. with data from data sources) and reconfigured as needed/advisable for the situation (e.g. determined by the control system/program) until the UAV/craft is to descend/land at the end of the mission; as indicated, during the flight on the mission monitoring may be regular and/or a continuous (e.g. in real-time) during operation and the UAV/craft may be reconfigured at least once or multiple times (or not at all/only at ascent and descent). (According to an exemplary embodiment, the UAV/craft may be reconfigured while in flight without landing or may be landed or hovered in a location for reconfiguration to be executed.)

Operation/Management Method—Rotor Speed Adjustment and/or Rotor Position Adjustment Referring to FIGS. 34A and 34B, a method of operation and management of a reconfigurable UAV/craft is shown representationally and schematically according to an exemplary embodiment. According to an exemplary embodiment, the reconfigurable UAV/craft is configured for adjustment of rotor speed and for modification of rotor position; operation and management of the UAV/craft comprises the capability to use both rotor speed and rotor position for flight control (e.g. for control of flight characteristics) of the UAV/craft. (As indicated, rotor position modification may comprise reconfiguration of position or pitch/attitude of one or more rotors of the rotor system of the UAV/craft.)

As indicated in FIGS. 34A-B, in a method according to an exemplary embodiment the reconfigurable UAV/craft is configured to ascend and to fly on the mission and is monitored during the mission; if a situation is detected during flight that under the control program/system may require an adjustment/modification of flight characteristics of the UAV/craft, the determination will be made by the system as to whether an adjustment of rotor speed (to the situation) will be suitable as an adaptation for the situation to facilitate confirmed operation of the UAV/craft; if so rotor speed will be adjusted (to the situations) and flight will continue with no modification of rotor position (e.g. no change in position of any rotor of the rotor system). If the system determines that modification of rotor position is warranted, rotor position will be modified and the UAV/craft will be reconfigured (to the situation); a determination will be made as to whether adjustment of rotor speed is also warranted and if so rotor speed will also be adjusted (to the situation) and flight will continue with a reconfigured UAV/craft. The flight of the UAV/craft on the mission will continue until the UAV/craft is commanded to land and/or has completed the mission. (If in a situation a suitable response is not possible or advisable using adjustment of rotor speed and/or reconfiguration of rotor position, the UAV/aircraft may be commanded to end the flight and return/land.) See FIG. 34A. (For example, by design or in an application/installation in a UAV/craft, a rotor may have an operating speed range that is specified; the system may be configured so that the rotor is operated within the operating speed range; such range may be determined by the type of rotor system, power plant, etc.)

As indicated in FIG. 34B according to an exemplary embodiment, the rotor speed of the reconfigurable UAV/craft may be restricted or limited in range (e.g. minimum and maximum design speed) by design and/or by the control system/program of the UAV/craft. As indicated, if the rotor speed adjustment to respond to the situation would require operation at a rotor speed outside of the suitable/intended range of operation (e.g. design operating range) then the response to the situation may require reconfiguration of the rotor position (for the situation); adjustment of rotor speed (within the suitable/intended design/control range) may also be made for the reconfigured UAV/craft. See FIG. 34B. As indicated according to an exemplary embodiment, operation and management of the reconfigurable UAV/craft is performed using rotor speed control and rotor position configuration.

Operation/Management Method—Configuration/Reconfiguration

According to an exemplary embodiment of the reconfigurable UAV/craft as shown schematically in FIGS. 17A-C, the reconfiguration of position of at least one rotor in the rotor system can be performed before operation of the aircraft in response to anticipated operating conditions (see FIGS. 17B-C). According to an exemplary embodiment, the reconfiguration of position of at least one rotor can be performed before operation of the aircraft in response to desired flight characteristics and/or in response to the payload (e.g. FIGS. 21A-D).

According to an exemplary embodiment as indicated representationally and schematically in FIGS. 17A-B, a method of operating a reconfigurable multi-rotor unmanned aircraft for flight characteristics on a mission in operating conditions may comprise the steps of (a) configuring the aircraft in an ascent configuration with flight characteristics for ascent to start a flight (e.g. FIG. 17A); (b) configuring the aircraft in a second configuration with flight characteristics for flight in operating conditions (e.g. FIG. 17B); and (c) configuring the aircraft in a descent configuration with flight characteristics for descent to conclude a flight (e.g. FIG. 17A). The method may also comprise configuring the aircraft in a third configuration for flight in modified operating conditions (e.g. FIG. 17C); each flight configuration provides flight characteristics for flight in the expected/forecast operating conditions. As indicated, the descent configuration is at least substantially the same as the ascent configuration.

According to an exemplary embodiment shown representationally and schematically in FIGS. 22A-C, a method of operating a reconfigurable multi-rotor unmanned aircraft for flight characteristics on a mission having multiple segments in operating conditions may comprise the steps of configuring the aircraft in first configuration with flight characteristics for the first mission segment (e.g. FIG. 22A); configuring the aircraft in a second configuration with flight characteristics for the second mission segment (e.g. FIG. 22B); configuring the aircraft in a third configured with flight characteristics for the third mission segment (e.g. FIG. 22C). Each flight configuration may comprise the use of a different number of rotors of the rotor system and/or a different rotor position configuration. According to an exemplary embodiment as shown representationally and schematically in FIGS. 22A-C, the aircraft is of a type having at least six rotors (e.g. an octa-copter with eight rotors in total); the first configuration comprises use of more than six rotors (e.g. eight rotors for a relatively large payload delivery); the second configuration comprises use of six rotors; and the third configuration comprises use of fewer than four rotors.

As indicated according to the exemplary embodiments, available configurations of the reconfigurable UAV/craft may be implemented for other purposes/segments of a mission; available configurations are determined in view of the design/construction and capacity of the UAV/craft (and operating conditions). Configurations of the reconfigurable UAV/craft for a mission may be determined according to a mission plan (e.g. before the operation/flight of a mission) or as determined during flight/operation on a mission in response to operating conditions.

According to an exemplary embodiment of a method of operation/management of a reconfigurable UAV/craft, the reconfiguration of position of at least one rotor of the rotor system can be performed during operation of the aircraft; for example, the reconfiguration of position of at least one rotor may be performed during operation in response to changed performance of a rotor such as a failing or failed rotor (e.g. to compensate for loss of thrust of a rotor and/or to restore or to provide stability for flight dynamics). The reconfiguration of position of at least one rotor can be performed during operation of the reconfigurable UAV/craft in an effort to change flight characteristics (e.g. to modify flight dynamics, modify drag, balance mass properties, reduce energy use, improve energy efficiency, improve performance, increase maximum velocity, counteract weather effects, etc.); the reconfiguration may provide for a balancing or rebalancing of the aircraft and payload (see FIGS. 21A-D) (for example in response to mass property/inertia effects of the payload on flight dynamics/characteristics such as due to moving/swaying/lagging of payload suspended from the aircraft or if there is a mass change due to a leak or loss of payload) and/or during a mission to rebalance mass properties after partial delivery of a composite (multi-item) payload (see FIGS. 22A-C).

Operation/Management Method—Reconfiguration for Malfunctioning/Inoperable Rotor

According to an exemplary embodiment of a method of operation/management of a reconfigurable UAV/craft, the determination to reconfigure the rotor system may result from a malfunction of an aircraft system or subsystem. For example, a malfunction may comprise of (a) the rotor unable to provide commanded rotation speed; (b) the rotor unable to provide expected thrust; (c) the rotor unable to be given intended pitch; (d) the rotor unable to be positioned to the intended rotor position. A malfunctioning/inoperable rotor may be caused by a failing power plant (e.g. motor or engine) or energy storage system (e.g. fuel or battery problem) or other causes such as impact with an object, improper maintenance/service, defective component, etc.

According to an exemplary embodiment of the method of operation/management of the reconfigurable UAV/craft the rotor that is malfunctioning or becomes inoperable may be shut down (and repositioned relative to the base and/or each other rotor) and at least one operational rotor may be repositioned to reestablish a balanced configuration for the UAV/craft; according to any preferred embodiment, after reconfiguration the UAV/craft is able to operate in the reconfigured position to compensate for the loss of function of the non-operational/malfunctioning rotor. See FIGS. 30-34B.

According to an exemplary embodiment, the reconfigurable UAV/craft system will comprise a monitoring system to detect potential rotor/rotor system issues or other problems before (or immediately upon) a complete malfunction (e.g. so that a nearly immediate response may be initiated). See FIGS. 25 and 26. The monitoring system of the UAV/craft may evaluate (e.g. in real time from sensors/devices) data representative of such parameters as (a) rotational speed of rotor; (b) force at rotor bearings; (c) force applied at rotor mount; (d) vibration at rotor; (e) temperature of rotor motor system. Other operational parameters may be monitored to determine the status/condition and health of components of the UAV/craft system including the rotor system using any of a wide variety of sensors/detectors/devices (e.g. load cells, stress/strain sensors, accelerometers, vibration sensors, electronic detectors, video/visual monitoring, etc.) and methodologies presently in use, including with aircraft systems. See e.g. U.S. Pat. No. 8,775,013 titled "System and Method for Acoustic Signature Health Monitoring of Unmanned Autonomous Vehicles (UAVS)" (acoustic monitoring of UAV/aircraft systems). The detector/sensor D of the monitoring system is shown representationally and schematically according to an exemplary embodiment in FIGS. 1 and 2 (e.g. at or adjacent to a rotor, boom, joint, etc.)

According to an exemplary embodiment of a method of operation/management of a reconfigurable UAV/craft, if a malfunctioning rotor is detected by the monitoring system in advance of the malfunction it may be possible for responsive corrective action to be determined/commanded and taken prior to a larger or more complete failure (e.g. prior to the malfunctioning rotor becoming totally inoperable) or in any event so that the control system is better able to manage the situation and maintain flight operation/stability of the reconfigurable UAV/craft. According to the method of operation/management as indicated, the reconfiguration of position of at least one operational rotor can be performed in response to predicted or anticipated (future possible/probable) malfunction of a rotor (e.g. see FIG. 30); the reconfiguration of rotor position may be commanded or directed by the control system at or in the early stages of a malfunction (e.g. if a malfunction is in process of occurring gradually the control system will have time gradually to implement corrective action such as a modification of rotor/boom configuration as will permit more stable control/maintenance of flight characteristics/stability in the situation).

According to an exemplary embodiment a method of reconfiguring selectively reconfigurable aircraft with a rotor system with at least one rotor that is at least partially malfunctioning may comprise the steps of identifying the rotor that is malfunctioning; identifying a rotor that is able to function (and is in an initial position); repositioning at least one functional rotor to a reconfigured position. According to the exemplary embodiment, the rotor system with at least one functional rotor after reconfiguration (e.g. in the reconfigured position) is able to compensate for the loss of function of the malfunctioning rotor. According to a preferred embodiment, the aircraft is able to remain in flight/operation without thrust/lift otherwise contributed/available to be provided by the malfunctioning/inoperable rotor; at least one functional rotor when repositioned to the reconfigured position is able to compensate for the loss of contribution of thrust/lift resulting from the malfunctioning/inoperable rotor.

According to an exemplary embodiment, during or in coordination with reconfiguration of the reconfigurable UAV/craft the malfunctioning/inoperable rotor of the rotor system may be retracted or stowed (see FIGS. 6B/C and 6D/E).

Materials of Construction

According to an exemplary embodiment, the base/structure, frame, arms/booms/members, mechanisms, rotor system, and other components of the UAV/craft will be made (e.g. formed, constructed, etc.) from materials that are suitable for use in aircraft applications (i.e. materials such as carbon fiber/composites, kevlar, engineered plastics, high-strength polymers/plastics, light-weight/density metal alloys, aluminum, titanium, steel, etc.) as known and used in the art (now and in the future).

Fleet Management System

Figure 29:
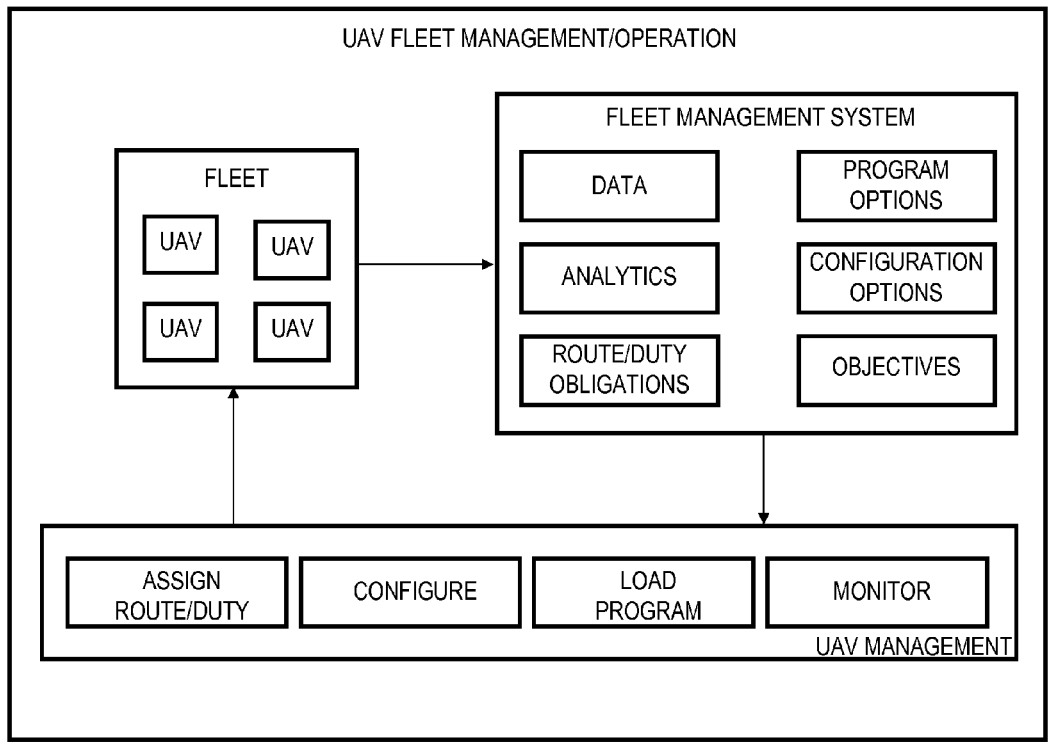
FIG. 29 is a block diagram of a fleet management/operation system for a fleet of UAV/aircraft with reconfigurable arm/boom system according to an embodiment.

Referring to FIG. 29, a system for management of a fleet of multiple reconfigurable UAV/craft is shown representationally and schematically according to an exemplary embodiment.

According to an exemplary embodiment, the fleet management system is implemented by a computing system (see FIG. 24) over a network and to use data from UAV/craft systems (see FIGS. 25-28B). The fleet management system is able to configure and deploy reconfigurable UAV/craft to perform missions; the fleet management system may also manage maintenance and repair of UAV/craft in the fleet as well as storage of UAV/craft no longer in use. According to an exemplary embodiment, the fleet will comprise multiple units of the same/identical or similar type UAV/craft that individually and/or collectively can be configured and reconfigured according to needs and objectives as part of the fleet management function. For example, a fleet having three identical/similar UAV/craft and three different missions to perform may be managed so that each individual UAV/craft is configured and programmed in a different manner to perform one of the different missions.

According to an exemplary embodiment where each UAV/craft is an octa-copter (see FIGS. 22A-C), one UAV/craft may operate on a mission such as carrying a substantial payload as an octa-copter (see FIG. 22A); one UAV/craft may operate as a hexa-copter on a mission with a lesser payload and/or longer route (see FIG. 22B); one UAV/craft may operate as a quad-copter on a mission with a surveillance/monitoring function where the payload is a video monitoring system (see FIG. 22C). Each UAV/craft may, for a subsequent mission, be reconfigured and reprogrammed in a different manner.

According to an exemplary embodiment (as indicated schematically in FIG. 29), each UAV/craft in the fleet is able to be configured/programmed and reconfigured/reprogrammed to operate as a multi-function device to perform multiple types of missions (e.g. route/duty obligations) serving various needs/objectives while sharing data/analytics. According to an exemplary embodiment, the fleet management system is able to assign missions (e.g. routes/duties) to individual UAV/craft in the fleet in an efficient manner in view of the configuration options for each UAV/craft.

When not in use the reconfigurable UAV/craft in the fleet may be put in a storage configuration with all rotors retracted. See FIG. 6E.

Incorporation of Present Technology/Systems

The system and method according to exemplary and alternative embodiments may be configured to integrate or operate with present known (and/or future) systems and technology, for example, systems for operating/monitoring and transforming UAV/craft (e.g. U.S. Patent Application Publication No. 2014/0263823 titled "Transformable Aerial Vehicle", U.S. Pat. No. 7,922,115 titled "Modular Unmanned Air-Vehicle", U.S. Patent Application Publication No. 2014/0129059 titled "Method and Apparatus for Extending the Operation of an Unmanned Aerial Vehicle"), systems for monitoring the state of operation/condition of an aircraft (e.g. U.S. Pat. No. 8,775,013 titled "System and Method for Acoustic Signature Health Monitoring of Unmanned Autonomous Vehicles (UAVS)"), robotic arm systems/mechanisms (e.g. U.S. Pat. No. 8,758,232 titled "Robotic Arm"), systems for adjusting for rotating blades/vanes (e.g. U.S. Pat. No. 2,473,134 titled "Adjustable Rotor Blade", U.S. Pat. No. 2,844,207 titled "Adjustable Fan Blade Assembly"), and mechanisms for moving/manipulating mechanical elements and members/components (e.g. U.S. Pat. No. 8,534,147 titled "Electromotive Linear Drive", U.S. Pat. No. 4,614,128 titled "Linear Drive Device with Two Motors", U.S. Pat. No. 5,409,269 titled "Ball Joint Mechanism", U.S. Pat. No. 6,101,889 titled "Ball Screw and Nut Linear Actuator Assemblies and Methods of Constructing and Operating Them", U.S. Pat. No. 6,238,124 titled "Locking Joint Mechanism", U.S. Pat. No. 4,890,713 titled "Pan and Tilt Motor for Surveillance Camera"). Such systems/technology and patent documents are incorporated by reference in the present application as background for the present inventions.

Related Applications (Incorporation by Reference)

The following commonly-owned (at present) U.S. patent applications are listed and incorporated by reference in the present application: (a) U.S. patent application Ser. No. 14/501,302, titled SYSTEM AND METHOD FOR ADMINISTRATION AND MANAGEMENT OF AN AIRSPACE FOR UNMANNED AIRCRAFT, naming R. Hyde et al. as inventors, filed Sep. 30, 2014 is related to and incorporated by reference in the present application; (b) U.S. patent application Ser. No. 14/501,343, titled UNMANNED AIRCRAFT CONFIGURED FOR OPERATION IN A MANAGED AIRSPACE OF FLYWAY, naming R. Hyde et al. as inventors, filed Sep. 30, 2014 is related to and incorporated by reference in the present application; (c) U.S. patent application Ser. No. 14/501,365, titled SYSTEM AND METHOD FOR OPERATION OF UNMANNED AIRCRAFT WITHIN A MANAGED AIRSPACE OR FLYWAY, naming R. Hyde et al. as inventors, filed Sep. 30, 2014 is related to and incorporated by reference in the present application; (d) U.S. patent application Ser. No. TBD, titled SYSTEM AND METHOD FOR OPERATION AND MANAGEMENT OF RECONFIGURABLE UNMANNED AIRCRAFT, naming R. Hyde et al. as inventors, filed Dec. 4, 2014 is related to and incorporated by reference in the present application.

It is important to note that the construction and arrangement of the elements of the inventions as described in system and method and as shown in the figures above is illustrative only. Although some embodiments of the present inventions have been described in detail in this disclosure, those skilled in the art who review this disclosure will readily appreciate that many modifications are possible without materially departing from the novel teachings and advantages of the subject matter recited. Accordingly, all such modifications are intended to be included within the scope of the present inventions. Other substitutions, modifications, changes and omissions may be made in the design, variations in the arrangement or sequence of process/method steps, operating conditions and arrangement of the preferred and other exemplary embodiments without departing from the spirit of the present inventions.

It is important to note that the system and method of the present inventions can comprise conventional technology (e.g. aircraft design, construction, components, mechanisms, frames/systems, energy/power systems, monitoring/sensors, materials, control systems, computing systems, telecommunication systems, networking technology, data storage, data transmission, data/file structures/formats, systems/software, application programs, mobile device technology, etc.) or any other applicable technology (present or future) that has the capability to perform the functions and processes/operations indicated in the FIGURES. All such technology is considered to be within the scope of the present inventions.

In the detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method of reconfiguring selectively reconfigurable aircraft for unmanned flight comprising the steps of:
    (a) positioning a first rotor on a first boom coupled to a base;
    (b) positioning a second rotor on a second boom coupled to the base;
    (c) modifying the position of at least one rotor relative to the base;
    wherein position of the rotor relative to the base is modifiable by (1) translation of the rotor relative to the boom; so that flight characteristics are modifiable by reconfiguration of the position of at least one rotor relative to the base.

2. The method of claim 1 wherein position of the rotor on a boom is modifiable by at least one of: (2) translation of the boom relative to the base; (3) pivoting of the boom relative to the base; (4) retraction of the boom relative to the base; (5) pivoting of the rotor relative to the boom; (6) raising the height of the boom relative to the base; (7) lowering the height of the boom relative to the base; (8) rotating the rotor relative to boom; and (9) rotating the boom relative to the base.

3. The method of claim 1 further comprising at least one of: positioning a third rotor on a third boom coupled to the base; positioning a fourth rotor on a fourth boom coupled to the base; positioning a fifth rotor on a fifth boom coupled to the base; positioning a sixth rotor on a sixth boom coupled to the base; positioning a seventh rotor on a seventh boom coupled to the base; and positioning an eighth rotor on an eighth boom coupled to the base.

4. The method of claim 1 wherein flight characteristics are modifiable by at least one of: (a) changing rotation speed of at least one rotor; (b) changing pitch of vanes of at least one rotor; (c) changing position of the rotor relative to at least one other rotor; (d) modifying the positioning of one boom relative to another boom; and (e) modifying the positioning of one rotor relative to the base.

5. The method of claim 1 wherein flight characteristics comprise at least one of aerodynamic profile, maneuverability, available thrust, available lift, energy consumption, energy efficiency, mass, mass properties, center of mass, center of gravity, balance point, stability, controllability, control axes, maximum relative ground velocity, maximum relative air speed, ascent rate, descent rate, sink rate, flight altitude, aerodynamic drag, number of operational rotors, control system type, equipment status.

6. The method of claim 1 wherein each rotor comprises a set of blades rotating on an axis, the method further comprising adjusting pitch of blades of the rotor.

7. The method of claim 1 further comprising anticipating rotor malfunction so that reconfiguration of the rotor occurs before malfunction.

8. The method of claim 1 wherein flight characteristics are modifiable in response to operating conditions for a mission.

9. The method of claim 8 wherein operating conditions for a mission comprise at least one of operability of each rotor, energy storage capacity, remaining energy storage, payload profile, payload mass, payload type, payload shape, payload size, payload changes, route, altitude, traffic, weather conditions, weather effects, wind velocity, wind direction, distance of mission, remaining distance of mission, time for mission, remaining time for mission, fuel storage capacity, remaining fuel, energy storage capacity, remaining stored energy.

10. The method of claim 8 further comprising the step of responding to a change in operating conditions.

11. The method of claim 10 wherein responding comprises the step of changing rotor speed.

12. The method of claim 11 wherein if change in rotor speed is beyond a limit of off-design-point rotor speed then responding further comprises changing rotor position.

13. A method of reconfiguring selectively reconfigurable aircraft for unmanned flight having a set of rotors configured to provide lift for propulsion with at least one rotor that is at least partially malfunctioning comprising the steps of:
    (a) anticipating rotor malfunction;
    (b) identifying the rotor that is malfunctioning;

(c) identifying at least one functioning rotor that is in an initial position; and (d) repositioning the at least one functioning rotor from the initial position to a reconfigured position so that reconfiguration of the at least one functioning rotor occurs before malfunction;

so that before malfunction the at least one functional rotor when after reconfiguration in the reconfigured position compensates for the loss of function of the malfunctioning rotor.

14. The method of claim 13 wherein the aircraft comprises a base and wherein repositioning of the at least one functioning rotor comprises positioning the at least one functioning rotor relative to the base.

15. The method of claim 13 wherein malfunctioning comprises at least one of the rotor that is malfunctioning being (a) unable to provide commanded rotation speed; (b) unable to provide expected thrust; (c) unable to be given intended blade pitch; and (d) unable to be positioned to the intended rotor position.

16. The method of claim 13 further comprising monitoring at least one of (a) rotational speed of the rotor, (b) force at rotor bearings, (c) force applied at rotor mount, (d) vibration at the rotor, (e) temperature at the rotor; (f) performance of motor for the rotor.

17. The method of claim 13 wherein identifying comprises monitoring that includes at least one of acoustic monitoring, visual monitoring, vibration monitoring, stress/strain monitoring, and data monitoring.

18. The method of claim 13 further comprising the step of retracting the malfunctioning rotor by at least one of a translating movement and a pivoting movement.

19. The method of claim 13 wherein repositioning the at least one functioning rotor comprises at least one of (1) extending the boom; (2) retracting the boom; (3) elevating the boom relative to the base; (4) lowering the boom relative to the base; (5) rotating the boom in a plane relative to the base; (6) translating the rotor along the boom; (7) tilting the rotor relative to the base; (8) rotating the rotor relative to boom; (9) rotating the boom relative to the base.

20. The method of claim 13 further comprising the step of hovering the aircraft during the step of repositioning at least one rotor.

21. The method of claim 13 further comprising at least one of repositioning pitch of blades of the functional rotor; repositioning pitch of vanes of the functional rotor; regulating rotational speed of the functional rotor; and restricting thrust produced by the functional rotor.

22. The method of claim 13 wherein flight characteristics are modifiable by at least one of (1) translation of the rotor relative to the boom; (2) pivoting of the boom relative to the base; (3) translation of the boom relative to the base; (4) retraction of the boom relative to the base; (5) pivoting of the rotor relative to the boom; (6) raising the height of the boom relative to the base; (7) lowering the height of the boom relative to the base; (8) rotation of the rotor relative to the base; (9) rotational twist of the boom relative to the base; (10) changing spacing of the rotor relative to another rotor; (11) changing incline of the rotor; (12) changing horizontal position of the rotor relative to the base; (13) changing vertical position of the rotor relative to the base; (14) moving the rotor inward relative to the base; (15) moving the rotor outward relative to the base; (16) tilting the rotor; (17) changing rotor thrust; (18) disabling the rotor; (19) changing pitch of vanes of at least one of the rotors; (20) changing rotation speed of at least one of the rotors; and (21) changing position of the rotor relative at least one other rotor.

23. The method of claim 13 wherein flight characteristics comprise at least one of aerodynamic profile, maneuverability, available thrust, available lift, energy consumption, energy efficiency, mass, mass properties, center of mass, center of gravity, balance point, stability, controllability, control axes, maximum relative ground velocity, maximum relative air speed, ascent rate, descent rate, sink rate, flight altitude, aerodynamic drag, number of operational rotors, control system type, equipment status.

24. The method of claim 13 wherein flight characteristics are modifiable in response to operating conditions for a mission.

25. The method of claim 24 wherein operating conditions for a mission comprise at least one of operability of each rotor, energy storage capacity, remaining energy storage, payload profile, payload mass, payload type, payload shape, payload size, payload changes, route, altitude, traffic, weather conditions, weather effects, wind velocity, wind direction, distance of mission, remaining distance of mission, time for mission, remaining time for mission, fuel storage capacity, remaining fuel, energy storage capacity, remaining stored energy.

26. A method of operating a reconfigurable multi-rotor unmanned aircraft with each rotor in a rotor position on a movable boom relative to a base of the aircraft for flight on a mission to provide intended flight characteristics in operating conditions comprising the steps of:

(a) configuring the aircraft in a first configuration with intended flight characteristics for ascent to start a flight;

(b) configuring the aircraft in a second configuration with intended flight characteristics for flight in operating conditions;

wherein the first configuration comprises a first rotor position for at least one rotor;

wherein the second configuration comprises a second rotor position for the at least one rotor;

wherein position of the at least one rotor relative to the base is modifiable by (1) translation of the rotor relative to the boom.

27. The method of claim 26 further comprising at least one of configuring the aircraft in a third configuration with intended flight characteristics for descent to conclude a flight; and configuring the aircraft in a fourth configuration with flight characteristics for flight in operating conditions.

28. The method of claim 26 wherein flight characteristics comprise at least one of aerodynamic profile, maneuverability, available thrust, available lift, energy consumption, energy efficiency, mass, mass properties, center of mass, center of gravity, balance point, stability, controllability, control axes, maximum relative ground velocity, maximum relative air speed, ascent rate, descent rate, sink rate, flight altitude, aerodynamic drag, number of operational rotors, control system type, equipment status.

29. The method of claim 26 wherein flight characteristics are modifiable by at least one of (1) pivoting of the boom relative to the base; (2) retraction of the boom relative to the base; (3) pivoting of the rotor relative to the boom; (4) raising the height of the boom relative to the base; (5) lowering the height of the boom relative to the base; (6) rotation of the rotor relative to the base; (7) rotational twist of the boom relative to the base; (8) changing spacing of the rotor relative to another rotor; (9) changing incline of the rotor; (10) changing horizontal position of the rotor relative to the base; (11) changing vertical position of the rotor relative to the base; (12) moving the rotor inward relative to the base; (13) moving the rotor outward relative to the base; (14) tilting the rotor; (15) changing rotor thrust; (16) disabling the rotor; (17) changing pitch of vanes of at least one of the rotors; (18) changing rotation speed of at least one of the rotors; (19) changing position of the rotor relative at least one other rotor; and (20) translation of the boom relative to the base.

30. The method of claim 26 further comprising: carrying a payload having a mass; and modifying the position of at least one rotor to compensate for at least one of the mass of the payload and position of the mass of the payload.

31. The method of claim 26 wherein reconfiguration of rotor position is performed during a mission to rebalance mass properties after partial delivery of a payload.

32. The method of claim 26 wherein flight characteristics are modifiable in response to operating conditions for a mission.

33. The method of claim 32 wherein operating conditions for a mission comprise at least one of operability of each rotor, energy storage capacity, remaining energy storage, payload profile, payload mass, payload type, payload shape, payload size, payload changes, route, altitude, traffic, weather conditions, weather effects, wind velocity, wind direction, distance of mission, remaining distance of mission, time for mission, remaining time for mission, fuel storage capacity, remaining fuel, energy storage capacity, remaining stored energy.

* * * * *

UNITED STATES PATENT AND TRADEMARK OFFICE
CERTIFICATE OF CORRECTION

| | | |
|---|---|---|
| PATENT NO. | : 9,902,491 B2 | Page 1 of 1 |
| APPLICATION NO. | : 14/639369 | |
| DATED | : February 27, 2018 | |
| INVENTOR(S) | : Alistair K. Chan et al. | |

It is certified that error appears in the above-identified patent and that said Letters Patent is hereby corrected as shown below:

In the Specification

Column 1, Line 45-46:
"SYSTEM AND METHOD FOR ADMINISTRATION AND MANAGEMENT OF AN AIRSPACE" should be --SYSTEM AND METHOD FOR MANAGEMENT OF AIRSPACE--

Column 1, Line 65:
"cation Ser. No. TBD, titled SYSTEM AND METHOD FOR" should be --cation Ser. No. 14/560,765, titled SYSTEM AND METHOD FOR--

Signed and Sealed this
First Day of May, 2018

Andrei Iancu
*Director of the United States Patent and Trademark Office*